(12) United States Patent
Bovino

(10) Patent No.: US 12,338,982 B2
(45) **Date of Patent: *Jun. 24, 2025**

(54) LED LIGHTING INCORPORATING DMX COMMUNICATION

(71) Applicant: Michael Bovino, Cherry Hill, NJ (US)

(72) Inventor: Michael Bovino, Cherry Hill, NJ (US)

(73) Assignee: JAM NEWCO LLC, Cherry Hill, NJ (US)

( * ) Notice: Subject to any disclaimer, the term of this patent is extended or adjusted under 35 U.S.C. 154(b) by 357 days.

This patent is subject to a terminal disclaimer.

(21) Appl. No.: 17/757,803

(22) PCT Filed: Dec. 28, 2020

(86) PCT No.: PCT/US2020/067231

§ 371 (c)(1),
(2) Date: Jun. 21, 2022

(87) PCT Pub. No.: WO2021/134083

PCT Pub. Date: Jul. 1, 2021

(65) Prior Publication Data

US 2023/0044955 A1 Feb. 9, 2023

Related U.S. Application Data

(63) Continuation-in-part of application No. 16/728,637, filed on Dec. 27, 2019, now Pat. No. 10,935,224,
(Continued)

(51) Int. Cl.
*F21V 23/04* (2006.01)
*F21S 4/28* (2016.01)
(Continued)

(52) U.S. Cl.
CPC ............ *F21V 23/0435* (2013.01); *F21S 4/28* (2016.01); *F21V 23/06* (2013.01); *F21Y 2115/10* (2016.08)

(58) Field of Classification Search
None
See application file for complete search history.

(56) References Cited

U.S. PATENT DOCUMENTS 6,283,612 B1 9/2001 Hunter
6,623,151 B2 9/2003 Pederson
(Continued)

FOREIGN PATENT DOCUMENTS

CN 104406080 A 3/2015
CN 106063381 A 10/2016
(Continued)

OTHER PUBLICATIONS

Official Notice of Reason for Rejection dated Nov. 19, 2024 issued in Japanese Patent Application No. 2022-539339 (9 pages).
(Continued)

*Primary Examiner* — Jany Richardson
(74) *Attorney, Agent, or Firm* — FOX ROTHSCHILD LLP

(57) ABSTRACT

A light emitting diode (LED) lighting fixture includes a lamp having a tube with at least one LED lamp positioned therein and operatively connected with external electrical contacts. The lamp has at least one communication protocol address associated therewith. A communication protocol converter is associated with the lamp and is configured to receive an instruction from a communication protocol controller, determine if the instruction is intended for the associated at least one communication protocol address, and if so, control the at least one LED lamp based on the instruction.

13 Claims, 71 Drawing Sheets

Related U.S. Application Data which is a continuation-in-part of application No. 16/415,014, filed on May 17, 2019, now Pat. No. 10,959,313.

(51) Int. Cl.
*F21V 23/06* (2006.01)
*F21Y 115/10* (2016.01)

(56) References Cited

U.S. PATENT DOCUMENTS

| | | | | |
|---|---|---|---|---|
| 2004/0095078 | A1 | 5/2004 | Leong | |
| 2005/0030744 | A1 | 2/2005 | Ducharme et al. | |
| 2007/0228999 | A1 | 10/2007 | Kit | |
| 2010/0190455 | A1 | 7/2010 | Hashizume | |
| 2010/0253226 | A1* | 10/2010 | Oki | F21V 3/00 362/249.02 |
| 2010/0271477 | A1 | 10/2010 | Farina et al. | |
| 2010/0327766 | A1 | 12/2010 | Recker et al. | |
| 2011/0043136 | A1 | 2/2011 | Radermacher | |
| 2011/0103049 | A1 | 5/2011 | Kubis | |
| 2011/0175510 | A1 | 7/2011 | Rains, Jr. et al. | |
| 2012/0086345 | A1 | 4/2012 | Tran | |
| 2012/0236554 | A1 | 9/2012 | Rust | |
| 2012/0271477 | A1* | 10/2012 | Okubo | H04L 12/10 700/297 |
| 2013/0003380 | A1 | 1/2013 | Cao et al. | |
| 2013/0044476 | A1 | 2/2013 | Bretschneider et al. | |
| 2013/0293123 | A1 | 11/2013 | Deak, Sr. et al. | |
| 2013/0301274 | A1 | 11/2013 | Anderson | |
| 2014/0049164 | A1 | 2/2014 | McGuire et al. | |
| 2014/0177203 | A1 | 6/2014 | Novak et al. | |
| 2015/0003053 | A1 | 1/2015 | Ariyoshi et al. | |
| 2015/0061541 | A1 | 3/2015 | Gandini et al. | |
| 2015/0163881 | A1 | 6/2015 | Pederson | |
| 2016/0278186 | A1 | 9/2016 | Van de Sluis et al. | |
| 2019/0297705 | A1 | 9/2019 | Bovino | |
| 2020/0348013 | A1 | 11/2020 | Bovino | |

FOREIGN PATENT DOCUMENTS

| | | | |
|---|---|---|---|
| JP | 2011-198709 | A | 10/2011 |
| JP | 2013-239354 | A | 11/2013 |
| JP | 2018-73601 | A | 5/2018 |
| WO | 2014/049952 | A1 | 4/2014 |

OTHER PUBLICATIONS

First Office Action issued on Mar. 20, 2025 for Japanese Patent Application No. 202080097733.5 (14 pages).

* cited by examiner

NOTE:
CONTROL INTERFACE NOT SHOWN

NOTE:
CONTROL INTERFACE NOT SHOWN

NOTE:
CONTROL INTERFACE NOT SHOWN

CIRCLE

SQUARE

SQUARE

TRIANGLE

LED LIGHTING INCORPORATING DMX COMMUNICATION

CROSS-REFERENCE TO RELATED U.S. PATENT APPLICATION

This application is a National Stage Entry of PCT/US20/67231, which is a Continuation-In-Part of U.S. Ser. No. 16/728,637, filed Dec. 27, 2019, which is a Continuation of U.S. patent application Ser. No. 16/415,014, filed May 17, 2019, which is a Continuation-In-Part of U.S. patent application Ser. No. 15/301,617 filed Oct. 3, 2016, which is the U.S. National Phase filing of International Application No. PCT/US15/24323 filed Apr. 3, 2015, which, in turn, claims priority under 35 U.S.C. § 119(e) to U.S. Provisional Application Nos. 61/974,507 filed Apr. 3, 2014, 62/013,258 filed Jun. 17, 2014, and 62/093,470 filed Dec. 18, 2014. The disclosures of all six applications are incorporated herein by reference in their entirety.

STATEMENT OF THE TECHNICAL FIELD

The present disclosure relates to light emitting diode (LED) lamps. More specifically, the present disclosure relates to LED lamps, lighting tubes and fixtures that incorporate digital communications.

BACKGROUND

Conventional lighting technology for large buildings such as office buildings, schools, recreational centers, retail establishments, theme parks and other similar structures are typically fluorescent fixtures including fluorescent lamps. Fluorescent lamps are more durable, economical and efficient when compared to incandescent lamps, and thus became standard for many lighting applications.

Typical fluorescent lighting fixtures include one or more ballasts for converting input or source power into power usable by the fluorescent lamps. A typical fluorescent lamp may have a standard socket size, tube diameter and length (e.g., a T8 lamp having a one inch tube diameter and a four foot length many others are available).

In light of recent energy conservation efforts and improved designs, one common occurrence is replacing existing fluorescent lamps with similarly shaped and rated LED lamps. By using existing technology, LED lamps can be made to closely match the functionality and appearance of fluorescent lamps.

Additionally, many existing lighting installations utilize lighting communications and protocols for providing an interactive lighting experience. For example, entertainment facilities, recreational facilities such as bowling centers, theme parks, stage productions, television productions, and theater productions utilize lighting communications to provide inter-active sound and visual effects.

It would be advantageous to provide an LED lamp that functionally and visually replaces existing fluorescent lighting while also providing for an interactive DMX controlled lighting experience.

Moreover, for some lighting applications, particular types of lamps and lighting fixtures may be required to utilize different lighting colors, effects, or patterns. As such, more complex lighting applications may involve using numerous lamps and fixtures. For example, in a bowling alley, fluorescent lamps may be used to emit white light during league bowling during the day, and ultraviolet lamps and/or colored fluorescent lamps may be used to emit ultraviolet and colored light, respectively, during nighttime bowling. LED lamps may be used to reduce the number of lamps and lighting fixtures in these lighting applications. For example, one LED lamp may include true white LEDs configured to emit light that closely matches the appearance and color temperature of white fluorescent lamps. The LED lamp may include ultraviolet LEDs configured to emit light having a wave length measured in nanometers similar to light emitted from a fluorescent ultraviolet lamp. Additionally, the LED lamp may include Red, Green, and Blue (RGB) LEDs configured to produce 16.7 million colors. That is, the LED lamp can perform the functions of multiple fluorescent lamps. However, the components, such as a data control board or a power control board, that operate the various LEDs are typically loosely positioned within the conventional LED lamps and are difficult to service. Therefore, the components of the LED lamps may be prone to breaking if dropped and difficult to replace or repair if broken.

SUMMARY

In one or more scenarios, the disclosed technology relates to a light emitting diode (LED) lighting fixture. In one or more cases the LED lighting fixture includes a lamp. In one or more cases, the lamp includes a tube with at least one LED lamp positioned therein and operatively connected with external electrical contacts. In one or more cases, the lamp may have at least one communication protocol address associated therewith. In one or more cases the LED lighting fixture includes a communication protocol converter associated with the lamp. In one or more cases, the communication protocol converter may be configured to receive an instruction from a communication protocol controller, determine if the instruction is intended for the associated at least one communication protocol address, and if so, control the at least one LED lamp based on the instruction.

In one or more scenarios, the disclosed technology relates to a light emitting diode (LED) lamp. In one or more cases, the LED lamp includes an elongated chassis including a platform; at least one LED positioned on the platform; and a first end cap and a second end cap disposed on opposite ends of the LED lamp. In one or more cases, the first end cap includes a first support platform coupled to an inner surface of the first end cap. In one or more cases, the second end cap includes a second support platform coupled to an inner surface of the second end cap. In one or more cases, the first support platform is configured to fixedly hold a power board within the LED lamp. In one or more cases, the second support platform is configured to fixedly hold a data control board within the LED lamp.

In one or more scenarios, the disclosed technology relates to a LED light fixture. In one or more cases, the LED light fixture includes a LED lamp. In one or more cases, the LED lamp includes an elongated chassis including a platform; at least one LED positioned on the platform; and a first end cap and a second end cap disposed on opposite ends of the LED lamp. In one or more cases, the first end cap includes a first support platform coupled to an inner surface of the first end cap. In one or more cases, the second end cap includes a second support platform coupled to an inner surface of the second end cap. In one or more cases, the first support platform is configured to fixedly hold a power board within the LED lamp. In one or more cases, the second support platform is configured to fixedly hold a data control board within the LED lamp. In one or more cases, the LED light fixture includes a lamp holder. In one or more cases, the lamp holder includes a high voltage socket and a low voltage socket, in which the high voltage socket is configured to receive the first end cap and the low voltage socket is configured to receive the second end cap, thereby electrically coupling the LED lamp and the lamp holder.

A variety of additional aspects will be set forth in the description that follows. The aspects can relate to individual features and to combinations of features. It is to be understood that both the foregoing general description and the following detailed description are exemplary and explanatory only and are not restrictive of the broad inventive concepts upon which the embodiments disclosed herein are based.

BRIEF DESCRIPTION OF THE DRAWINGS

Embodiments will be described with reference to the following drawing figures, in which like numerals represent like items through the figures, and in which.

DETAILED DESCRIPTION

This disclosure is not limited to the particular systems, devices and methods described, as these can vary. The terminology used in the description is for the purpose of describing the particular versions or embodiments only, and is not intended to limit the scope.

As used in this document, the singular forms "a," "an," and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to."

The present disclosure relates to a modification of existing lighting fixtures, or implementation of new lighting fixtures, that utilize LED lamps as well as digital communications to provide lighting effects for interactive lighting experiences such as those commonly used at recreational facilities such as, for example, themed environments and bowling centers. Lighting systems may being development as drawings with a fixture layout as well as electrical and control cable layouts. LED lamp DMX address and DMX universe tables may also be created. LED lamps may be pre-addressed according to the labels. Labels may be applied to the lamps, light fixtures and light fixture boxes. Shipping pallets are arranged in sequential order to how the lighting system will be installed on-site, so as to configure the equipment off-site and ease the on-site system installation time. As used in this document, digital multiplex (DMX) refers to the DMX512 standard protocol for digital communication networks. A DMX universe refers to a DMX network including, for example, up to 512 links or individual controllable devices. Depending upon the design, a DMX controller may be configured to provide operation control to one or more universes. Although described in this document in reference to DMX, one of ordinary skill in the art will recognize that other communications protocols, including but not limited to attached resource computer network (ARCnet), Ethernet (IEEE 802 protocols), infrared (IR), serial communications, and the like, may be used without departing from the spirit of this disclosure.

A typical DMX network may include, for example, one or more DMX controllers configured to produce one or more instructions (each of which has at least one associated address) and various effect devices such as, for example, lighting fixtures, fog machines, intelligent lights, audio output devices, and other similar effects devices. Each device within the network may include an associated address and be operably connected to the DMX controller for receiving the instructions from the DMX controller. The individual device may include a DMX converter that determines if the instruction is for that specific device as well as what particular effect to perform.

Figure 1:
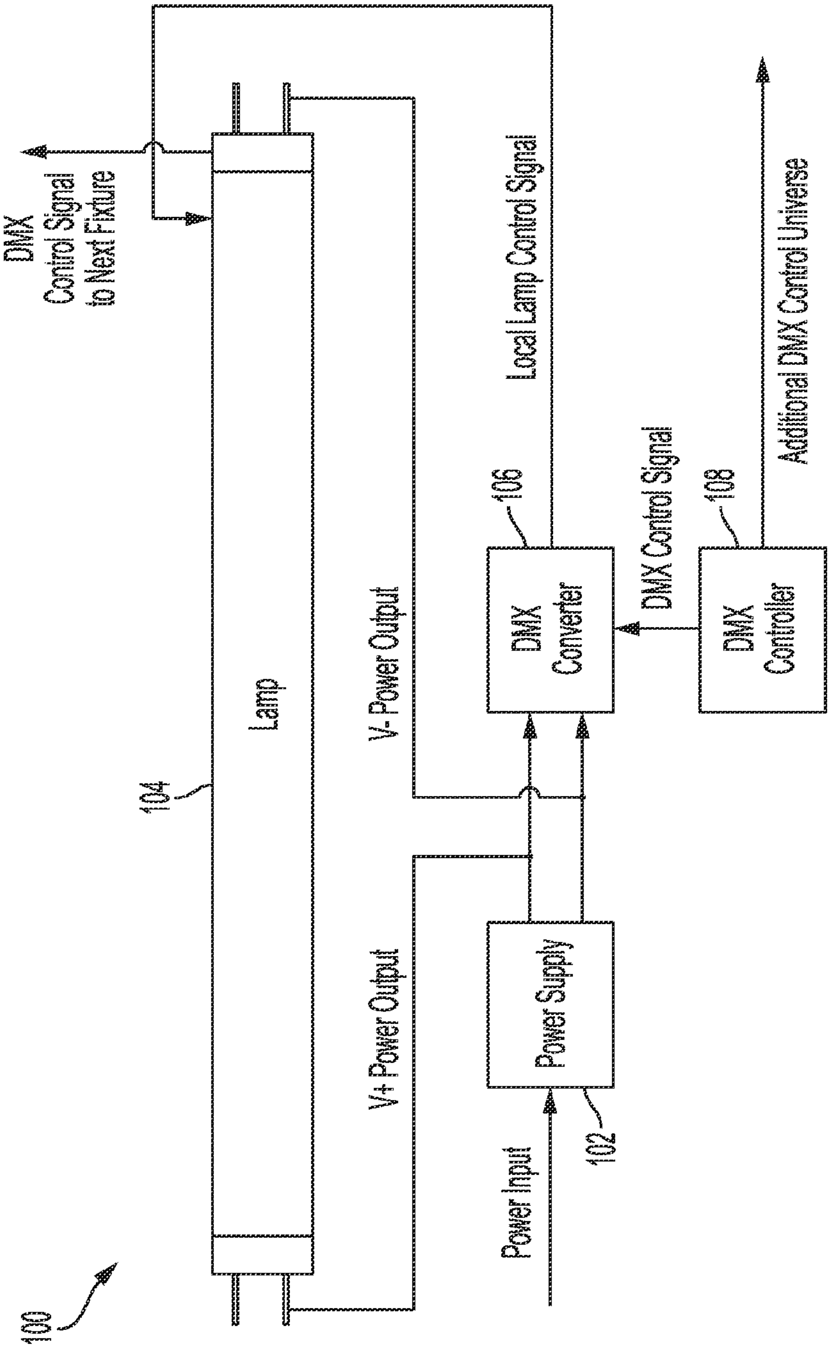
FIG. 1 depicts a first system diagram for a lighting fixture including an LED tube and DMX communication according to an embodiment.

FIG. 1 depicts a diagram illustrating a lighting fixture system 100 according to an embodiment. The lighting fixture system 100 may include, for example, a power supply 102, a lamp 104, a DMX converter 106 and a DMX controller 108. Depending upon the arrangement of the components, the power supply 102, lamp 104 and DMX converter 106 may be integrated into a single lighting fixture, and DMX controller 108 may be a processing device such as a server located at a remote location and configured to provide a DMX control signal to one or more fixtures.

Similarly, the DMX controller 108 may be configured to output additional control for other DMX universes according to standard DMX protocol and operations. Additionally, depending upon the installation of the lighting fixture, lamp 104 may be, for example, a red, blue, and green (RGB) LED lamp or a red, blue, green, and white (RGBW) LED lamp. However, it should be noted that RGB and RGBW lamps are shown by way of example only, and the lamps as described herein may include additional types of LED lamps configured to emit light at various wave lengths. For example, the lamps may include red (R), green (G), blue (B), white (W), ultra-violet (UV), amber (A), and infrared (IR). The possible combinations are lamps containing individual colors or wavelengths such as R, G, B, W, UV, IR, A, and the like, and combinations thereof, including, but not limited to, RGB, RGB-W, RGB-UV, RGB-IR, RGB-A, RGB-W-UV, RGB-W-IR, RGB-W-A, RGB-UV-IR, UV-IR, W-UV, W-IR, W-A, W-UV-IR, RGB-UV-IR-W, RGB-A-IR-W, or any other combination. In some embodiments an LED diode lamp will contain a combination of the above, such as red, green, blue, white, and lime/mint green (RGBWG). This combination, taking into consideration that 490-515 nm fits the wavelength best visible to the human, creates great color mixings with very subtle color hues. It also helps increase the color rendering index (CRI) of the output of the LED diode lamp.

Figure 53:
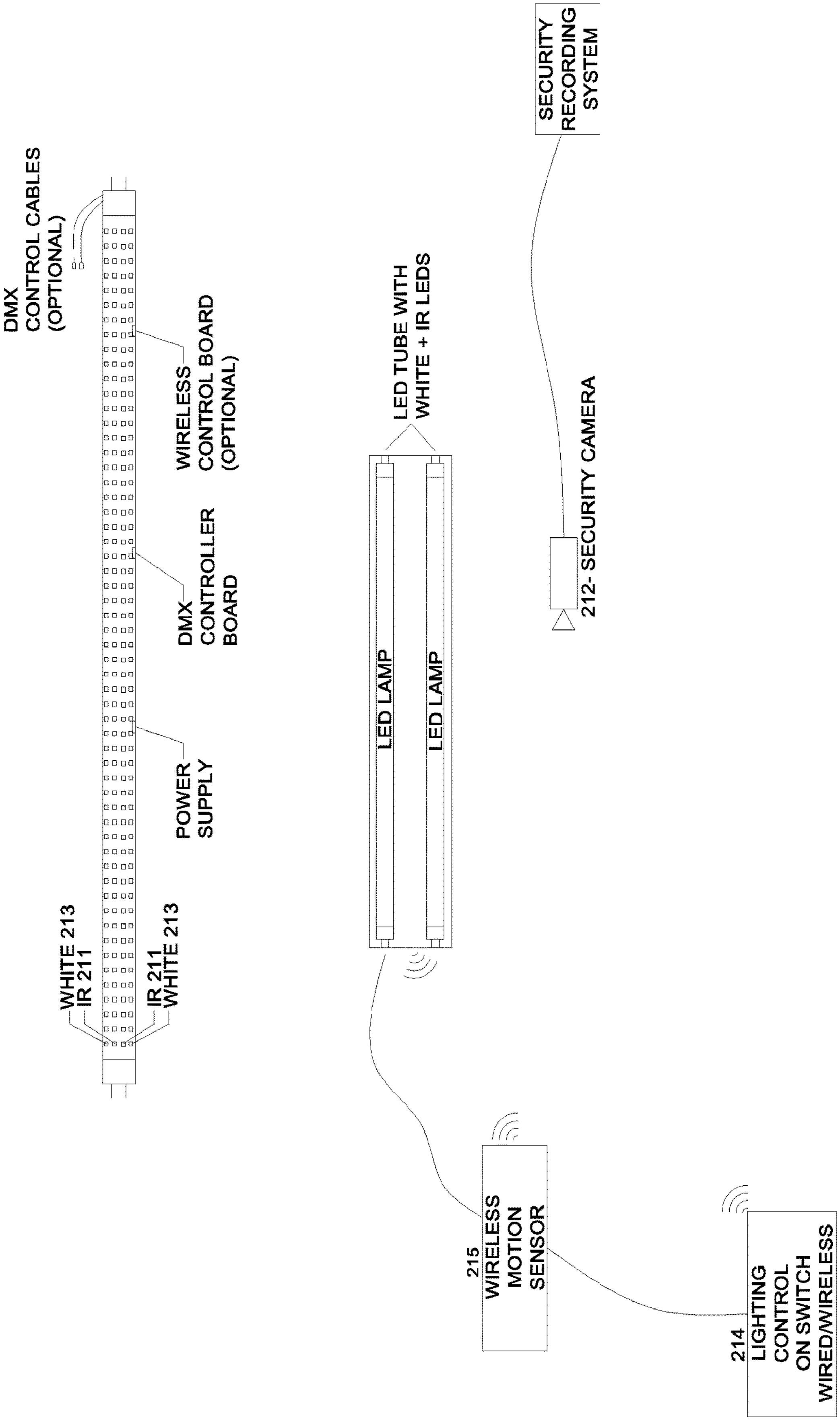
FIG. 53 illustrates infrared LED lamps having motion sensors and lighting controls networked to a security recording system.

The infrared LEDs 211 in FIG. 53 are used to illuminate areas with infrared light. The infrared light is used by most camera systems. Infrared light, which spans from 700 nanometers (nm) up to about 1000 nm, is beyond what the human eye can see, but most camera sensors can detect it and make use of it. This is particularly helpful with bowling scoring systems, tracking camera systems and security systems where there is minimal lighting available. For example, for security systems, infrared light could be used along with white light, a lighting control unit 214, and a motion/occupancy sensor 215. The lighting system could provide camera systems 212 with high levels of lighting at all times of day, while the motion/occupancy sensor 215 could be operated by an electronic schedule within the lighting control 214. Depending on the hours, the scheduler could choose between one or both of white 213 and infrared 211 LED diodes, with the lighting triggered by the motion/occupancy sensor 215. In another example, infrared light could be used with effects lighting and camera tracking systems to provide visible effects lighting for the human eye and invisible light for the security cameras 212 to be able to track an object.

The DMX controller 108 may also be configured to control the DMX mode which allows each light to set the number of pixels/segments of LEDs to be controlled independently at one time. The pixels/segments, or quantity of LEDs, is associated with the number of DMX channels used. The higher number of DMX channels used per tube, the smaller the segment of LEDs controlled at one time. Conversely, the smaller number of DMX channels used the greater number of LEDs controlled or larger the segment size operated at one time. Selectable DMX modes are set when the light tube is addressed. Fixed light tube DMX modes are set when the tube is manufactured. For example: A T8 48" length light tube may have 72 tri-color RGB LEDs in it. Each tri-color LED would use three DMX channels so the entire light tube would use 216 DMX channels. If the fixture is used in the 24 channels mode, the LED segment size would be three DMX channels, that is, three tri-color LEDs may be controlled by each DMX address. In three channel mode, all of the seventy-two tri-color LEDs would operate together, that is, the tube may operate with three colors (Red, Green, Blue). Color mixing of these three colors produces 16.7 million colors. The number of colors available through color mixing depends on the number and combinations of LEDs used. Many versions of the tubes are contemplated so several different DMX modes are available.

Figure 52:
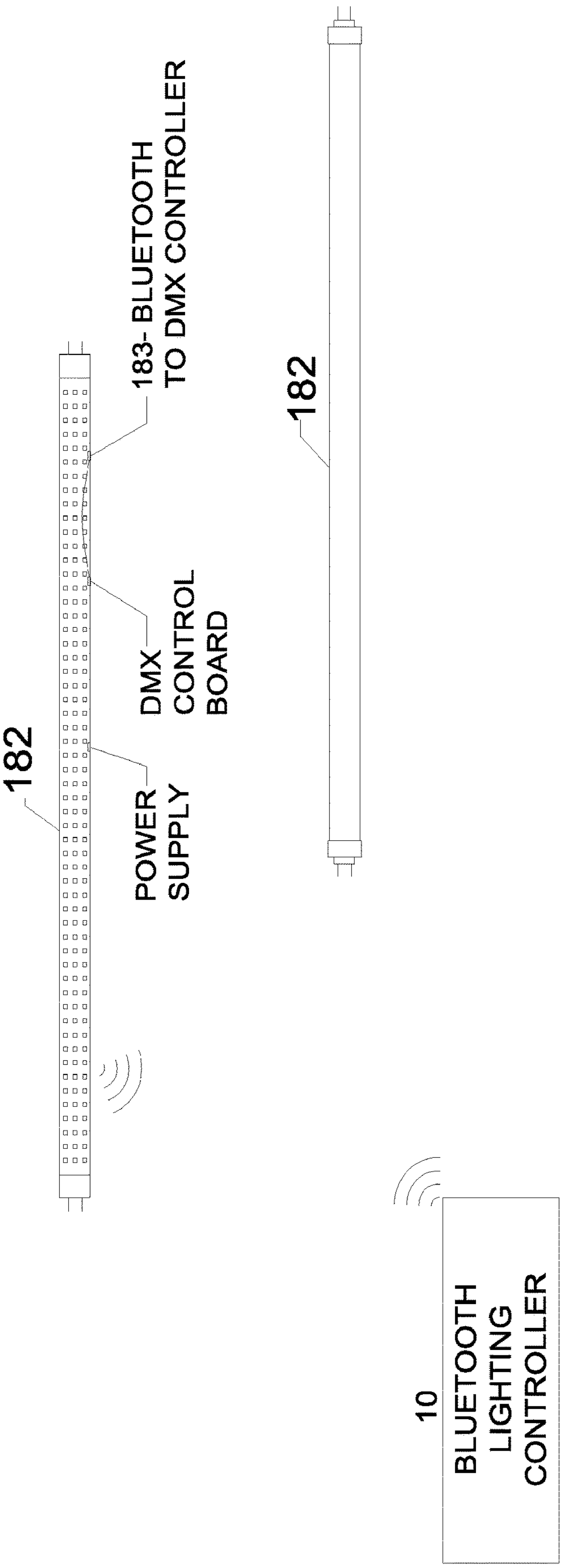
FIG. 52 illustrates a Bluetooth lighting controller system having LED lamps with repeating DMX channels to facilitate operation of multiple LED lamps.

FIG. 52 illustrates how DMX channels in lighting control 10 may be repeated in order to operate LED lamps 182 or light fixtures together. The software of the lighting controller 10 may control the channel repetition, where lighting control may be Bluetooth, Bluetooth to DMX 183, DMX, Wifi, or others. A standalone red, green, blue and white (RGBW) LED lamp with one or more pixels would have a minimum of four control channels (RGBW). By repeating these control channels over an entire 512 channel DMX universe, many LED lamps 182 may be controlled and operated at the same time. An exemplary channel table is reproduced here:

| DMX Channel | Pixel 1 | Output |
|---|---|---|
| 1 | Red | 255 |
| 2 | Green | 100 |
| 3 | Blue | 180 |
| 4 | White | 0 |
| Repeats To Pixel 2 | | |
| 5 | Red | 255 |
| 6 | Green | 100 |
| 7 | Blue | 180 |
| 8 | White | 0 |
| Repeats to Pixel 3 | | |
| 9 | Red | 255 |
| 10 | Green | 100 |
| 11 | Blue | 180 |
| 12 | White | 0 |
| Repeats to Pixel 4 | | |
| 13 | Red | 255 |
| 14 | Green | 100 |
| 15 | Blue | 180 |
| 16 | White | 0 |
| This continues up to to 512 DMX channels per DMX universe. | | |

Once networked, LED lamps may be controlled uniformly in a number of ways. In one embodiment LED lamps include integrated dimming and intensity tuning for all colors and LED nodes The LED lamp can be dimmed by DMX, Bluetooth, or power supply voltage dimming. The number of dimming channels for each type of lamp is dependent on the number of pixels, led nodes, and led colors used in each lamp. Dimming may operated by an external control unit. For DMX, there are 255 dimming channels per pixel, per colors of the LED lamp. For example, a RGBW (red, green, blue, white) lamp with one pixel includes four dimming channels with red (255), green (255), blue (255), and white (255).

In another embodiment, default lighting control programs may be utilized. Default lighting control programs are programs that run when no external control signals are present. These programs can be a simple color or multiple colors or programs. As an example, when a lamp is powered on, the default color may be white light. As a default program, this will allow end users to see that the lamp has power and is working when it receives high voltage power. Default programs may be set during manufacturing, but could also be end user set or set by remote device management (RDM).

Figure 41:
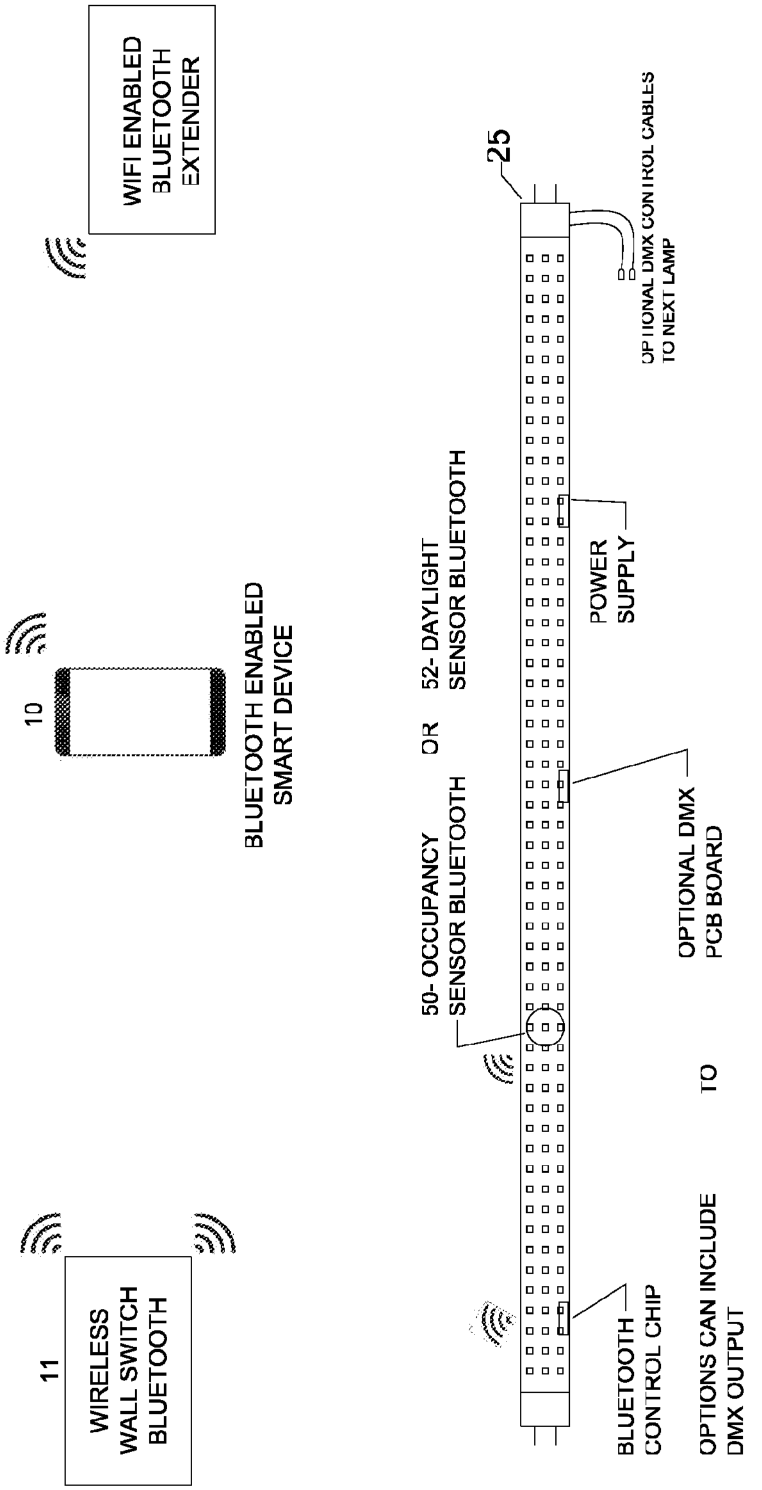
FIG. 41 illustrates an integrated occupancy/daylight sensor.

FIG. 41 shows another embodiment in which lighting control may be executed by integrated sensors. These sensors may include occupancy sensors, daylight sensors, and more. For occupancy sensors, a small occupancy sensor 50 may be added to the center of a lamp 25 to operate one 25 or more lamps. The occupancy sensor 50 may track movement in a room or area. When there is movement, the occupancy sensor 50 is activated and triggers the one or more lamps 25 to power on. After a specific amount of time without movement in the room or area, the occupancy sensor 50 will trigger the one or more lamps 25 to power off. This feature may be used to increase the energy efficiency of the one or more lamps 25. The occupancy sensor 50 can be part of the Bluetooth mesh ecosystem to allow configuration and additional control options from a smart device, tablet, PC 10, or wall switch 11. The output control signal may be a combination of formats, such as Bluetooth to other mesh control devices and/or DMX wired or wireless or Wi-Fi 51 to other lamps or to additional control devices.

FIG. 41 illustrates daylight sensors. A small daylight sensor 52 may be added to the center of a lamp 25 to operate one or more lamps. The daylight sensor 52 may monitor the available ambient light. If the amount of available light is below a certain level, the sensor may switch on or off the one or more lamps 25. This feature may be used to increase the energy efficiency of the one or more lamps 25. Having the daylight sensor 52 built into the lamp 25 simplifies the installation process. The daylight sensor 52 can be part of the Bluetooth mesh ecosystem to allow configuration and additional control options from a smart device, tablet, PC 10 or wall switch 11. The output control signal could be a combination of formats. These include Bluetooth to other mesh control devices and/or DMX wired or wireless or Wi-Fi 51 to other lamps or to additional control devices.

Figure 2:
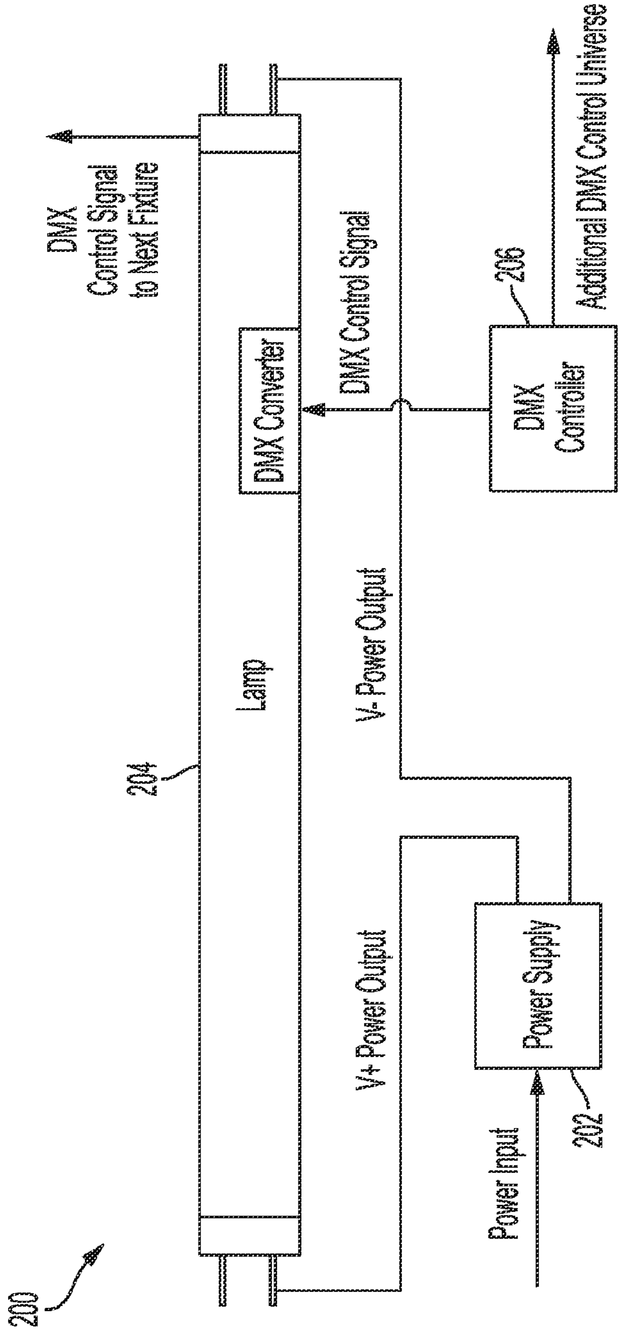
FIG. 2 depicts a second system diagram for a lighting fixture including an LED tube and DMX communication according to an embodiment.
Figure 3:
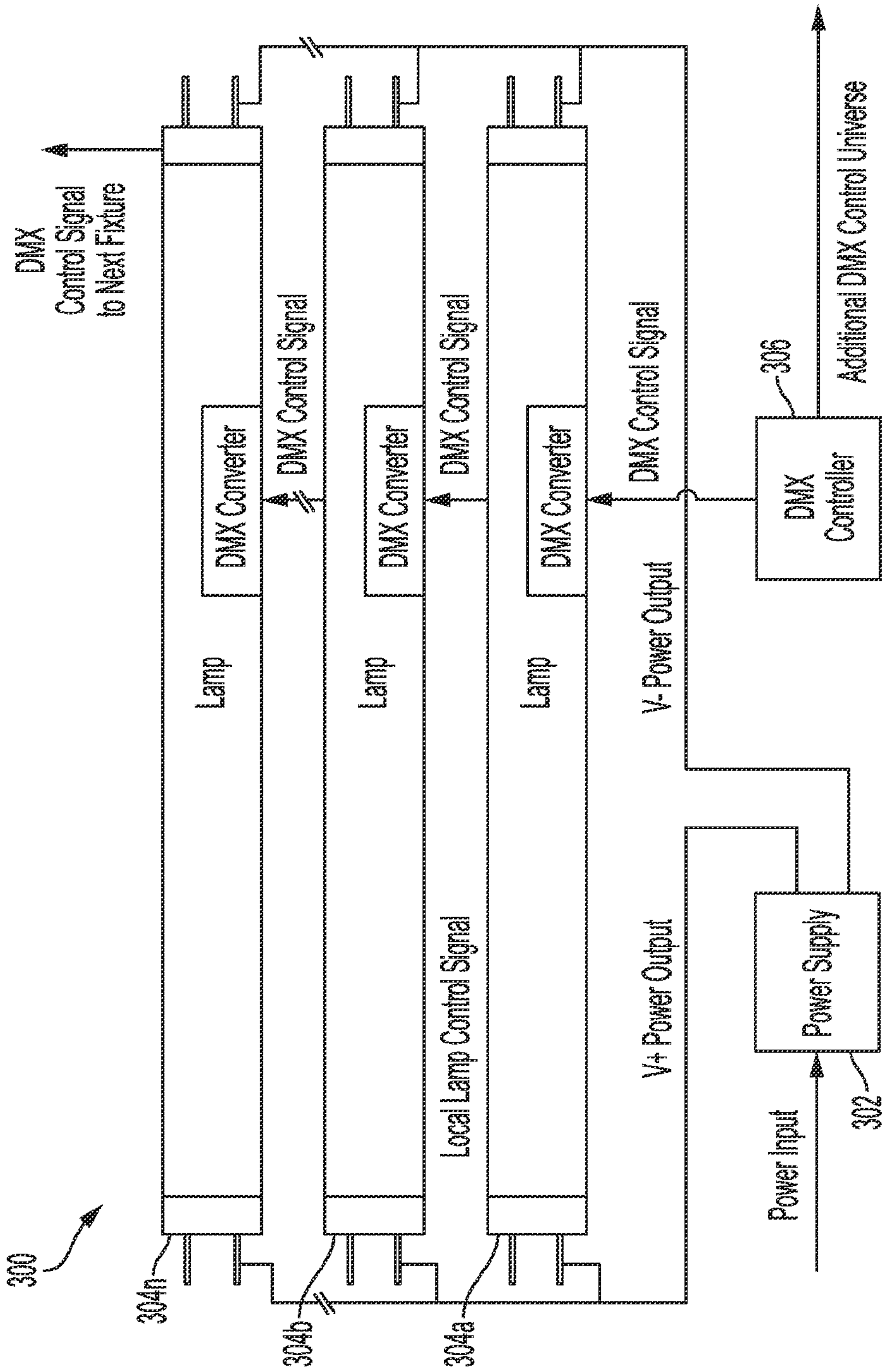
FIG. 3 depicts an alternative fixture as that shown in FIG. 2 including multiple LED lamps according to an embodiment.
Figure 4:
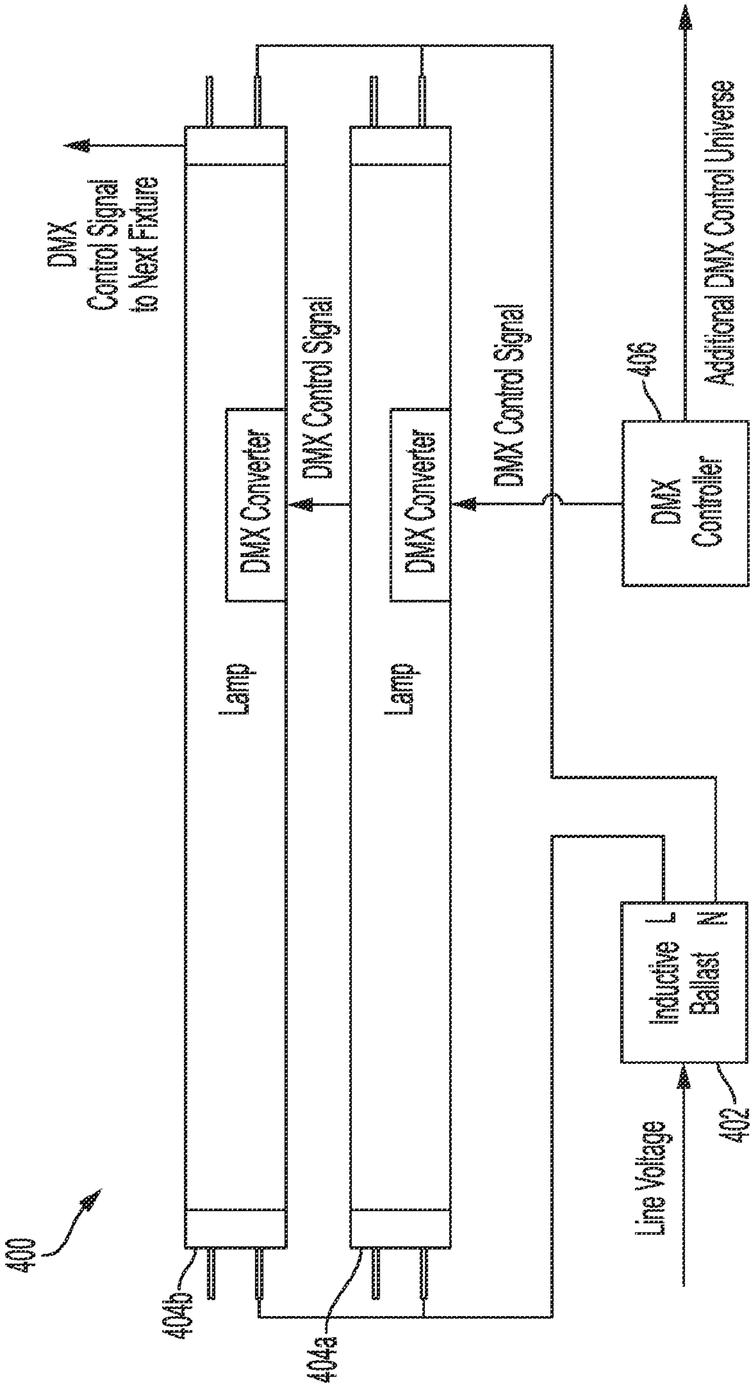
FIG. 4 depicts a third system diagram for a lighting fixture including an LED tube and DMX communication according to an embodiment.

As shown in FIG. 1, the power supply 102 may be operably connected to a power input and configured to produce a suitable output voltage for operation of both the lamp 104 as well as the DMX converter 106. Additionally, depending upon the arrangement of the components, the power supply 102 and DMX converter 106 may both be integrated into a single ballast/unit. Such an arrangement of the components may provide for an easier retrofit when converting an existing light fixture into an LED fixture having DMX controlled effects such as those fixtures described herein. Alternatively, the DMX controller may be integrated into another component such as the lamp itself. Such an arrangement is shown in FIGS. 2-4 as described below.

In operations, the DMX controller 108 may send one or more instructions as a DMX control signal to a network of connected devices, including the DMX converter 106 as shown in FIG. 1. The DMX converter 106 can have an associated address and, based upon that address, can determine which instructions of the DMX control signal are intended for a lighting fixture associated with that specific DMX converter. The address of DMX converter 106, for example, may be assigned or provided according to standard DMX protocol operations, or according to any additional network addressing techniques or protocols. Addressing may be performed during network installation, or at a later time to reflect changes or updates to the network. It is also possible to address the tubes by DMX auto addressing. As each tube is connected to a DMX control, the tube automatically sets its DMX address to the first available or to the next address available. The next tube that is connected will then address itself to the next available DMX address. Each additional tube will use the next available address until the universe of 512 DMX channels is filled.

Figure 13:
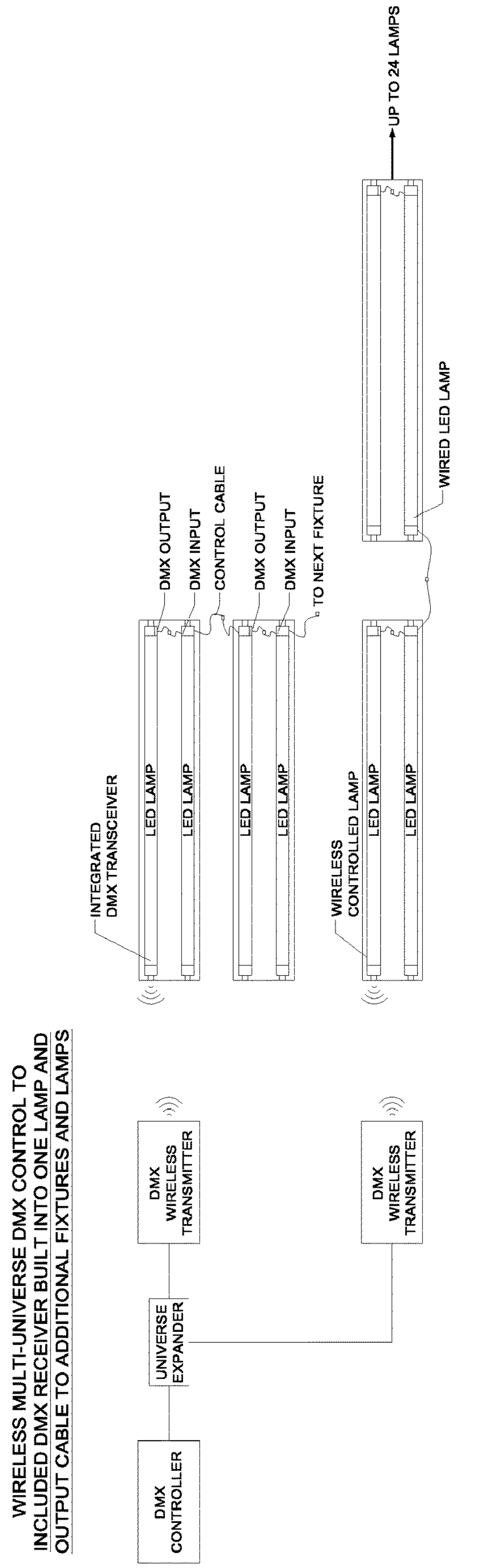
FIG. 13 illustrates DMX wireless receiver with a wired output to connect and control additional LED lamps.
Figure 14:
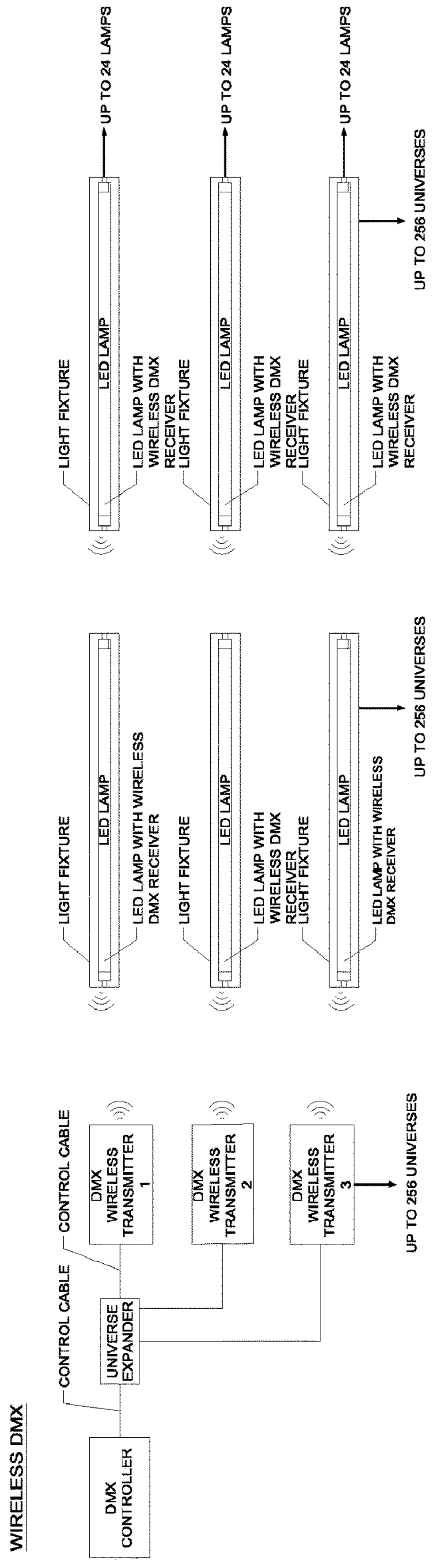
FIG. 14 illustrates LED lamps with DMX wireless receivers within the lamps.
Figure 15:
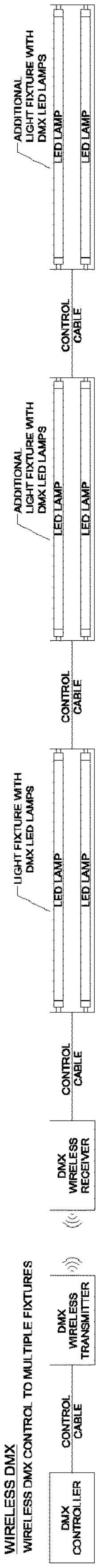
FIG. 15 illustrates a wireless receiver controlling a DMX universe of LED lamps.
Figure 16:
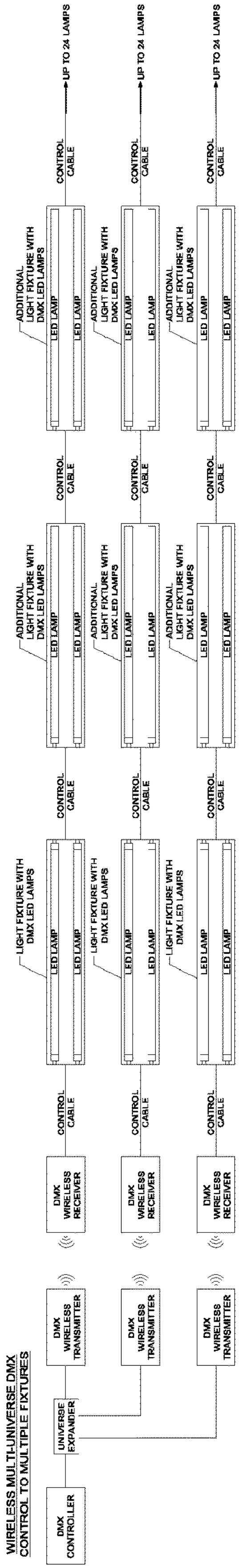
FIG. 16 illustrates multiple wireless DMX control universes working in unison.
Figure 17:
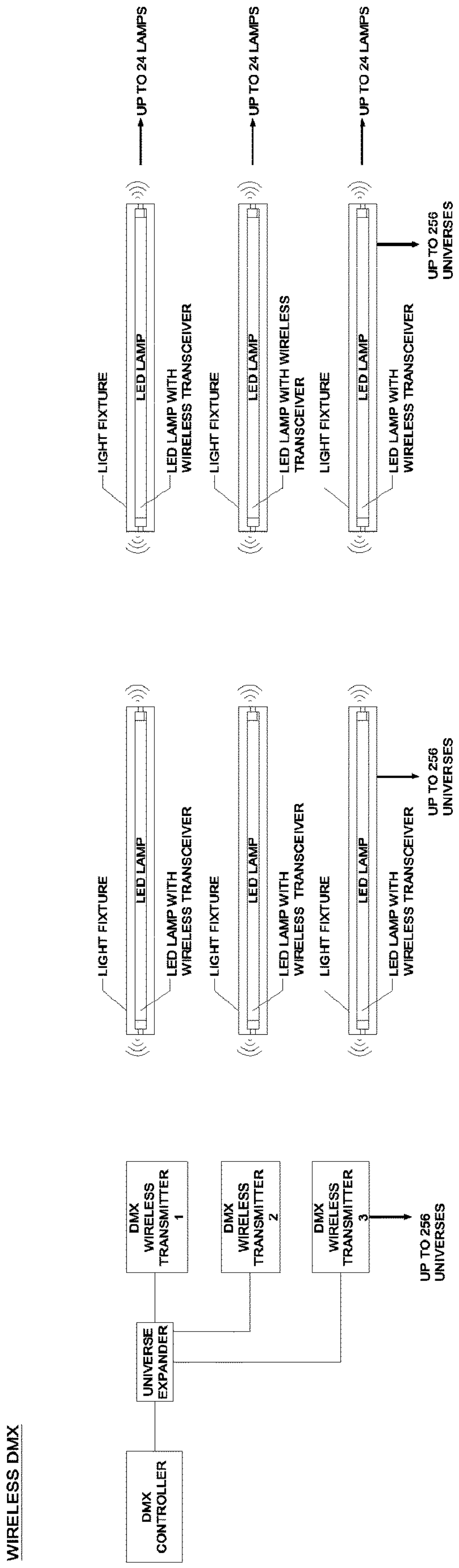
FIG. 17 illustrates a network of wireless DMX units acting as transceivers, receiving and transmitting control signals to each LED lamp or fixture.

In one embodiment, the DMX controller may communicate wirelessly. A wireless DMX control receiver may be added to an LED lamp or light fixture, together with a wireless DMX transmitter added to the control position in order to provide wireless control of one or more LED lamps in a fixture. Settings controllable wirelessly include but are not limited to control over color, dimming, patterns, and overall control of the one or more lamps. It is also possible to use one LED lamp with a DMX wireless receiver with additional wired output to connect and control additional LED lamps, as in FIG. 13. The additional LED lamps would not include a wireless receiver, but instead wired DMX input and output connections. This hybrid method of connecting the lamps would speed up installation time and reduce the overall cost of the LED system. Conversely, if all lamps include a wireless receiver within the lamps themselves would not need input and output cables for connection of control signals, as in FIG. 14, greatly reducing set-up and installation time. If the wireless receiver was added to the light fixture with one or more wired LED lamps, one wireless receiver would control a DMX universe of LED lamps and thus many light fixtures at one time, as seen in FIG. 15. Multiple wireless DMX control universes would be used at one time, as seen in FIG. 16, eliminating the need for control cables from the wireless transmitter to the first light fixture. The wireless DMX units may be transceivers, receiving and transmitting control signals to each LED lamp or fixture, similar to the Bluetooth system described below (FIG. 17).

Figure 18:
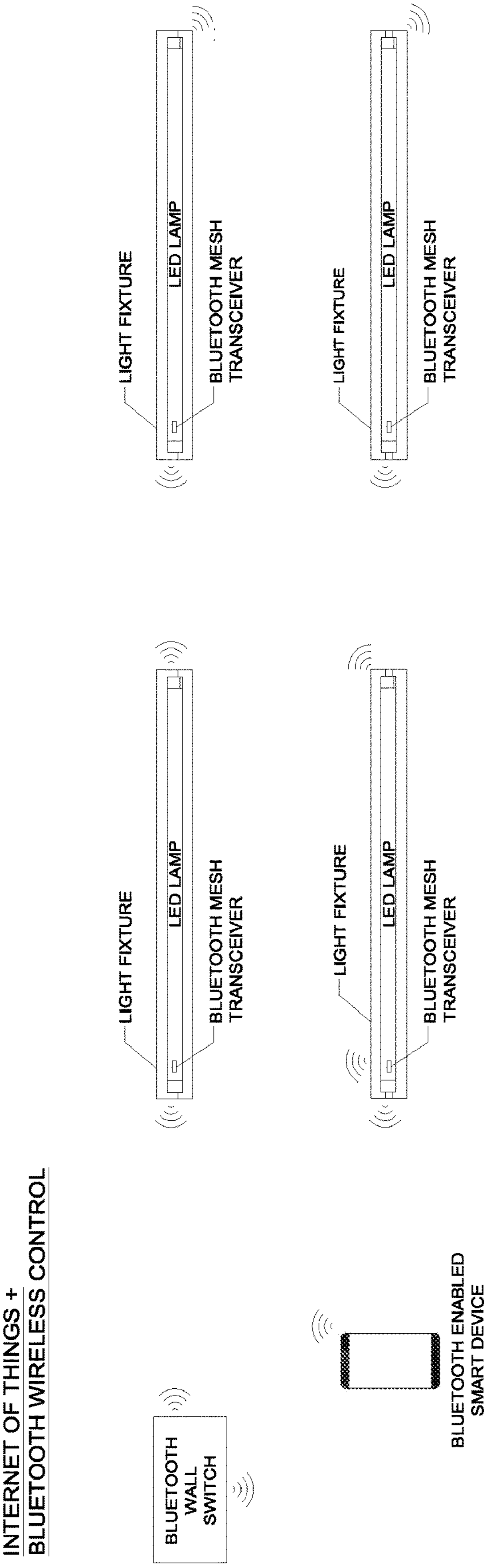
FIG. 18 illustrates a Bluetooth mesh network where a Bluetooth unit acts as a transceiver to control LED lamps and other devices.
Figure 19:
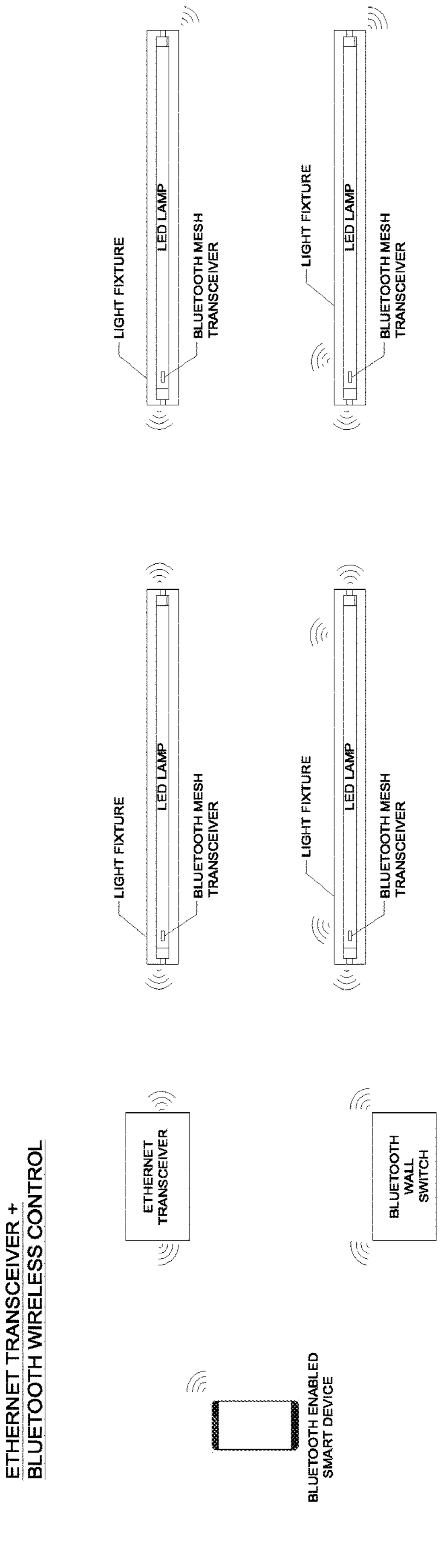
FIG. 19 illustrates a Bluetooth mesh network where Ethernet transceivers that output Bluetooth control signals are included to extend the wireless Bluetooth signal range.

In another embodiment, a Bluetooth mesh receiver may be added to each of the LED lamps or light fixtures, adding "internet of things" functionality. The Bluetooth receiver may receive control signals from a Bluetooth-enabled transmitting device, which acts as the lighting controller. The transmitters can be one of a variety of computing devices, including but not limited to a smart phone, tablet, personal computer, wall switches, or other Bluetooth-enabled devices. An application may run on the transmitting device and be end-user operated. The Bluetooth units act as transceivers both receiving and transmitting the control signals to other enabled control devices and LED lamps with five channels with 12-24 VDC dimmers for constant voltage LED loads, as seen in FIG. 18, creating a mesh network and providing all LED lamps control signals. In a configuration where all LED lamps include Bluetooth receivers, wired control cables attached to the LED lamps or from the controller to and between the LED lamps. Ethernet transceivers that output Bluetooth control signals to extend to wireless Bluetooth signal ranges, as in FIG. 19, may also be used.

Figure 20:
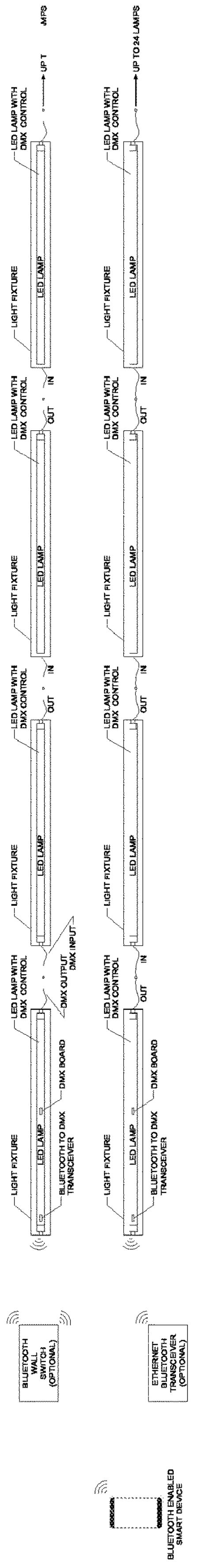
FIG. 20 illustrates a Bluetooth network for an LED lamp having a control board to convert Bluetooth signals into DMX control signals, among others.
Figure 21:
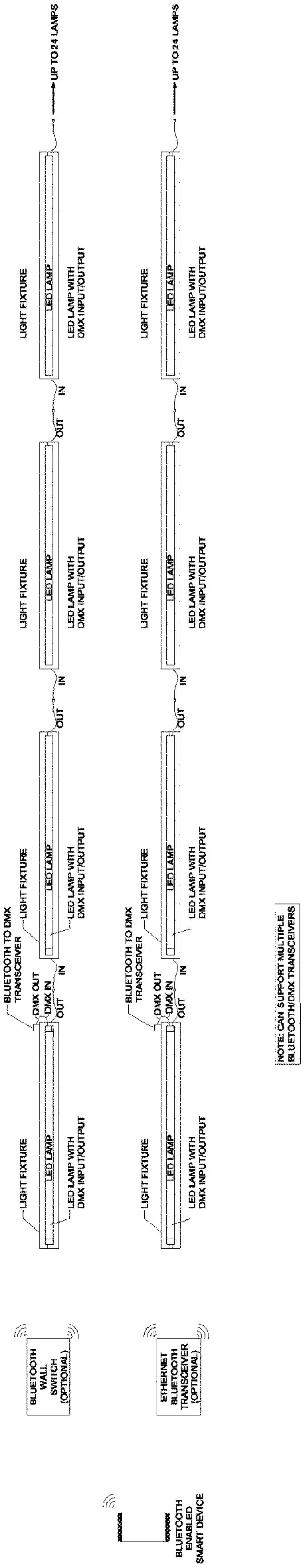
FIG. 21 illustrates a Bluetooth network for a light fixture having a control board to convert Bluetooth signals into DMX control signals, among others.
Figure 22:
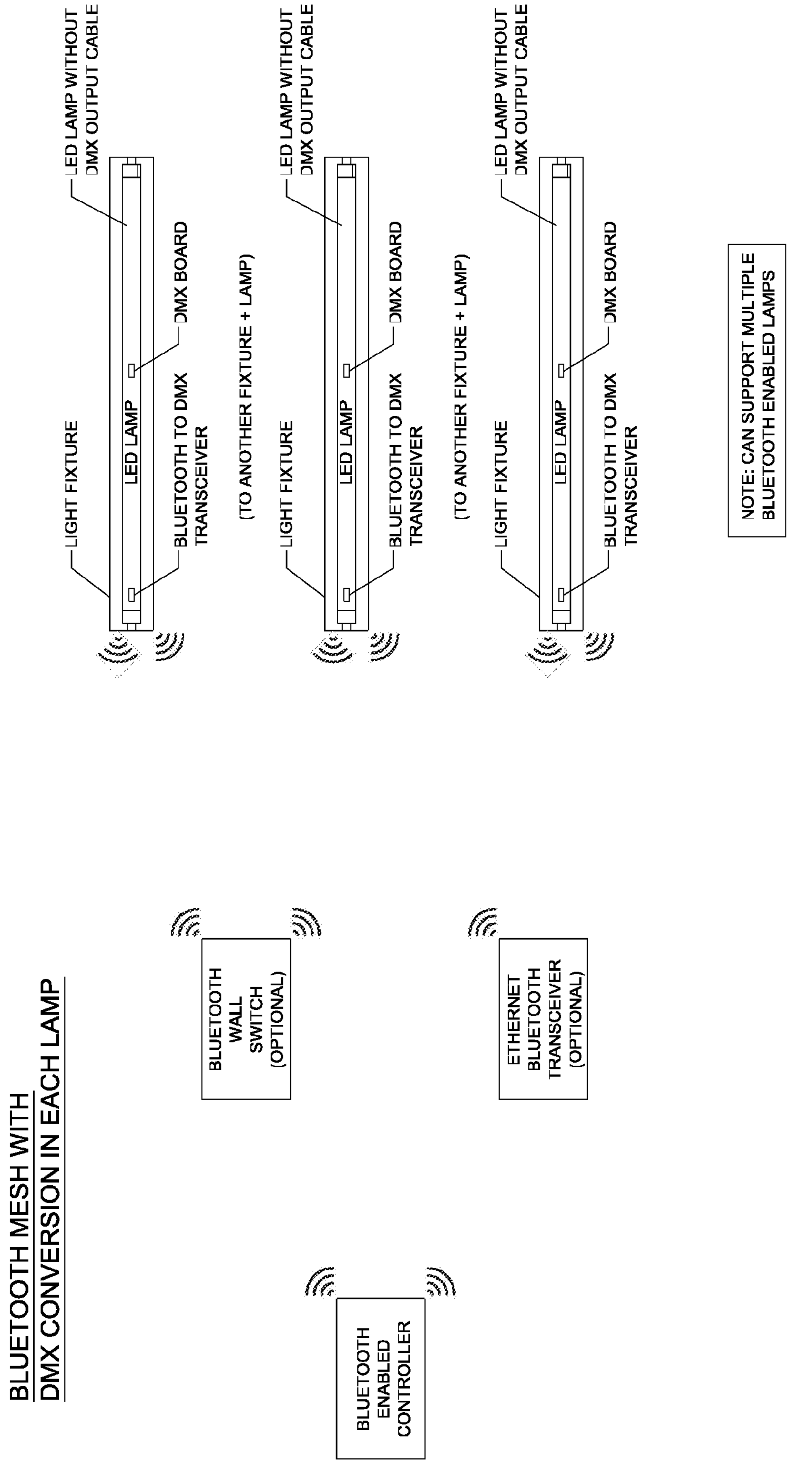
FIG. 22 illustrates a Bluetooth mesh network with DMX conversion capability in each lamp.

In yet another embodiment, Bluetooth control signals may be converted into DMX control signals (or other signal types) by adding a control board, as seen in FIG. 20, to the LED lamp or light fixture of FIG. 21. The conversion would allow DMX controlled LED lamps to be operated by a Bluetooth-enabled controller. The Bluetooth to DMX converter control board may be inserted into the LED lamp extrusion of a DMX controlled LED lamp. This control board would receive control signals from a Bluetooth-enabled controller and convert the signals to DMX to be processed by the built-in controller of the DMX controlled LED lamp, as seen in FIG. 22. A DMX controlled LED clamp would include a wired DMX output cable, so additional DMX LED lamps may be controlled by the one Bluetooth control board, as in FIG. 20.

Figure 38:
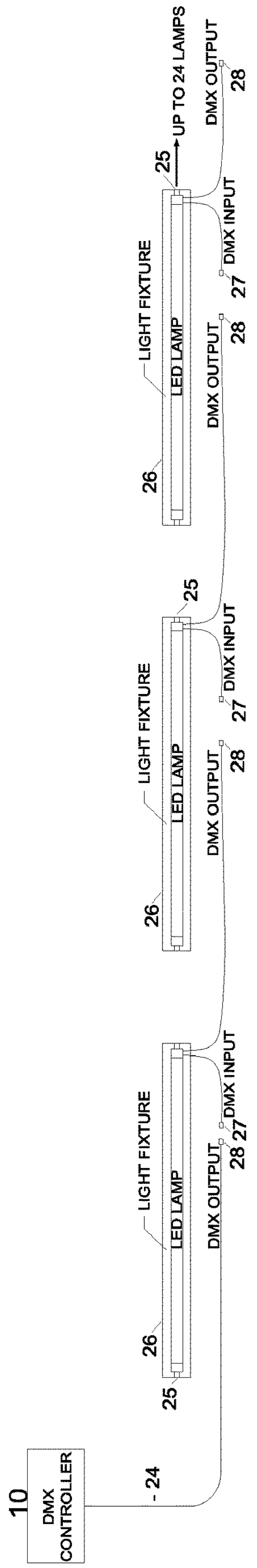
FIG. 38 illustrates a wired DMX connection of LED lamp connected via input and output cables connected to side low voltage end caps.

In one other embodiment, the LED lamp would use a wired DMX connection. The DMX wired connections may be from the input and output cables connected through the side of a low voltage end cap, as in FIG. 38, within a light fixture. The wired DMX cable on each lamp 25 may deliver control signals 24 to and from the lamps 25. The lamps 25 may be connected to the light control 10 and other LED lamps 25 using DMX input and output cables. The wired cable lengths may be long enough to be able to reach the next lamp (25) within a light fixture 26 and be able to reach the next lamp 25 or light fixture 26 when installed in a length-wise contiguous fashion, as in FIG. 38. The cable connectors may include male 27 and female 28 ends, with three, five, or more pins.

Figure 39:
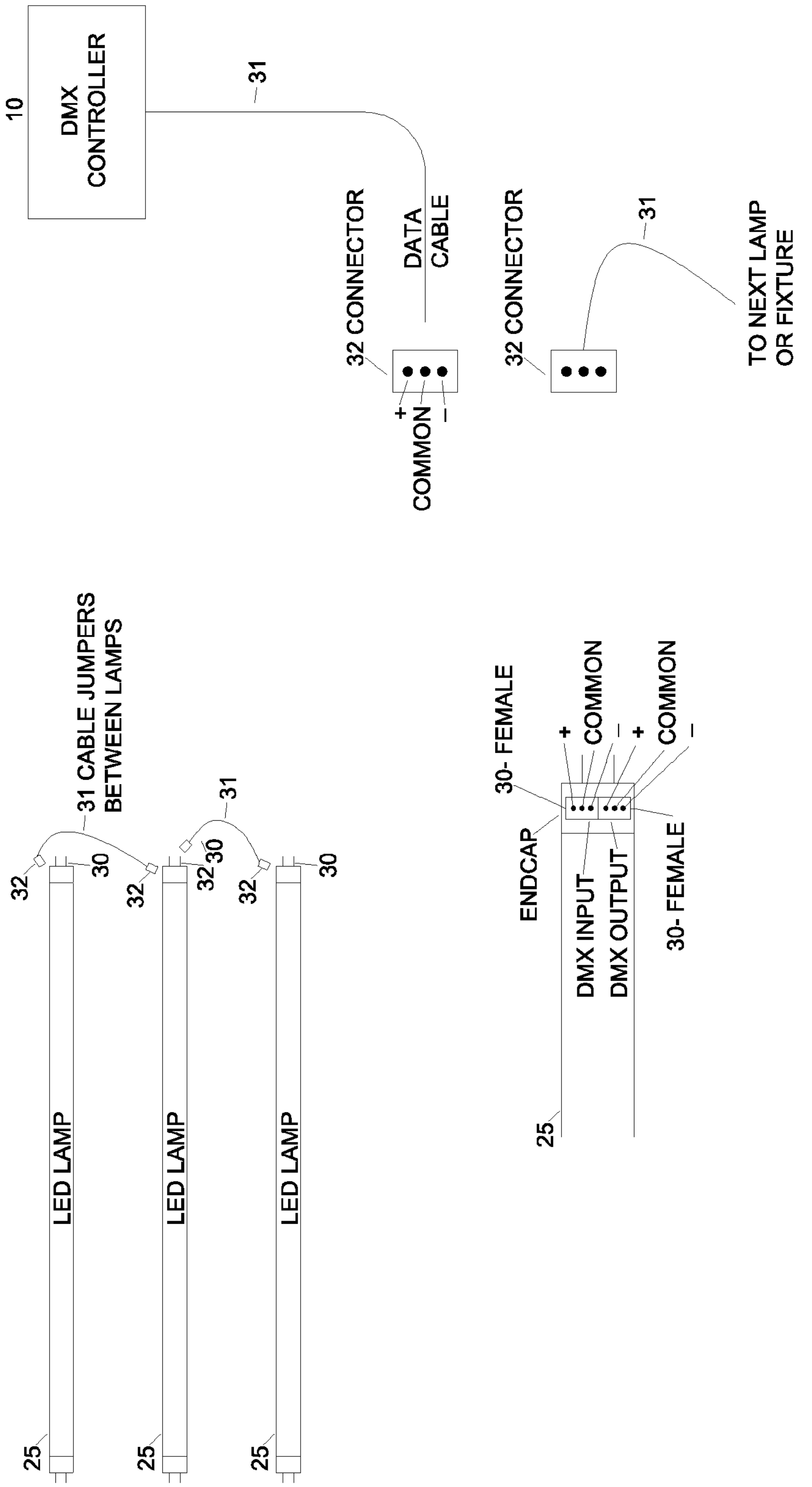
FIG. 39 illustrates an alternate wired DMX connection of LED lamp having a female connector installed in one end cap.
Figure 40:
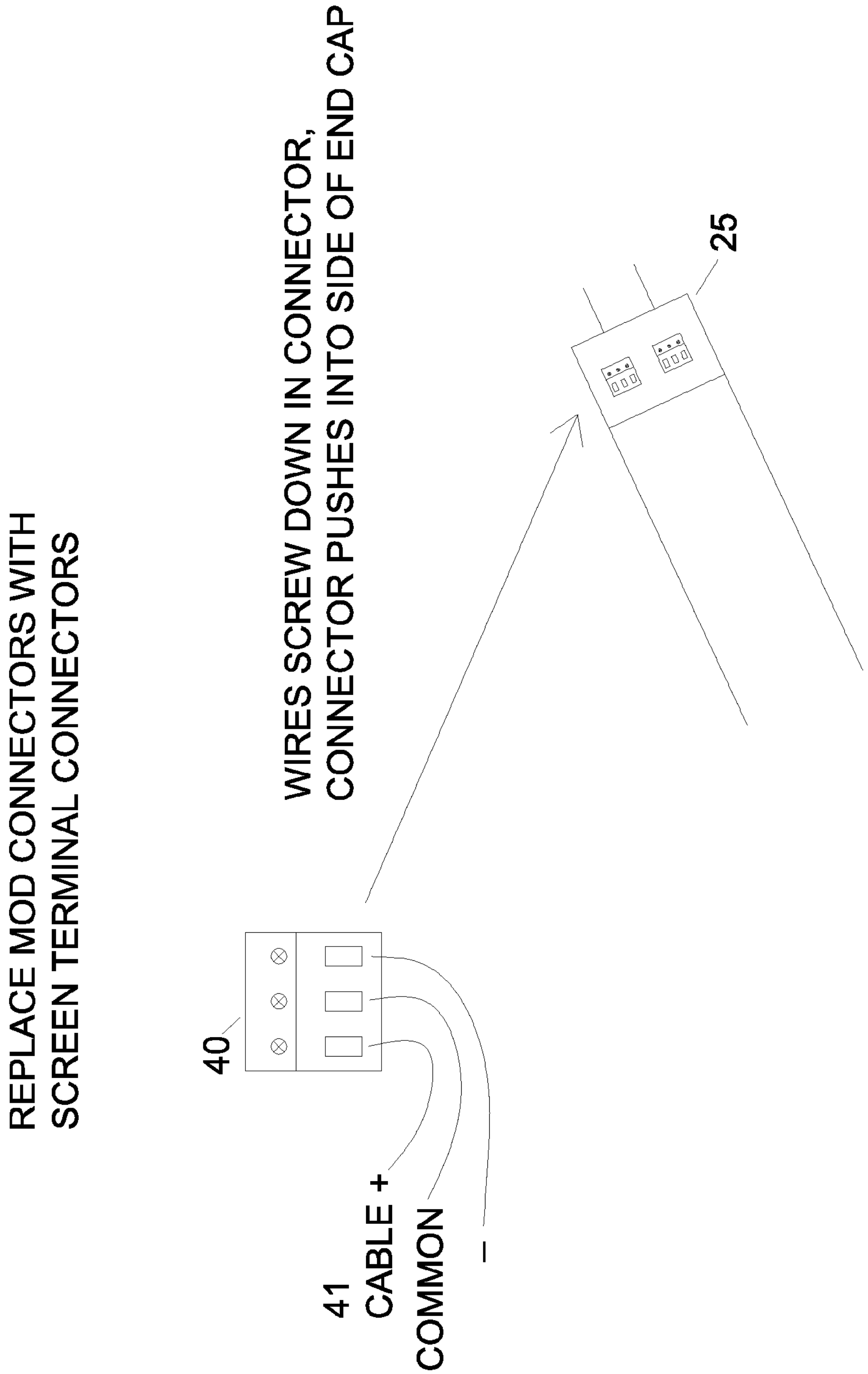
FIG. 40 illustrates an alternate wired DMX connection of LED lamp having screw terminals installed to facilitate connection of signal cables to LED lamp units.

FIG. 39 shows another example of a wired cable configuration may include wired cables to the end cap, wherein a female connector 30 is installed into one of the end caps, such that wire tails 31 of various lengths can be connected with a male mating connector 32. The cables 31 may include signal input and output cables with male 32 and female 30 connectors on the opposite ends of the cables. These connectors may be used to daisy chain additional lamps 25 together. In another example, FIG. 40, the male and female cable connectors 40 could include screw terminals for connecting signal cables 41 to the LED lamps 25.

Remote Device Management (RDM) may be utilized in some embodiments to coordinate management of remote devices. RDM is a protocol enhancement to USITT DMX512 that allows bi-directional communication between a lighting system controller and the attached RDM compliant devices over a standard DMX line. This protocol allows configuration, status monitoring, and management of networked devices. The USITT standard (ANSI/ESTA 1.20, Entertainment Technology—Remote Device Management over USITT DMX512) was developed by the ESTA Technical Standards Program and is designed for interoperability between many manufacturers. Since the RDM protocol travels on top of the DMX512 protocol, it has uses in architectural, entertainment, horticultural and germicidal lighting. This protocol changes the way LED lamps can be set-up and maintained.

RDM can provide identification and classification of connected LED lamps, addressing of LED lamps controllable by DMX512, status reporting of LED lamps or other connected devices by reporting on additional features (temperature, communication, and operating information) that may be added to the RDM/DMX control board. It can also provide information on the configuration of LED lamps and other DMX devices, including sending specific default programs to LED lamps to be used when the DMX control signals are not present. Using RDM-enabled controllers with RDM-enabled LED lamps eliminates the need for separate DMX addressing units. An RDM-DMX enable printed circuit board (PCB) may be used inside the extrusion of the LED lamp. Addressing and all system control configuration may be done by an RDM enabled DMX controller.

After receiving the DMX control signal, the DMX converter 106 can convert the control signal into a local lamp control signal and transmit that local signal to lamp 104. For example, the local control signal may include an instruction to flash a certain color (e.g., flash red or blue), to dim, to display a combination of colors, or other similar instructions commonly received and implemented by an intelligent lighting fixture.

It should be noted that FIG. 1 includes a single lamp 104 by way of example only. A fixture may be designed such that multiple numbers of lamps are included, e.g., two or four total lamps, or more or fewer lamps. In such a fixture, the output of power supply 102 would be provided to each lamp, as would the local lamp control signal as output by the DMX converter 106. FIG. 3 provides an example of a multi-lamp fixture, and the related disclosure as included below includes additional detail.

FIG. 2 depicts a diagram illustrating a lighting fixture system 200 according to an embodiment. System 200 is similar to system 100 as shown in FIG. 1 in that an LED lamp may be retrofit in an existing fixture and modified accordingly to include DMX communications. However, in system 200, the DMX converter has been integrated as a component of the lamp, thereby further increasing the ease of retrofitting an existing light fixture.

The lighting fixture system 200 may include, for example, a power supply 202, a lamp 204, and a DMX controller 206. Similar to above, depending upon the installation of the lighting fixture, lamp 204 may be, for example, an RGB lamp or an RGBW lamp.

As shown in FIG. 2, the power supply 202 may be operably connected to a power input and configured to produce a suitable output voltage for operation of the lamp 204. Additionally, through the power connection to the lamp 204, the power supply may further provide power for the integrated DMX converter. In operation, the DMX controller 206 may send one or more instructions as a DMX control signal to a network of connected devices. As shown in FIG. 2, the DMX control signal may be transmitted directly to the lamp 204 for further processing by the integrated DMX converter. For example, the lamp may be designed and manufactured to provide an input plug or other physical connection component for operably connecting the lamp 204 and the DMX controller 206. Alternatively, the lighting fixture itself may be retrofit or otherwise designed to include an input component for establishing an operably connection between the lamp 204 (and the integrated DMX converter) and the DMX controller 206. Like before, the integrated DMX converter can have an associated address and, based upon that address, can determine which instructions of the DMX control signal are intended for the lamp the DMX converter is integrated in, e.g., lamp 204 as shown in FIG. 2. The DMX converter can then convert the control signal into a local lamp control signal for controlling operation of the lamp 204.

More specifically, the LED light tubes use an external DMX address unit. The address unit connects to the DMX input of the LED light tube. The DMX address is then selected on the address unit. Then the address unit sends the selected address to the LED light tube. The LED light tube then stores and responds to the selected DMX address. The DMX address unit can be used for all LED light tubes with internal DMX converters.

While some of the embodiments are described using a ballast, it is recognized that the system may be operated without a ballast by wiring the fixture tombstones direct to line voltage. It is noted that a fixture tombstone may also be referred to herein as a socket, lamp socket, holder, and/or lamp holder. The lamp may automatically switch to the correct line voltage being supplied. The DMX converter is built-in to the light tube. The light tube may not need a separate external power supply or ballast. For retro fit applications, the ballast is by passed and not used. For new installations, the light fixture may include the frame with tombstones wired directly to line voltage. All of the electrical and DMX components can be built into the LED light tube.

FIG. 3 depicts a diagram illustrating a lighting fixture system 300 according to an embodiment that builds upon, for example, system 200 as shown in FIG. 2 by incorporating multiple lamps. The lighting fixture system 300 may include, for example, a power supply 302, multiple lamps 304*a*, 304*b* through 304*n*, and a DMX controller 306. Similar to above, depending upon the installation of the lighting fixture, lamps 304*a*, 304*b*, . . . , 304*n* may be, for example, RGB lamps, RGBW lamps or some combination thereof.

As shown in FIG. 3, the power supply 302 may be operably connected to a power input and configured to produce a suitable output voltage for operation of each of the lamps 304*a*, 304*b*, . . . , 304*n*. The power supply may power multiple low voltage LED light tubes with a large low voltage power supply. A multi-conductor cable may be used to deliver the low voltage to power the tombstones of the light fixtures and the LED light tubes.

Additionally, through the power connection to the lamp 304, the power supply may further provide power for an integrated DMX converter integrated within each of lamps 304*a*, 304*b*, . . . , 304*n*. In operation, the DMX controller 306 may send one or more instructions as a DMX control signal to a network of connected devices. As shown in FIG. 3, the DMX control signal may be transmitted directly to lamp 304*a* for further processing by the integrated DMX converter at that lamp. Additionally, the DMX converter within lamp 304*a* may be configured to output the DMX control signal to the DMX converter integrated within lamp 304*b*. Similarly, each integrated DMX converter may be configured to output the DMX control signal to another lamp. To provide for connectivity, each lamp may be designed and manufactured to provide an input plug or other physical connection component for operably connecting the lamp 304*a* and the DMX controller 306. Similarly, each lamp may also include an output plug or physical connection for operably connecting one lamp to another for transferring the DMX control signal. For example, the output of lamp 304*a* may be operably connected to the input of lamp 304*b*.

Figure 33:
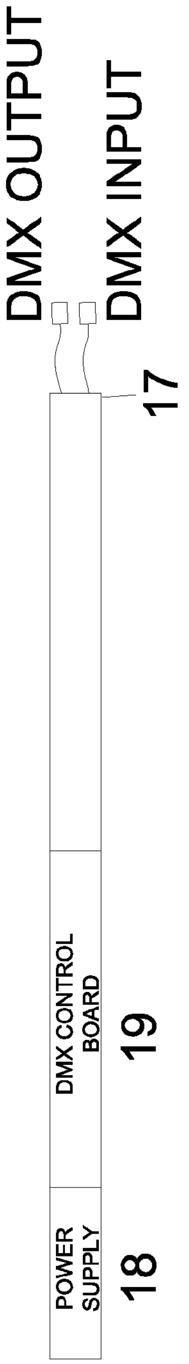
FIG. 33 illustrates an integrated power supply unit supporting wired DMX communication without Remote Device Management.
Figure 34:
FIG. 34 illustrates an integrated power supply unit supporting wired and wireless DMX communication with or without Remote Device Management.
Figure 35:
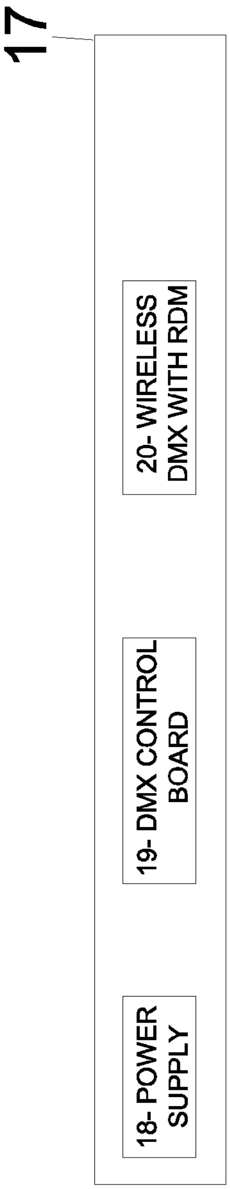
FIG. 35 illustrates an integrated power supply unit supporting wireless DMX communication with or without Remote Device Management and no DMX wired input or output control cables.
Figure 36:
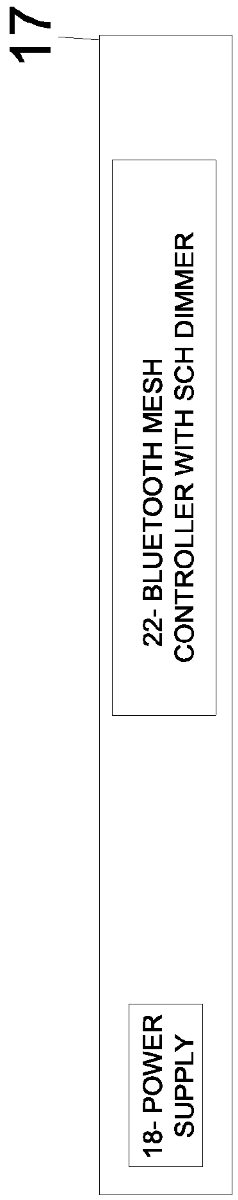
FIG. 36 illustrates an integrated power supply unit supporting wireless Bluetooth mesh control with five channels of 12-24 VDC dimming channels for constant voltage LED loads.
Figure 37:
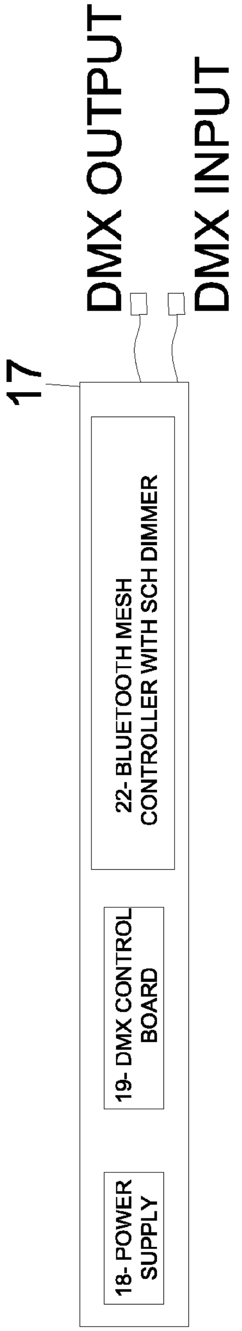
FIG. 37 illustrates an integrated power supply unit supporting Bluetooth mesh to wired DMX connections.

In some embodiments, the power supply and control modules may be combined into one unit or printed circuit board in order to reduce cost and ease of installation of the equipment within the LED lamp. Combined power supply and control module variants include a power supply 18 in conjunction with wired DMX 19 with or without RDM as in FIG. 33, with wired and wireless DMX 20 with or without RDM as in FIG. 34, wireless DMX 20 with 21 or without RDM and no DMX wired input or output control cables as in FIG. 35, wireless Bluetooth mesh control 22 with five channels of 12-24 VDC dimming channels for constant voltage LED loads and no control cables as in FIG. 36, and bluetooth mesh to DMX 22 wired output connections as in FIG. 37.

Figure 55:
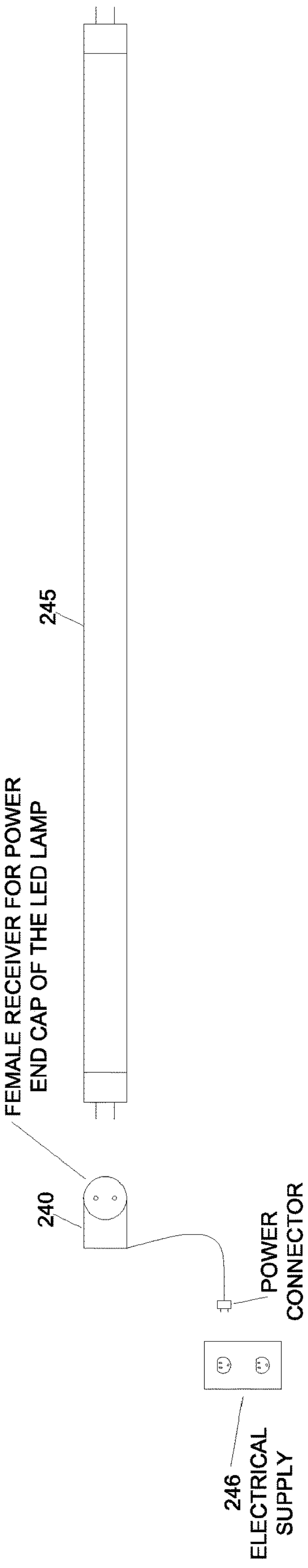
FIG. 55 illustrates a power cord adapter for connecting LED lamps to an electrical supply.
Figure 56:
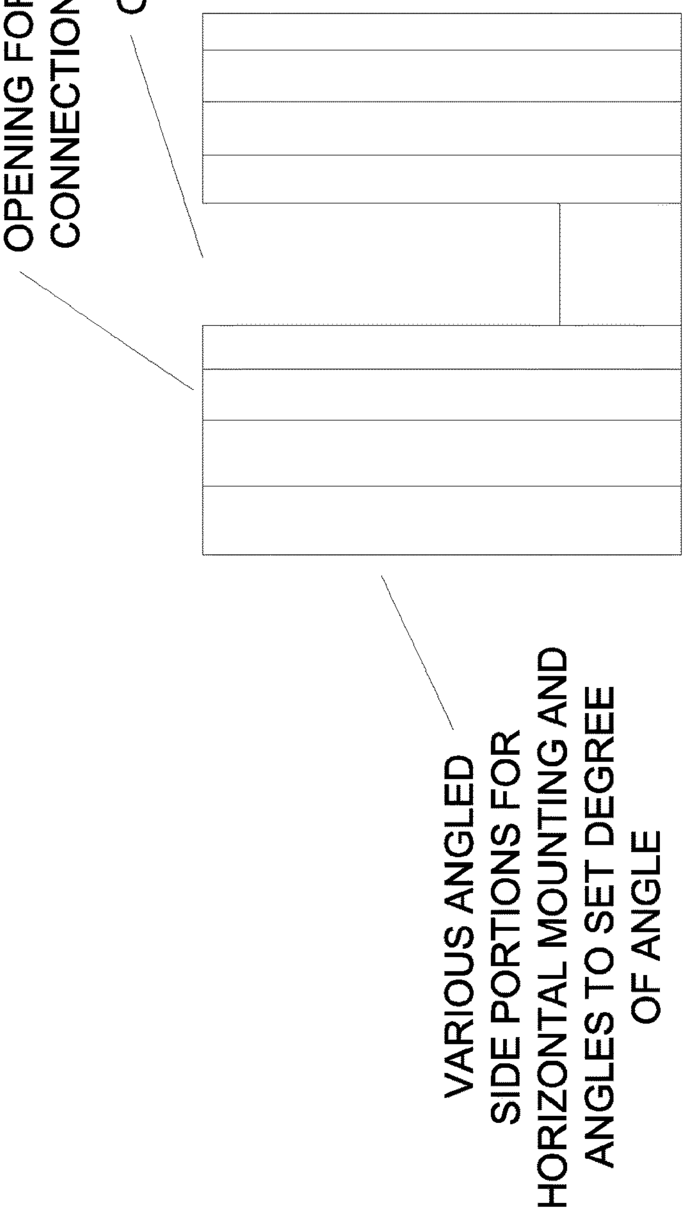
FIG. 56 illustrates a mounting unit for LED light fixtures.

FIG. 55 illustrates power supplies, which may be comprised of single end power 240, female, end caps with power cords for plugging the LED lamp 245 into a power outlet 246. The power end cap 240 securely fits over the male power end of the lamp 245. The power end cap 240 may include two female receiving opening for the two power pins of the high voltage end cap of the LED lamp 245. This will provide electrical power to energize a single lamp 245. This power adapter end cap 24 may have the power cable exit the side of the end cap. The opposite end of the power adapter end cap 24 may be a male end and made to fit into a female, receiving base of a flat surface floor or table top stand, as seen in FIG. 56.

Figure 57:
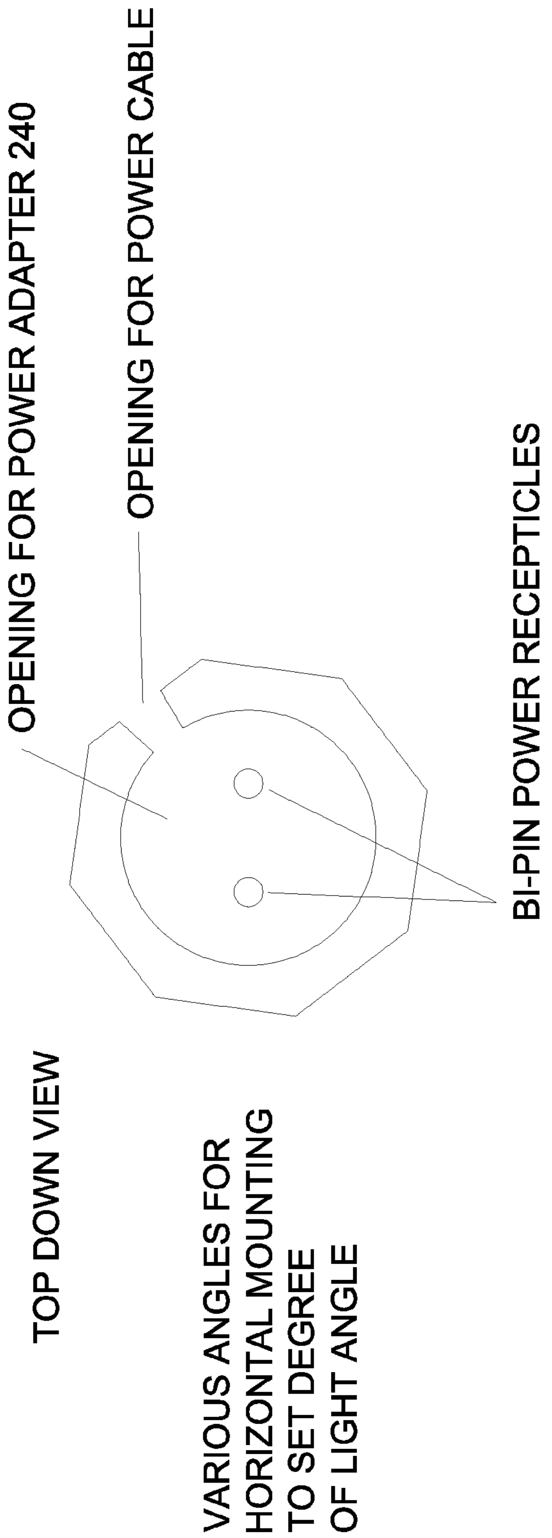
FIG. 57 illustrates a slide piece to facilitate a mounting unit receiving a power cable.
Figure 58:
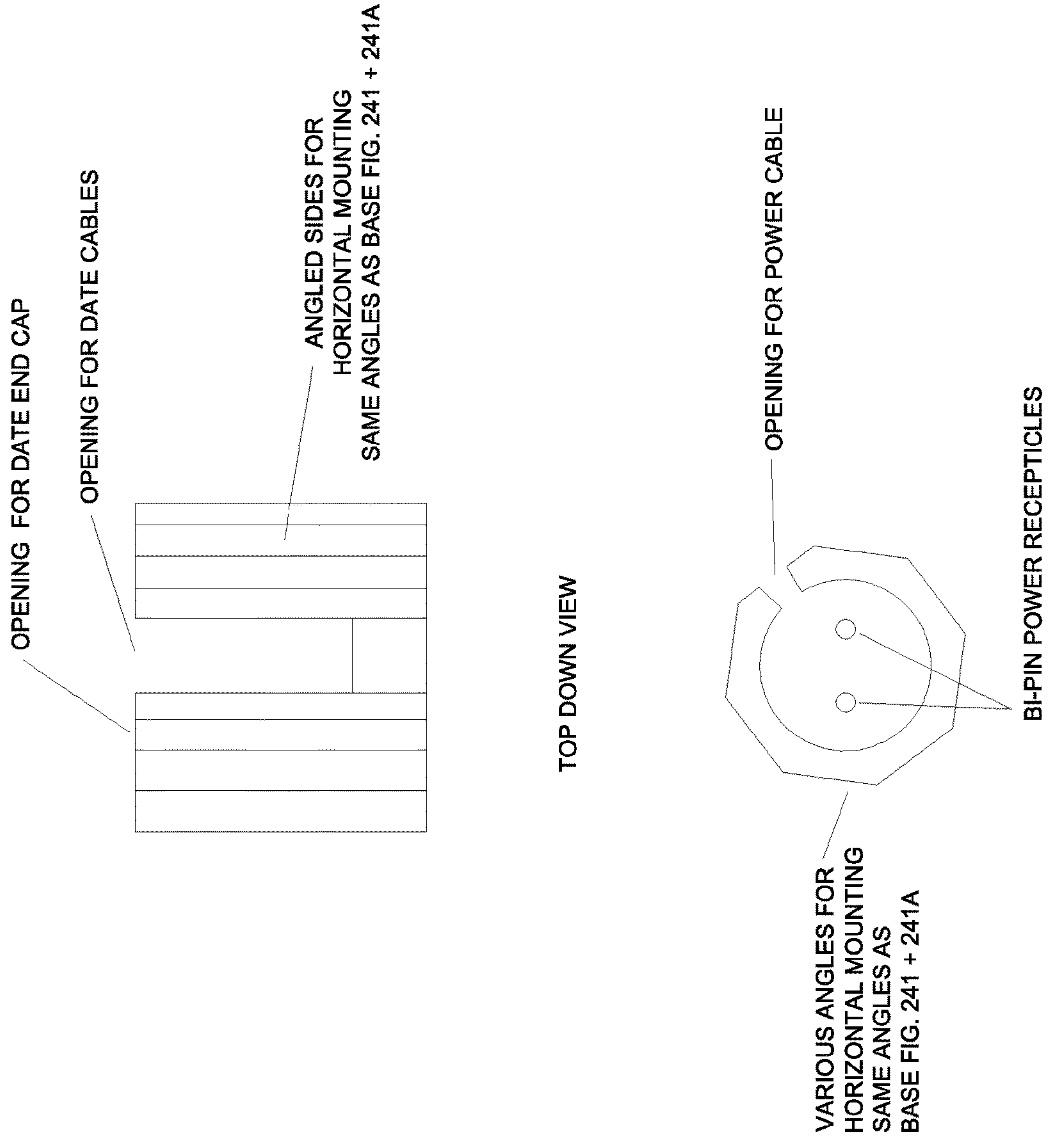
FIG. 58 illustrates a female receiving cap configured to fit over an LED lamp end cap.
Figure 59:
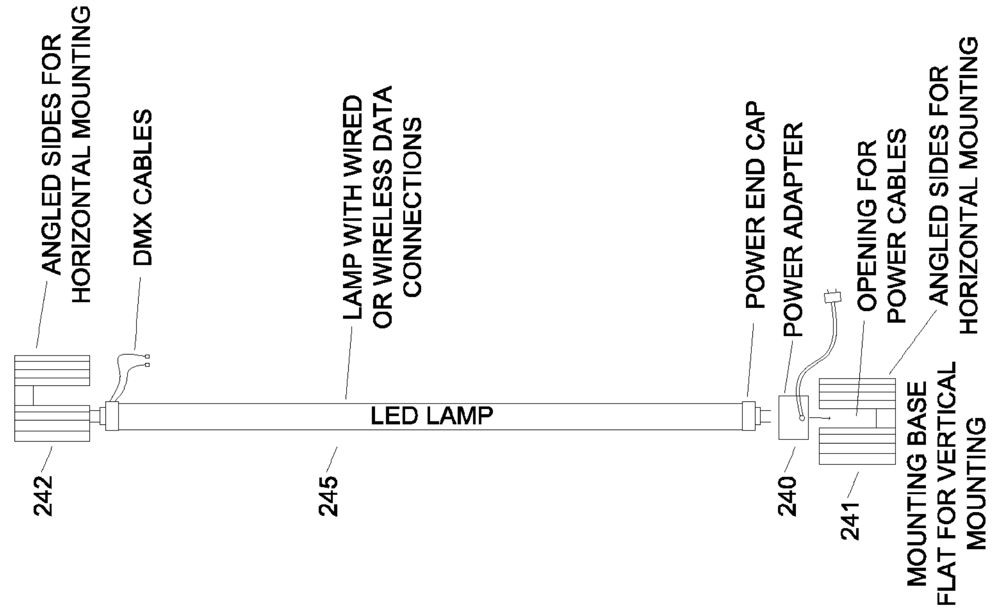
FIG. 59 illustrates an LED lamp and power end cap mounted vertically.
Figure 60:
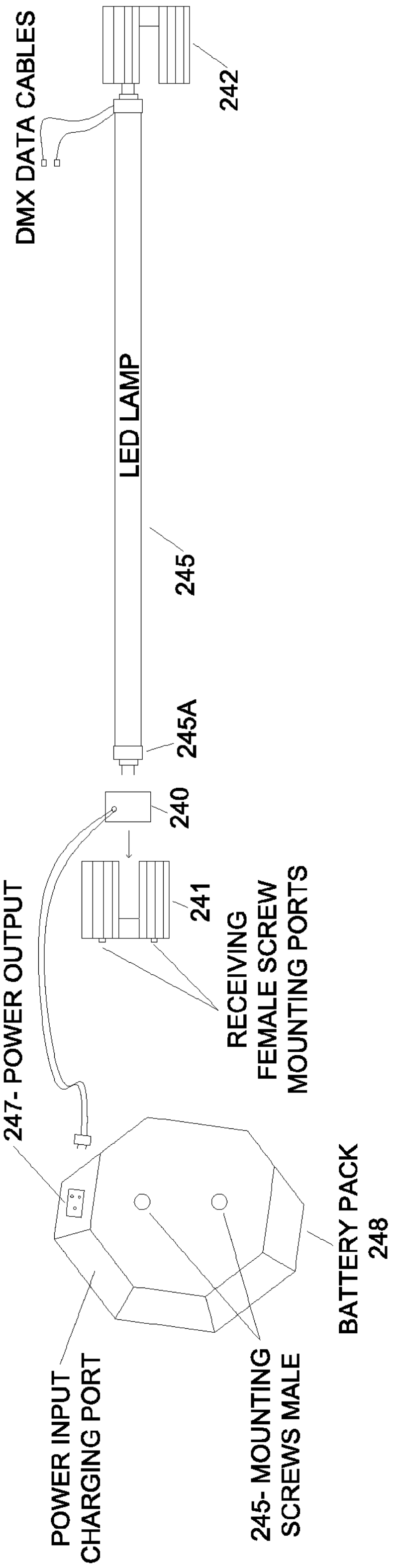
FIG. 60 illustrates a rechargeable battery unit for an LED lamp.

FIG. 59 shows a mounting base 241 that includes a large flat base so the lamp 245 and the power end cap 240 can be stood up vertically on its end. The mounting base 241 includes an opening to allow for the power cable to slide into the stand as seen in FIG. 56, FIG. 57. The non-powered LED lamp end cap may include a similar female receiving cap, shown in FIG. 58, that may fit over the lamp 245 end cap with bi-pins and optional data cables to secure and conceal the pins, making the end cap of the LED lamp 245 secure and decorative when used with a mounting base. The mounting base 241 may also include flat sides at various angles so that the lamp 245 may be used horizontally. These various angles allow for selection of the degree of the angle of the lamp 245, creating utility in lighting walls or performers, and facilitating a secure way to angle the lamp 245. The mounting base 241 can also be fabricated to include a female opening for screws to connect to a rechargeable battery 248 as shown in FIG. 60. The LED lamp power connector can then plug into the battery powered stand receptacle 247. The battery powered unit 248 may be used for temporary lighting productions. The lighting control may be from the wired or wireless connections included with the LED lamp.

Figure 47:
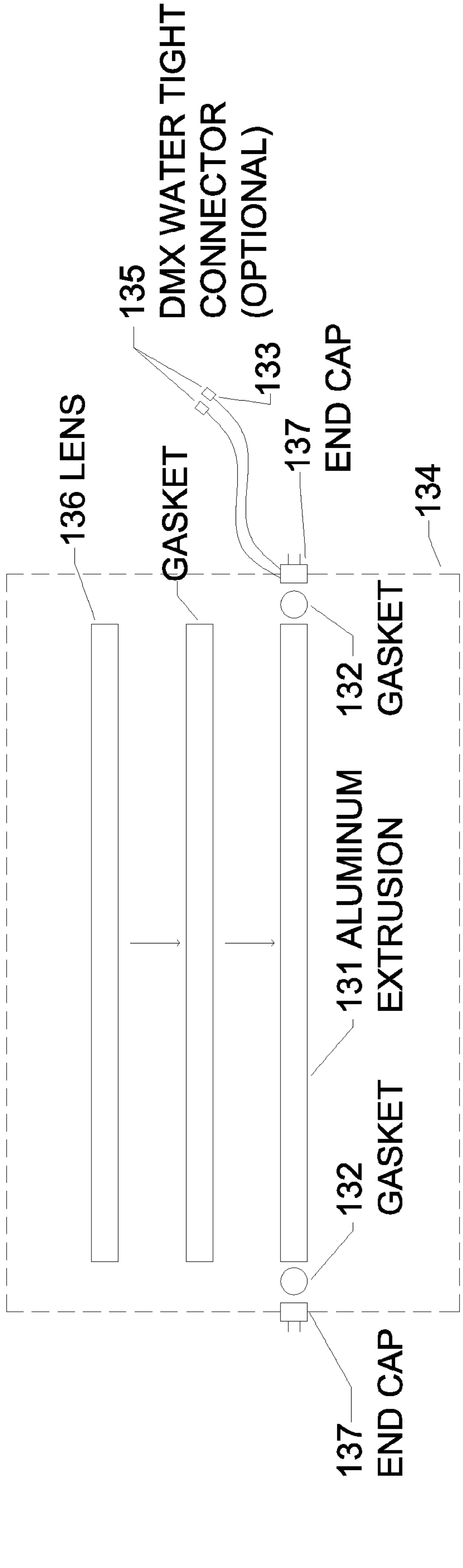
FIG. 47 illustrates an LED lamp having ingress protection measures installed.

FIG. 47 illustrates how an LED lamp extrusion 131 may also be made with various levels of ingress protection, including gaskets 132, silicon 133, and shrink materials 134 to secure the LED lense 136 and end caps 137. Water resistant data connectors 135 are included on all wired data connections.

Figure 61:
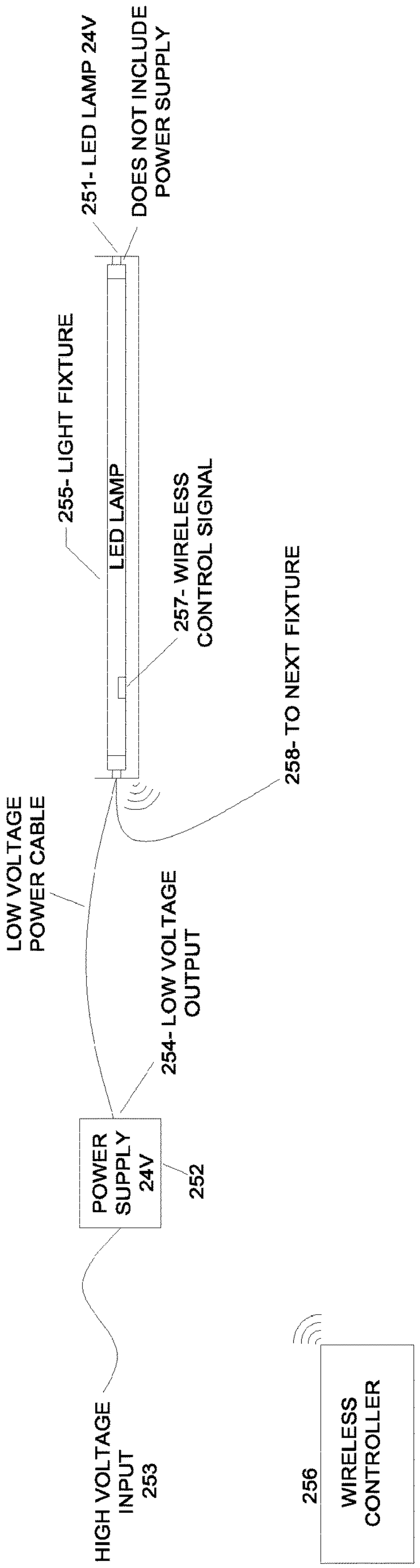
FIG. 61 illustrates an external power supply configuration for an LED lamp.

FIG. 61 illustrates LED lamps 251 that may be powered by twenty-four volt from an external power supply 252. The power supply 252 may be a high voltage 253 converted to a low voltage 254 then distributed to the light fixtures 252 and lamps 251. The power connections may be the same as the high voltage fixtures and lamps 251. The larger the power supply 252, the larger quantity of fixtures 258 and lamps 251 that could be energized by the power supply 252. One of the benefits of this low voltage configuration is minimal need to use a high voltage electrical contractor for installation. The lighting control 256 may be from the wired or wireless connections 257 included with the LED lamp 251.

Figure 62:
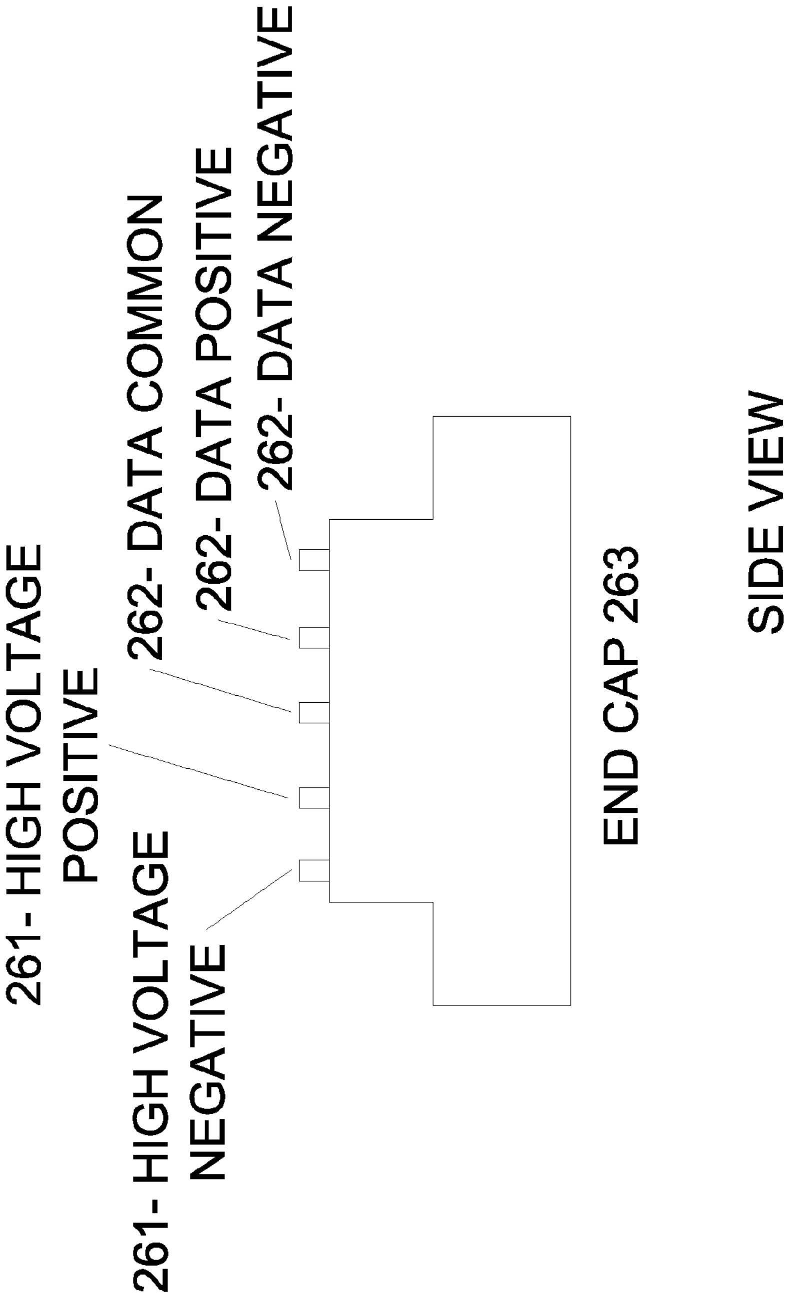
FIG. 62 illustrates an end cap having power and data connections on the same multi-pin connector.
Figure 63:
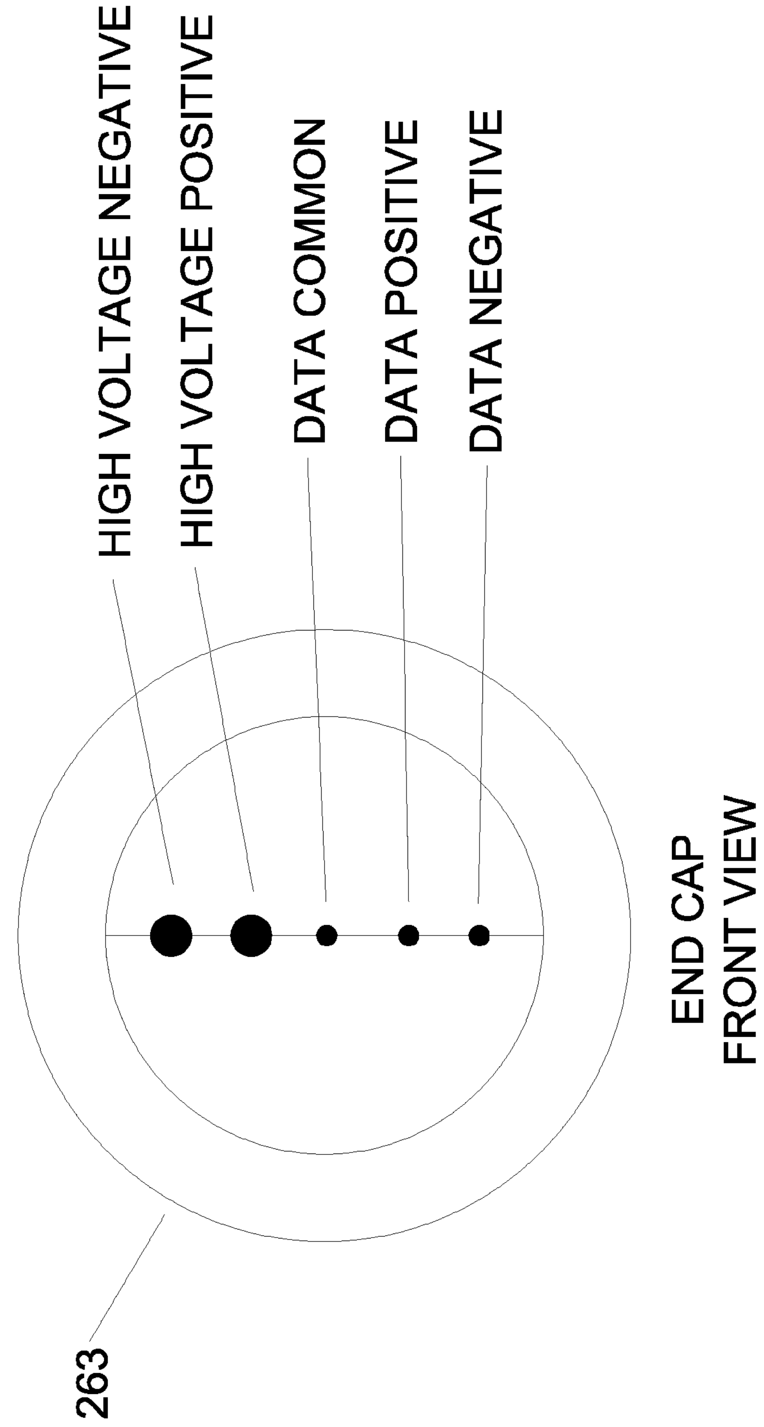
FIG. 63 illustrates an end cap having five pins positioned linearly.
Figure 64:
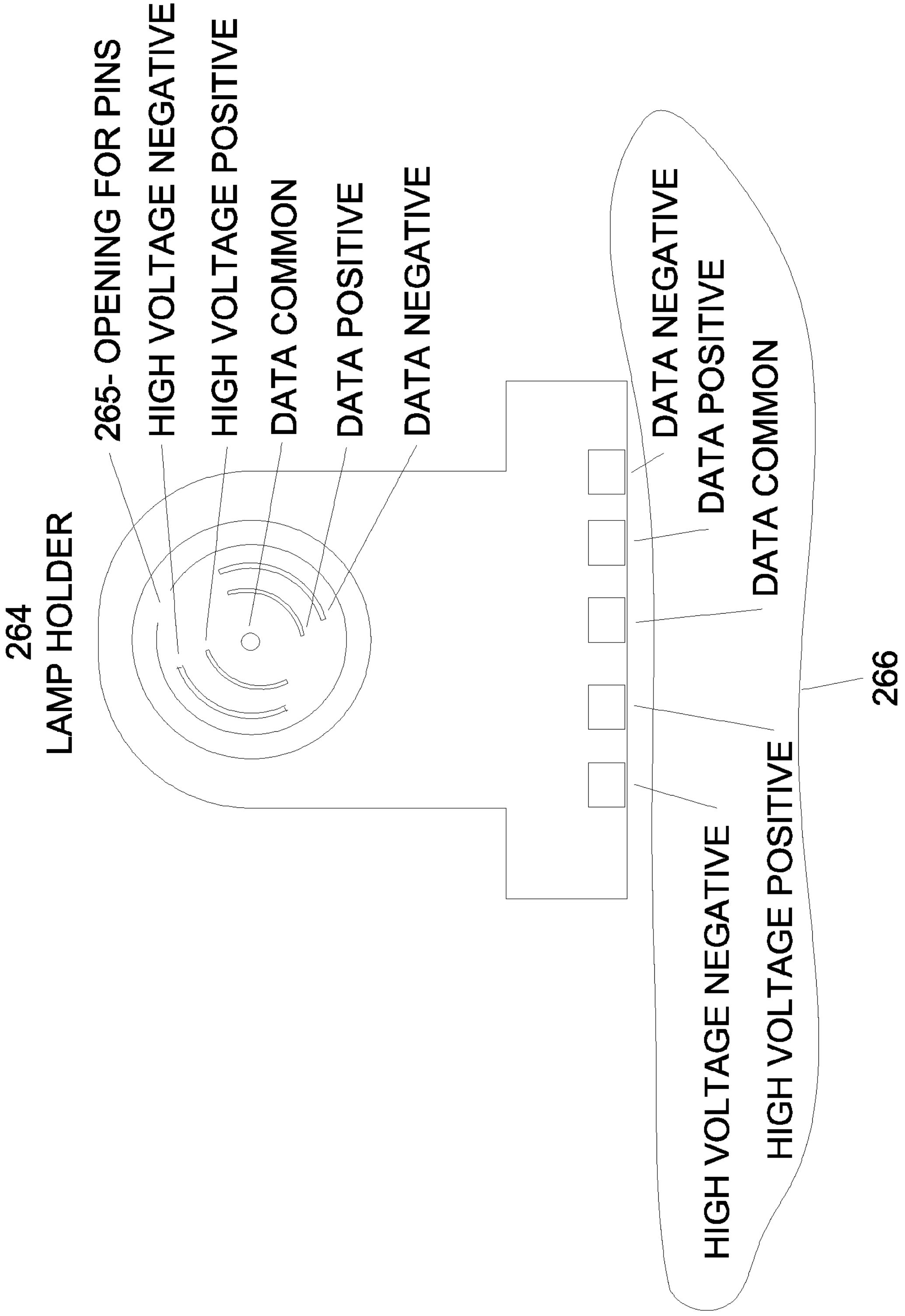
FIG. 64 illustrates a lamp holder having five female receiving connections to connect the power and data of an LED lamp.

FIG. 62 shows a configuration in which power and data may be transferred on the same multi-pin connector. Similar to a three pin data connection, this configuration may include power and data on the same end cap. There may be two pins for high voltage power 261 and three pins for low voltage data connections 262. The five pins may be in a straight line across the end cap, as seen in FIG. 63. FIG. 64 shows a lamp holder with five female receiving connections 265 may connect the power and data of the lamp. The high voltage pins may be larger in diameter than the low voltage data pins 262. The openings in the lamp holder 264 may be matched to the diameters of the pins 261, 262. Therefore, only the correct sized pin could be input into the lamp holder (264). The high and low voltage cable connections 266 may be at the base of the lamp holder (264). Once matched, the lamp may then be twisted into the lamp holder the power and data connections would be made.

Figure 65:
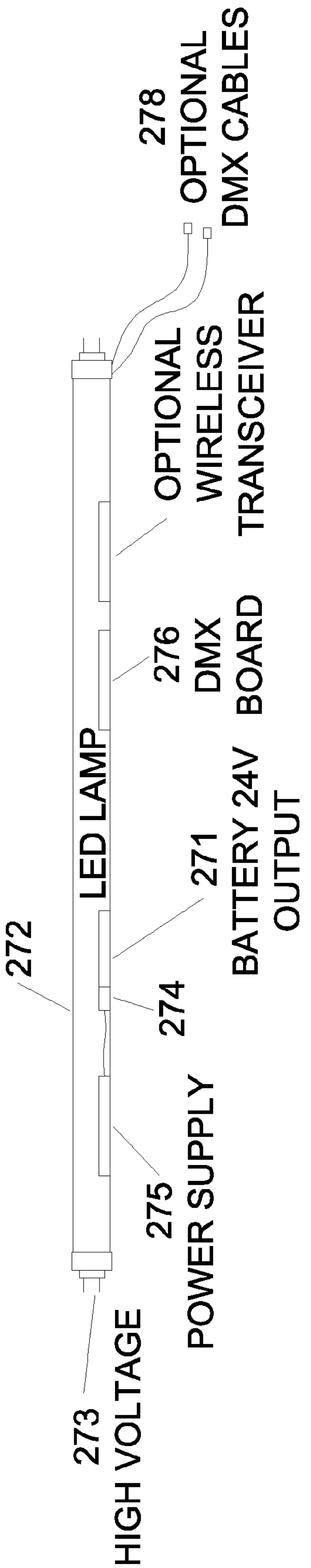
FIG. 65 illustrates an integrated battery back-up configuration for an LED lamp.

FIG. 65 illustrates an integrated battery back-up 271 that may be included for life safety. A battery backup 271 may be installed into the LED lamp aluminum extrusion 272. The battery 271 may be charged while the lamp 272 is connected to high voltage electrical power 273. If a power outage occurs, the battery control board 274 may switch the power to the battery backup 271 to energize the LED lamp 272. While the LED lamp 272 is energized by the battery power, it may use a default lighting program of the DMX board 276 for its output color. The LED lamp 272 may stay energized by the battery backup 271 until the battery is exhausted or the high voltage power 273 is returned. When high voltage is returned, the battery backup may go back to the charging mode, so it is recharged and ready for the next outage. A wireless transceiver 277 or wired DMX data cable connections 278 could be utilized for lighting control.

Similar to above, for each lamp, the integrated DMX converter can have an associated address and, based upon that address, can determine which instructions of the DMX control signal are intended for the lamp the DMX converter is integrated in, e.g., one of lamps 304*a*, 304*b*, . . . , 304*n* as shown in FIG. 3. The DMX converter can then convert the control signal into a local lamp control signal for controlling operation of the lamp in which it is integrated.

As shown in FIGS. 1-3, the power supplies 102, 202, 302 may be configured to receive a power input and produce an appropriate output for the various lamps and other components. Such an arrangement may be included in a low-voltage operation such as a 12 volt power system. However, the fixtures, systems and techniques as described herein may be applied to higher voltage systems as well. For example, rather than a standard power supply, an inductive ballast or a resistive ballast may be used for a higher voltage operation, such as 90-277 VAC 50/60 Hz power systems.

FIG. 4 illustrates a system 400 that includes an inductive ballast 402 for receiving a line voltage (e.g., 120 VAC at 60 Hz) and outputting appropriate power levels for operation of lamps 404*a* and 404*b*.

Similar to FIG. 3, a DMX controller 406 may send one or more instructions as a DMX control signal to a network of connected devices. As shown in FIG. 4, the DMX control signal may be transmitted directly to lamp 404*a* for further processing by the integrated DMX converter at that lamp. Additionally, the DMX converter within lamp 404*a* may be configured to output the DMX control signal to the DMX converter integrated within lamp 404*b*.

As described above, for each lamp, the integrated DMX converter can have an associated address and, based upon that address, can determine which instructions of the DMX control signal are intended for the lamp the DMX converter is integrated in, e.g., one of lamps 404*a*, 404*b* as shown in FIG. 4. The DMX converter can then convert the control signal into a local lamp control signal for controlling operation of the lamp in which it is integrated.

Absent an instruction or control signal from a DMX controller (e.g., DMX controller 108 as shown in FIG. 1), the lighting fixtures and systems as described herein may be configured to operate in a standard operating mode. In such a mode, the LED lamps may be configured to simply output a white light, or some possible color of light as determined based upon what type of LED light tube is used in construction of the lamp. For example, if the LED lamp uses RGB light tubes, absent a DMX instruction the lighting fixture may output an approximated white light as created by using a combination of the red, blue and green LEDs. Conversely, if the LED lamp uses RGBW light tubes, absent a DMX instruction the lighting fixture may output a true white light by utilizing only the white LEDs or any combination of color and wavelength using other types of LEDs.

Additionally or alternatively, the lighting fixtures and systems and described herein may also include a local memory for storing one or more built-in programs for outputting a specific lighting pattern or effect when there is no specific DMX control signal or instruction. For example, a localized controller may load a built-in program when a DMX control signal is not present, and run the local built-in program accordingly until, for example, the program is complete or the fixture receives a new or updated DMX control signal. Similarly, multiple fixtures may be operably connected such that a common built-in program is performed by each fixture simultaneously, thereby providing integrated lighting effects without a specific DMX control signal. In another example, the built-in programs may be configured with a default output light show that is used when a DMX control signal from an external light controller is unavailable. That is, the LED lamps may emit light based on a control signal from the localized controller. The control signal from the localized controller may be factory set and may be specific to the type of LEDs used in the LED lamp. For example, the localized controller may send a default control signal to the LED lamp to turn on the white LEDs in the LED lamp and emit white light. Thus, the LED lamp can emit white light when the LED lamps are installed in the lamp fixture and the control cables and/or external controller are not yet installed. In one or more cases, a fire alarm triggered relay may be connected in-line with the external lighting control power. When a fire alarm is triggered, the external controller is powered off and the LED lamps default to one or more built-in programs. For example, the LED lamp may receive a default signal from the internal controller to emit white light.

Figure 5:
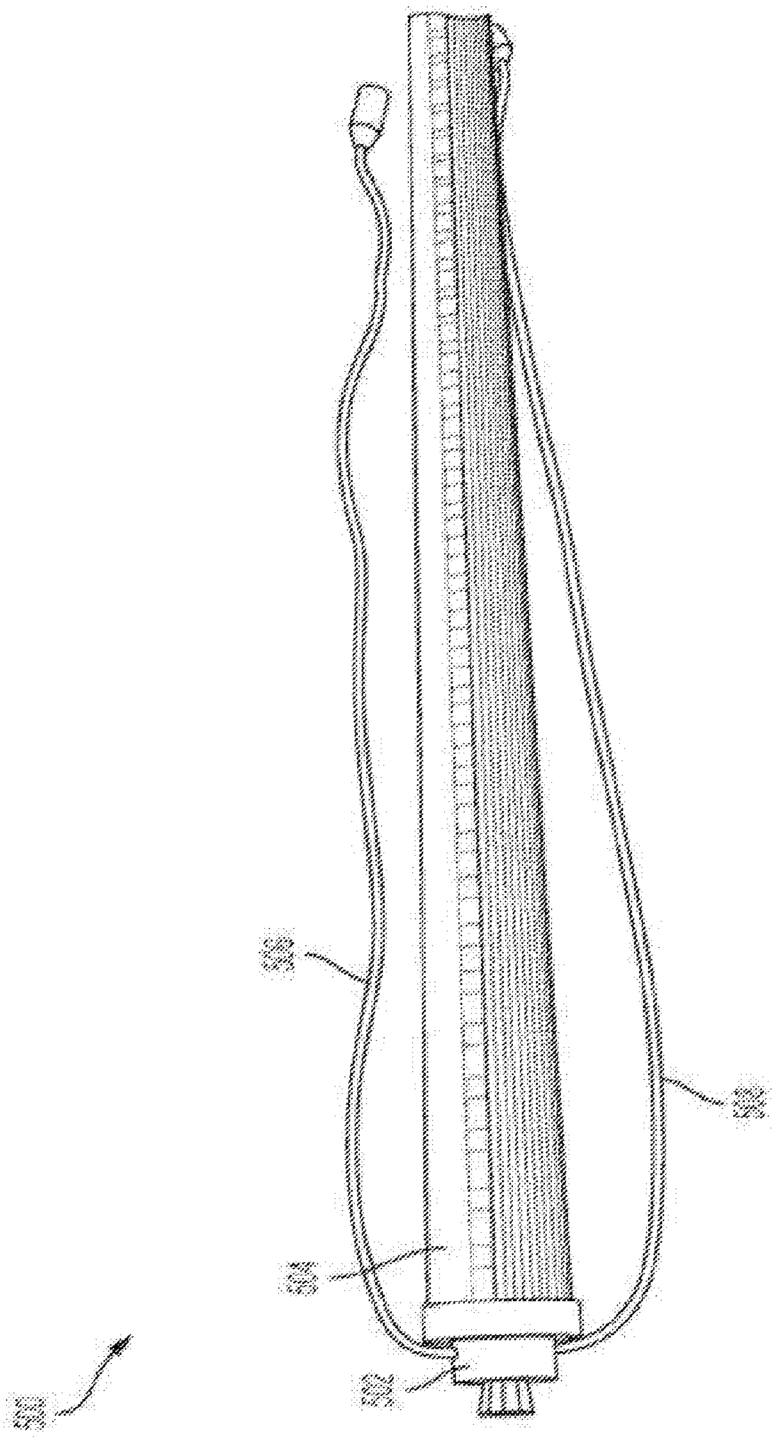
FIG. 5 depicts a sample lamp according to an embodiment.

FIG. 5 illustrates a sample lamp 500 for use in a fixture as described herein. For example, the lamp 500 may be incorporated into one or more of systems 100, 200, 300 and 400 as shown in FIGS. 1-4 and described above. The lamp 500 includes a base 502 configured to establish a connection between the fixture the lamp is installed in and the lamp itself, thereby providing power to the lamp for illuminating a light tube 504 of the lamp. As described above, the light tube 504 may include one or more LED light strip combinations including, for example, RGB LEDs, RGBW LEDs, W LEDs, UV LEDs, or any LED combinations and lighting wavelength described herein.

According to one or more embodiments as described herein, the base 502 may also include a local DMX converter, similar to the local DMX converter as shown in lamp 204 of FIG. 2. The local DMX converter may receive a DMX control signal via a DMX input line 506 and process the control signal to determine if the control signal is intended for lamp 500. If the local DMX converter determines the control signal is intended for lamp 500 (e.g., via a comparison of addressing information contained within the DMX control signal), the local DMX converter may further process the control signal to determine what effect the lamp 500 is being instructed to output. The local DMX converter can output the local DMX control signal to one or more additional lamps via a DMX output line 508. As described above, absent a DMX instruction the lamp 500 may output a true white light by utilizing only the white LEDs (if available) or any color from the built-in programming from the DMX converter.

Additionally or alternatively, a lamp such as lamp 500 may include ultraviolet (UV) LEDs. For example, the white LEDs (e.g., in a RGBW lamp) can be replaced by UV LEDs. In another example, UV LEDs may be added to an existing lamp rather than replace one or more of the existing colored LEDs from the lamp. UV LEDs may be incorporated into a lamp, and thus a light fixture, to provide additional lighting techniques such as black lighting and/or ultraviolet lighting, thereby providing decorative and artistic lighting effects and applications. Additionally, UV LEDs may be used in concert with phosphorescence and photoluminescence materials, fluorescent dyes, fabrics and other materials to provide additional lighting effects for various lighting applications. UV-A LEDs at a wavelength of between about 315 to 400 to 420 nm may be used to produce increased ultraviolet effects. At higher, about 400 to 420 nm wavelengths there is mostly visible light and less ultraviolet. The human eye can see from about 380 nm of this wavelength. The wavelength for optimal ultraviolet lighting effect is about 365 nm. At this wavelength, the ultraviolet light is not visible by the human eye, because the output is mostly ultraviolet light and very little visible light. Therefore, when the invisible light shines on a surface with phosphorescent pigment it becomes activated and glows. 395 nm is also good at glowing phosphorescent pigments but there is more visible light than at the 365 nm wavelength.

Figure 6:
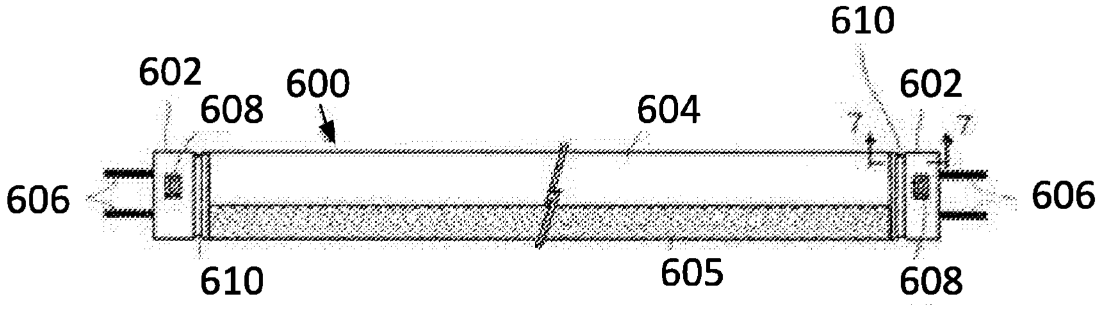
FIG. 6 depicts a sample lamp according to another exemplary embodiment.
Figure 7:
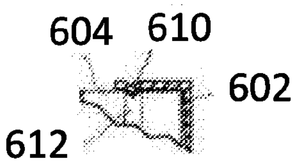
FIG. 7 is a cross-sectional view along the line 7-7 in FIG. 6.

Referring to FIGS. 6 and 7, another exemplary lamp 600 for use in a fixture as described herein. For example, the lamp 600 may be incorporated into one or more of systems 100, 200, 300 and 400 as shown in FIGS. 1-4 and described above. The lamp 600 includes opposed bases 602 configured to establish a connection, for example, via the input pins 606, between the fixture the lamp is installed in and the lamp itself, thereby providing power to the lamp for illuminating a light tube 604 of the lamp. As described above, the light tube 604 may include one or more LED light strips including, for example, RGB, RGB-W, RGB-UV, RGB-IR, RGB-A, RGB-W-UV, RGB-W-IR, RGB-UV-IR, UV-IR, W-UV, W-IR, W-UV-IR, RGB-UV-IR-W, W-A, RGB-A-IR-W or any combination and wavelength. Similar to base 502, the base 602 may also include a local DMX converter, similar to the local DMX converter as shown in lamp 204 of FIG. 2.

Each base 602 is configured to be rotatable for beam focus and adjustable relative to the light tube 604. In the illustrated embodiment, each base 602 includes an inwardly extending detent 610 configured to engage a corresponding groove 612 on the light tube 604 such that the components are interconnected but rotatable relative to one another. Other mechanisms for rotatable interconnection may alternatively be utilized. When the tube is installed, the input pins are lined up with the tombstones and then the bases 602, instead of the entire lamp, are rotated and secured in the tombstones. Each base 602 may include a tab 608 or the like to assist with twisting thereof. By having adjustable bases 602, the tubes and lens 605, if included, can be easily focused and the beam angle adjusted for each of the tubes 604. It is further contemplated that the lenses 605 may be interchangeable for various size beams.

For each of the embodiments described herein, the lamps 104, 204, 304, 404, 500, 600 may have light tubes of standard size or custom size. For example, the lamps may be manufactured in standard diameters of T2 to T17 with standard lengths of, for example, 15 inches, 18 inches, 24 inches, 36 inches or 48 inches. The lamps may also be manufactured with larger diameters and different lengths, for example, lengths intermediate of the standard lengths or lengths longer than the standard lengths, for example, 96 inches or more. The larger diameter tubes may be utilized to provide multiple rows of various types of led nodes. The larger tubes may also facilitate lamps with increased wattage. The lamps may also have configurations other than the illustrated linear configurations. For example, the lamps may have U-shaped or circular configurations. Also, the lamps may be manufactured with single, dual or further configurations of pins for input of electrical power.

It should be noted that each of FIGS. 1-4 illustrates a single fixture for illustrative purposes only. Additionally, multiple fixtures may be arranged into a network of connected devices. For example, as shown in FIG. 1, DMX controller 108 may provide a DMX control signal to another light fixture. Such a communication may be a wired connection according to standard DMX protocols. Alternatively, the connection may be a wireless connection using standard wireless communication protocols such as mesh networking protocols. In such an arrangement, one or more fixtures may communicate with multiple other fixtures simultaneously, thereby providing redundant wireless communication links between the fixtures should one or more links fail (e.g., if a fixture loses power for some reason).

Figure 8A:
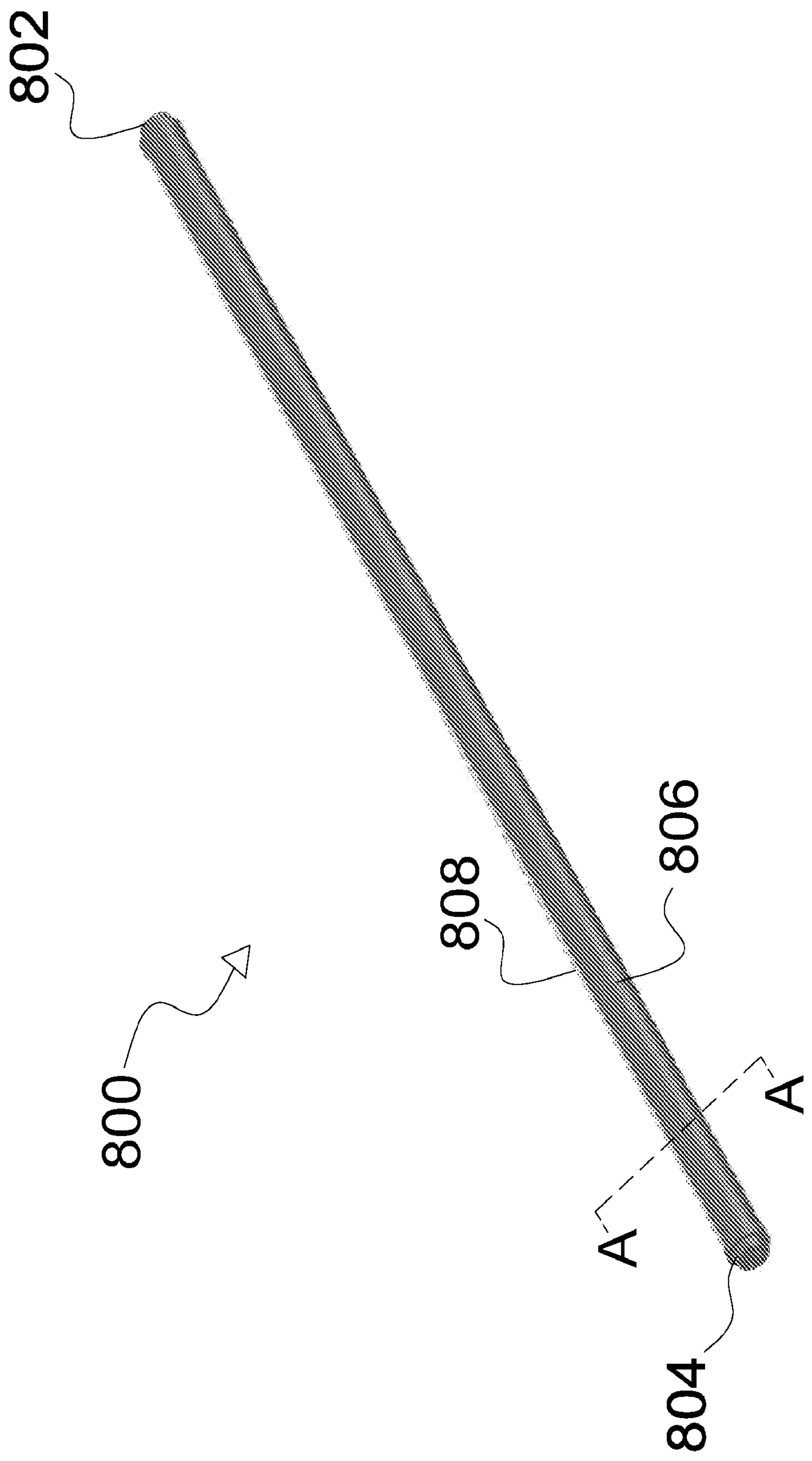
FIG. 8A illustrates an isometric view of an LED lamp.
Figure 8B:
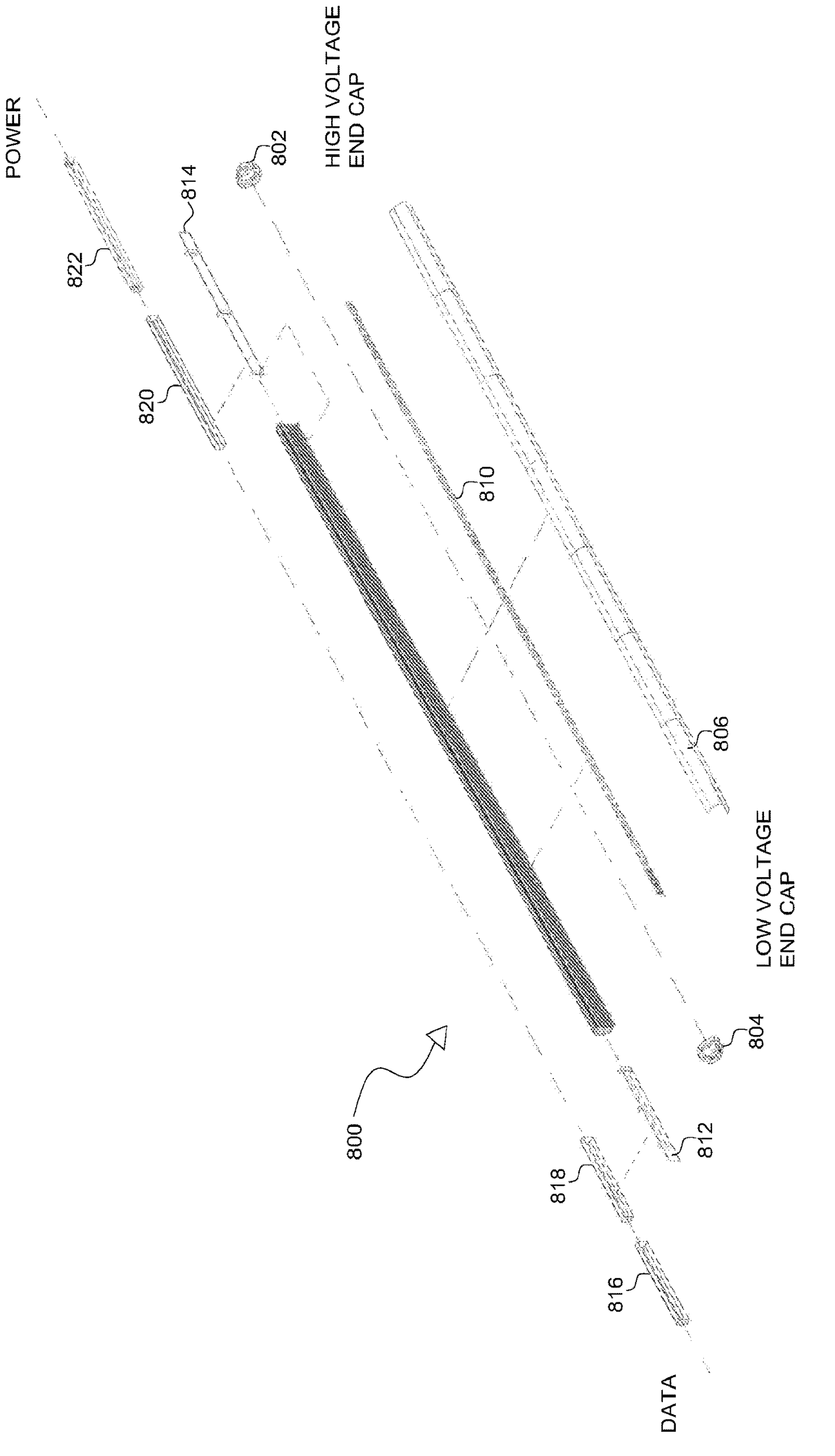
FIG. 8B illustrates an exploded view of the LED lamp of FIG. 8A.
Figure 8C:
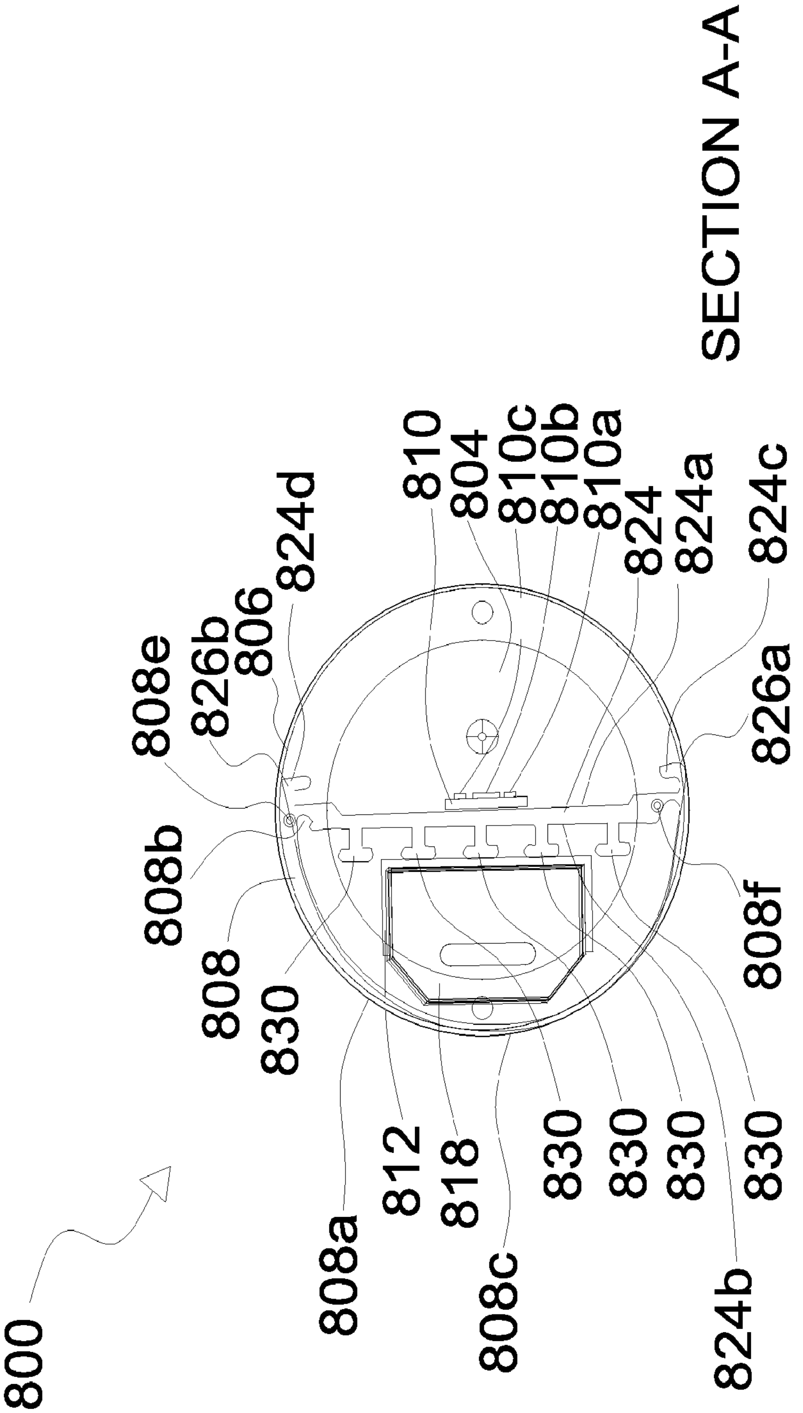
FIG. 8C illustrates a cross-sectional side view, taken along section A-A, of the LED lamp of FIG. 8A.
Figure 8D:
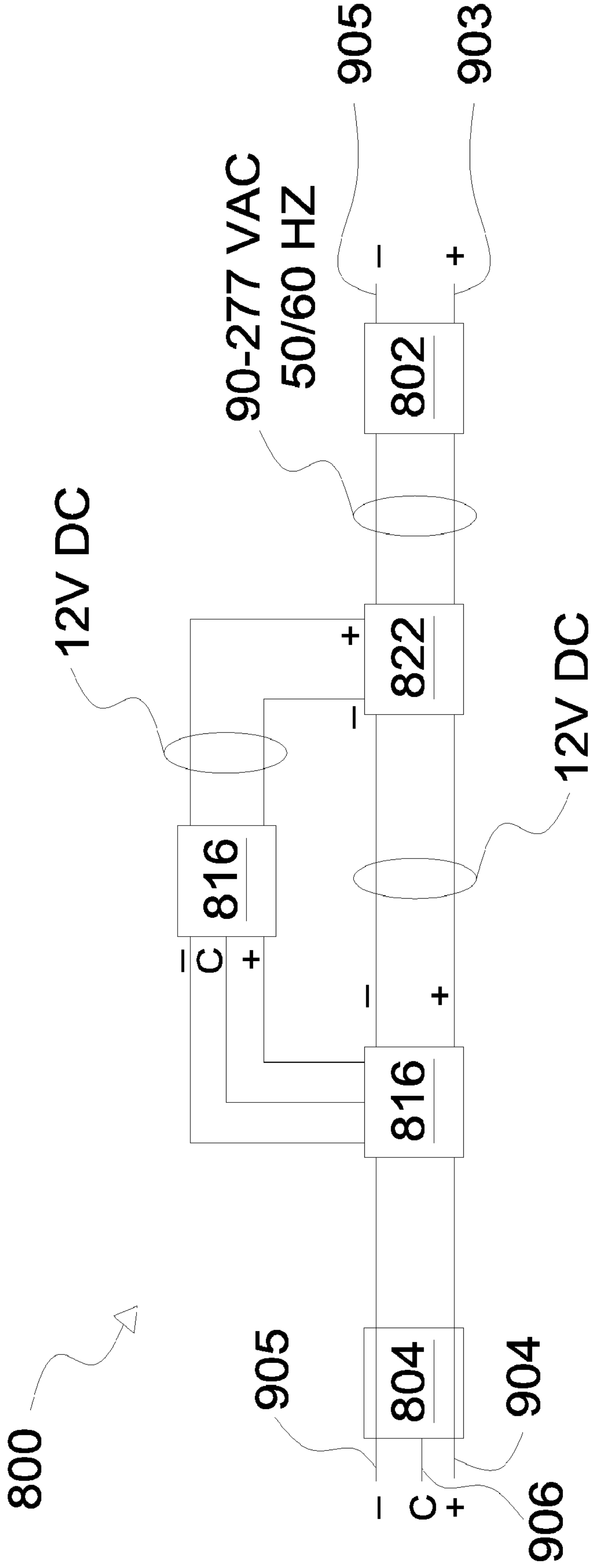
FIG. 8D illustrates a wiring diagram of the LED lamp of FIG. 8A.

FIG. 8A illustrates an isometric view of an LED lamp 800 (hereinafter "lamp 800"). FIG. 8B illustrates an exploded view of the lamp 800 of FIG. 8A. FIG. 8C illustrates a cross-sectional side view, taken along section A-A, of the lamp 800 of FIG. 8A. FIG. 8D illustrates a wiring diagram of the lamp 800 of FIG. 8A.

The lamp 800 may include a chassis 808 coupled to a lens 806. The lamp 800 may include end caps 802 and 804 disposed on opposite ends of the chassis 808 and the lens 806. In one or more cases, the end caps 802 and 804 fasten the chassis 808 and the lens 806 and enclose the ends of the lamp 800. The end caps 802 and/or 804 may receive an output power from the power input. In one or more cases, the end cap 802 may be a high voltage end cap configured to receive high voltage signals. For example, the end cap 802 may receive a voltage signal of at or about 90-277 VAC at 50/60 Hz. In one or more cases, the end cap 804 may be a low voltage end cap configured to receive low voltage signals.

The chassis 808 may be an elongated rigid structure configured to house one or more components within the lamp 800. The chassis 808 may be formed of metal or an opaque plastic. The outer surface 808*a* of the chassis 808 may be formed in a semi-cylindrical shape, semi-cuboid shape, or the like, in which the proximal end 808*b* of the chassis 808 includes mounting platform 824. The lens 806 may be an elongated rigid structure configured to cover the proximal end 808*b* of the chassis 808. The lens 806 may be formed of a transparent or semi-transparent material configured to allow light emitted from a LED strip 810 to pass through the lens 806 to an outside environment. In one or more cases, the lens 806 may be used to focus light emitted from the LED strip 810. The lens 806 may be formed in a semi-cylindrical shape semi-cuboid shape, or the like. The lamp 800 may have a cylindrical shape, a cuboid shape, or the like when the chassis 808 is coupled with the lens 806.

Figure 50:
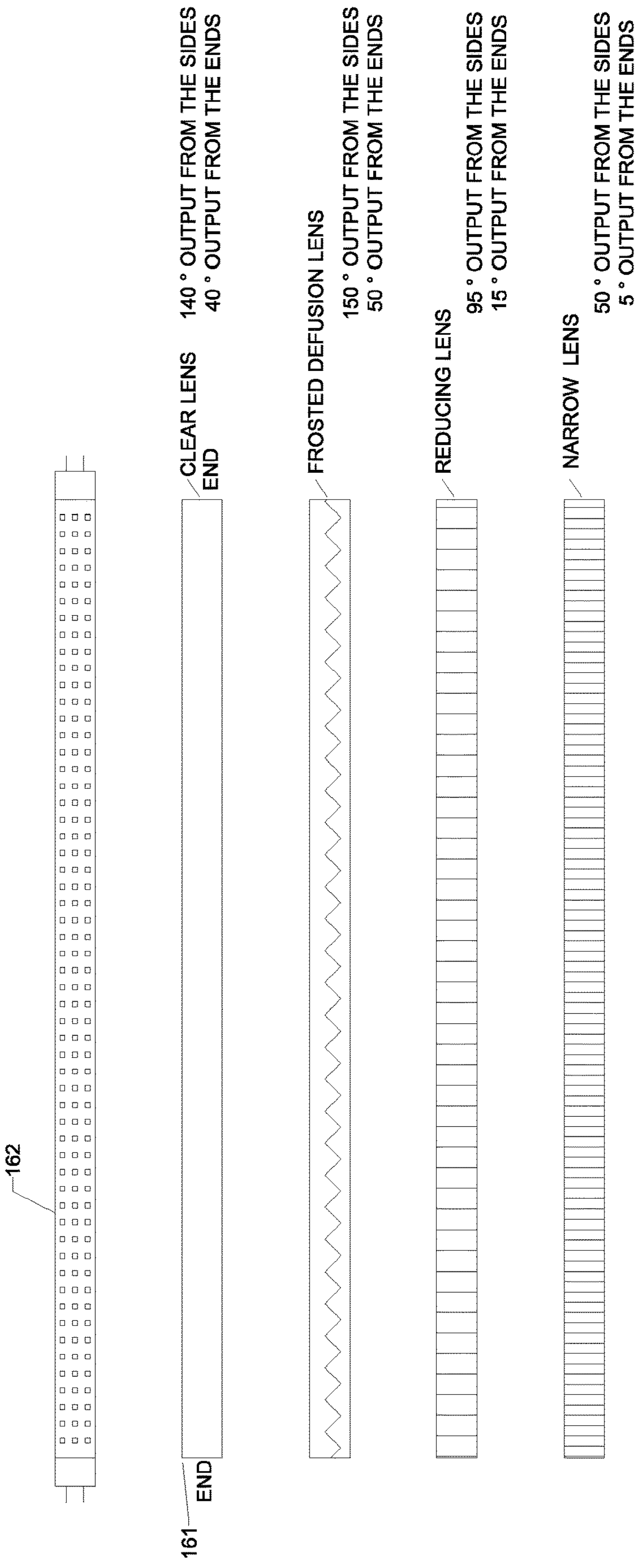
FIG. 50 illustrates LED lamps having various beam-shaping lenses installed.

FIG. 50 shows a beam shaping lens 161. A beam shaping lens 161 may shape beams in various ways to change light output or output pattern of the light from an LED lamp 162. Lenses (161) may be capable of many different degrees of beam shaping, such as about 40°-140° 161, 50°-150° 164, 15°-95° 163, or 5°-50° 165. A lens 161 may also encompass various degrees of frost or diffusion lenses to soften light output or increase the dispersion pattern of an LED lamp. A frosted lens may also increase the visual effects at each LED lamp. Narrow lenses can be used to reduce the output pattern.

Figure 54:
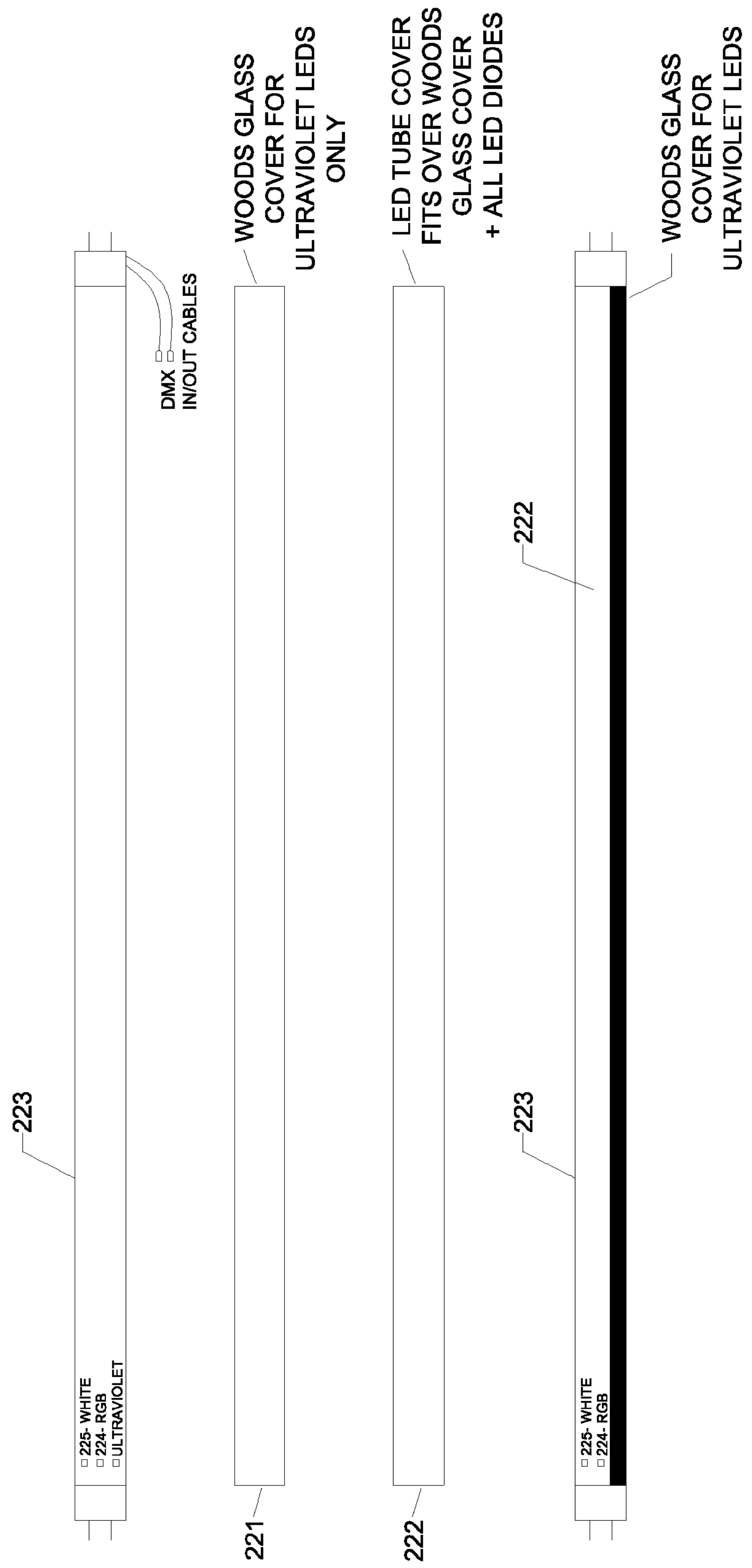
FIG. 54 illustrates an LED lamp having a Wood's Glass Filter installed for blocking most light that is not ultraviolet or infrared.

In other embodiments, a lens may be replaced by a Wood's Glass Filter as shown in FIG. 54. A Wood's Glass Filter 221 allows ultraviolet and infrared light to pass through, while blocking most visible light, and may be used in specific ultraviolet light scenarios. A Wood's Glass Filter 221 could be used as an additional light filter for just ultraviolet or infrared LED diodes of a multicolor LED lamp 223, and could be placed underneath a traditional 222 or beam shaping lens. A Wood's Glass Filter 221 can increase ultraviolet or infrared lighting effects by reducing the amount of visible light.

The lamp 800 is configured to house one or more components, such as, but not limited to, a data control board ("DCB") 816, a DCB support housing 818, a data control board support 812, a power control board ("PCB") 822, a PCB support housing 820, a power control board support 814, and the LED strip 810. The DCB 816 may send control signals to the LED strip 810 in order to light one or more LEDs of the LED strip 810. In one or more cases, the DCB 816 may operate in a same or similar manner as the DMX converter 106 as described above.

The DCB support housing 818 couples the DCB 816 with the data control board support 812. The DCB support housing 818 may be a rigid casing sized to house the DCB 816. The DCB support housing 818 may be an insulating enclosure for the DCB 816. The DCB 816 may be inserted into the DCB support housing 818, and the DCB support housing 818 may be mounted to the data control board support 812.

The PCB 822 may be used to regulate voltage signals transmitted from the power input to the LED strip 810. The PCB 822 may convert AC voltage signals to DC voltage signals. For example, the PCB 822 may convert 90-277 VAC at 50/60 Hz to 12 VDC and supply power to the DCB 816 and the LED strip 810. In one or more cases, the PCB 822 may operate in a same or similar manner as the power supply 102 as described above. The PCB support housing 820 couples the PCB 822 with the power control board support 814. The PCB support housing 820 may be a rigid casing sized to house the PCB 822. The PCB support housing 820 may be an insulating enclosure for the PCB 822. The PCB 822 may be inserted into the PCB support housing 820, and the PCB support housing 820 may be mounted to the power control board support 814.

The mounting platform 824 of the chassis 808 may be positioned on the proximal end 808*b* of the chassis 808 and may extend in a longitudinal direction of the chassis 808. The LED strip 810 may be disposed on a first surface 824*a* of the mounting platform 824 facing the lens 806. A second surface 824*b* of the mounting platform 824 may include one or more extrusions 830 that extend towards the distal end 808*c* of the chassis 808. The one or more extrusions 830 may be formed from metal. The one or more extrusions 830 may act as heat sinks to dissipate heat generated by the LED strip 810. The one or more extrusions 830 may be formed in a variety of shapes, for example, a "T" shape.

The chassis 808 may include one or more interlocking tabs, such as interlocking tab 826*a* and 826*b*. The one or more interlocking tabs may be rigid tabs configured to interlock with the ends of the lens 806. The interlocking tab 826*a* and interlocking tab 826*b* may be disposed on opposite ends of the mounting platform 824. The protruded portions 824*c* and 824*d* of the respective interlocking tabs 826*a* and 826*b* may protrude inwards, for example, towards one another. The protruded portion 824*c* may be inserted into a recess on an end of the lens 806, and the protruded portion 824*d* may be inserted into another recess on an opposite end of the lens 806, thereby interlocking the chassis 808 with the lens 806. The lens 806 may be a flexible structure configured to bend, such that the recesses may be positioned with the respective protruded portion 824*c* and 824*d*. In one or more cases, the rear portion 804*b* of the end cap 804 and a rear portion of the end cap 802 may each include at least two tabs to secure the lens 806 to the chassis 808. For instance, at least two tabs may be disposed on opposite sides of the end cap 804 and may each protrude from the rear portion 804*b* of the end cap 804. The at least two tabs may be spaced apart far enough such that the lens 806 coupled with the chassis 808 may fit snugly between the at least two tabs.

The LED strip 810 may include one or more LEDs, such as LEDs 810*a*, LEDs 810*b*, and LEDs 810*c*. The LEDs 810*a*, LEDs 801*b*, and LEDs 810*c* may each emit light containing individual colors or wavelengths, such as R, G, B, W, UV, IR, A, and the like, or a combination of colors and/or wavelengths, including but not limited to, RGB, RGB-W, RGB-UV, RGB-IR, RGB-A, RGB-W-UV, RGB-W-IR, RGB-W-A, RGB-UV-IR, UV-IR, W-UV, W-IR, W-A, W-UV-IR, RGB-UV-IR-W, RGB-A-IR-W or any other combination.

The lamp 800 may be used as a horticultural growth lamp by emitting R, B, W light using specific wavelengths and color temperatures (as measured in degrees Kelvin (K), for example, 1,000 to 10,000 K). For example, the lamp 800 may include one or more LEDs emitting R light, one or more LEDs emitting B light, and one or more LEDs emitting W light. The LEDs for emitting R light may emit R light at a wavelength between 620 nm and 700 nm. The LEDs for emitting B light may emit B light at a wavelength between 400 nm and 495 nm. The LEDs for emitting W light may emit W light at a wavelength between 400 nm and 700 nm.

Figure 23:
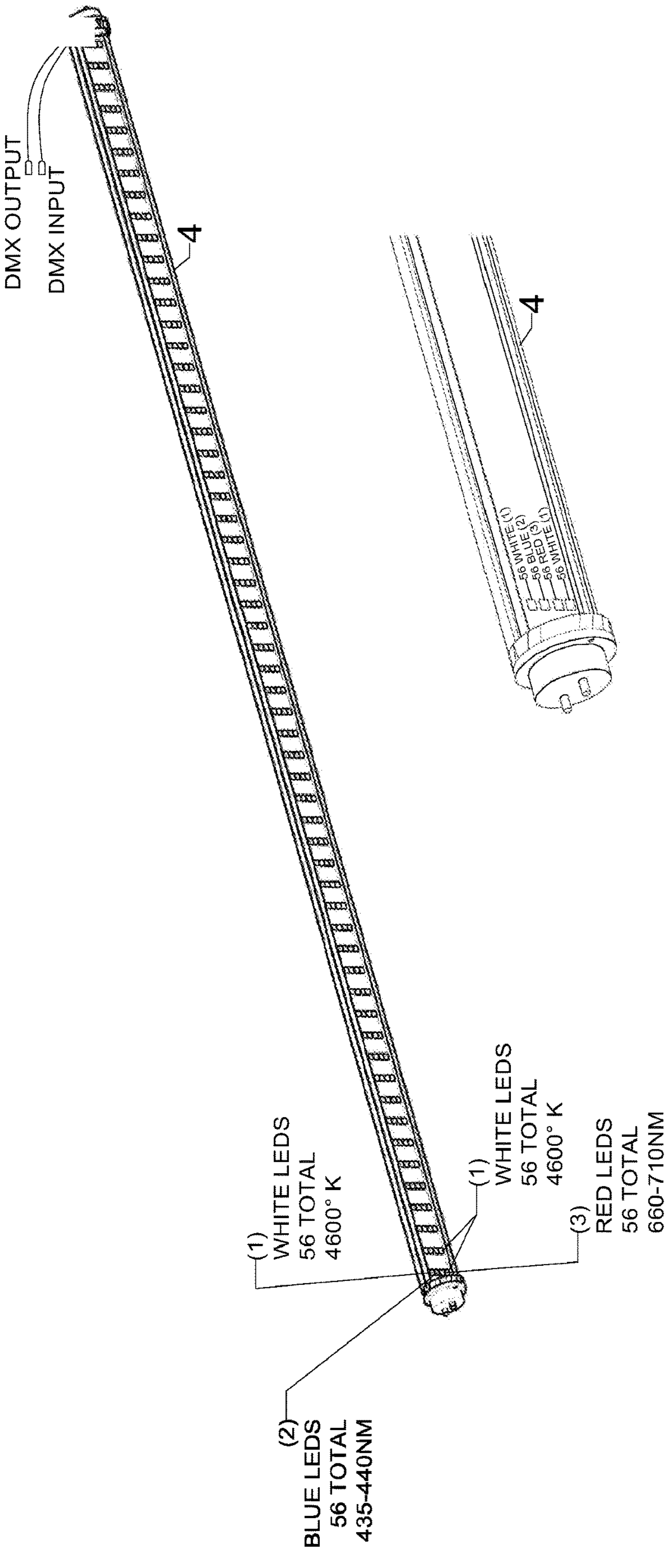
FIG. 23 illustrates a horticultural growth LED lamp having wired DMX communication capability.
Figure 24:
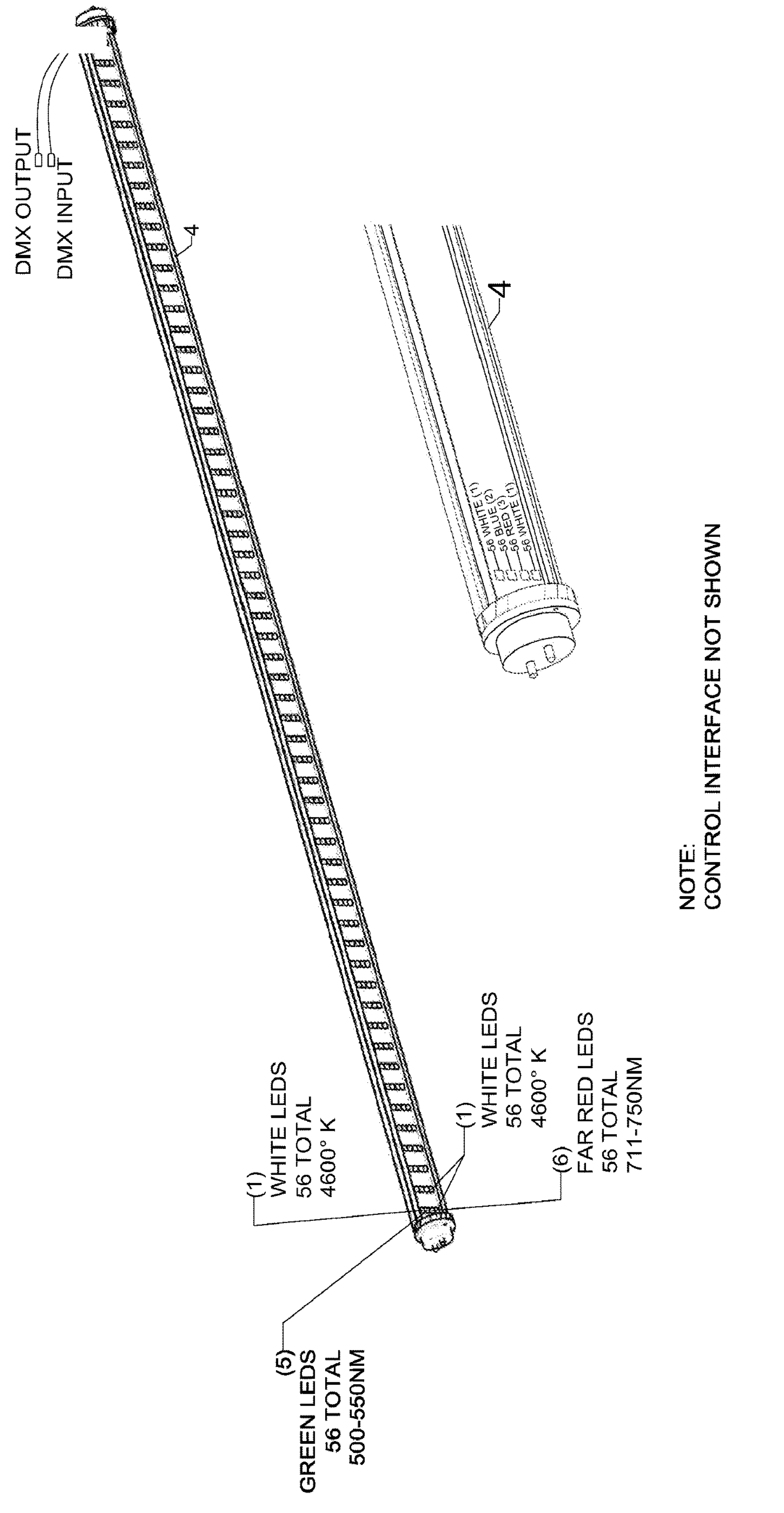
FIG. 24 illustrates a horticultural growth LED lamp featuring alternate LED colors.
Figure 25:
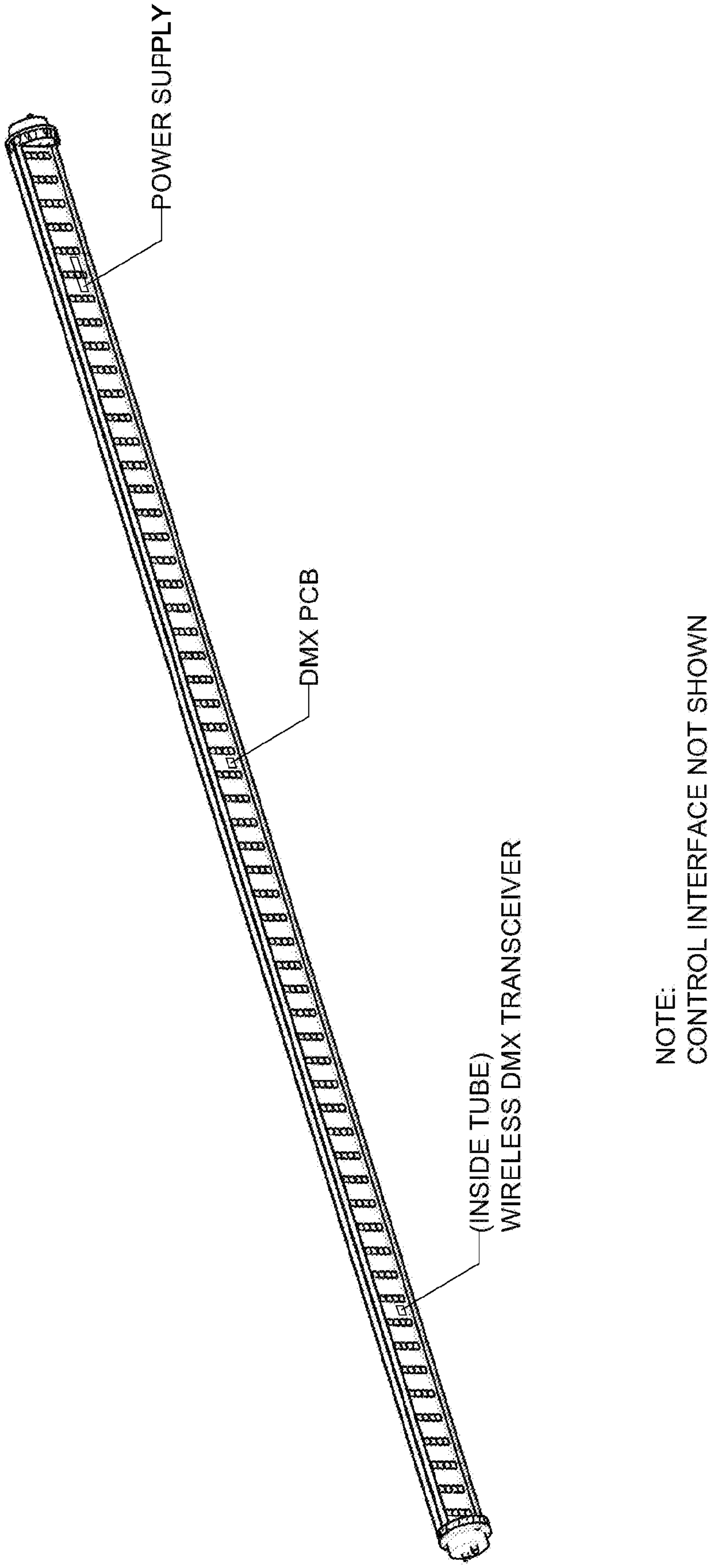
FIG. 25 illustrates a horticultural growth LED lamp having wireless DMX capability to control each lamp within a system of horticultural growth LED lamps.
Figure 26:
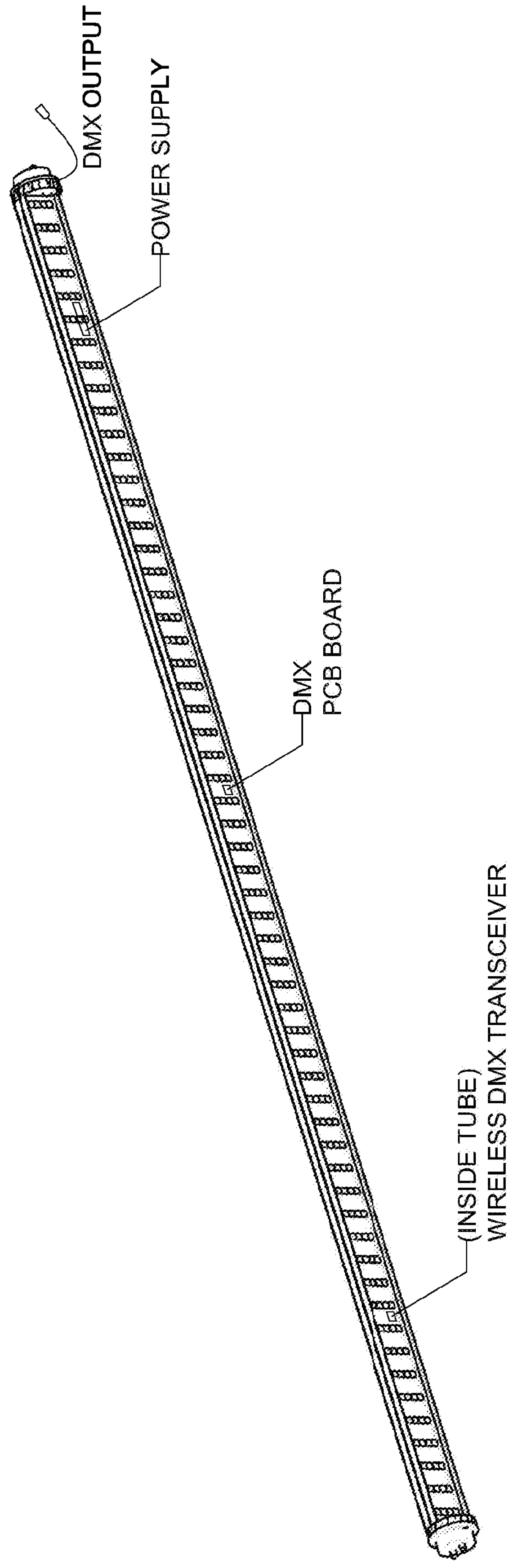
FIG. 26 illustrates a horticultural growth LED lamp having both wireless and wired DMX communication capability.
Figure 27:
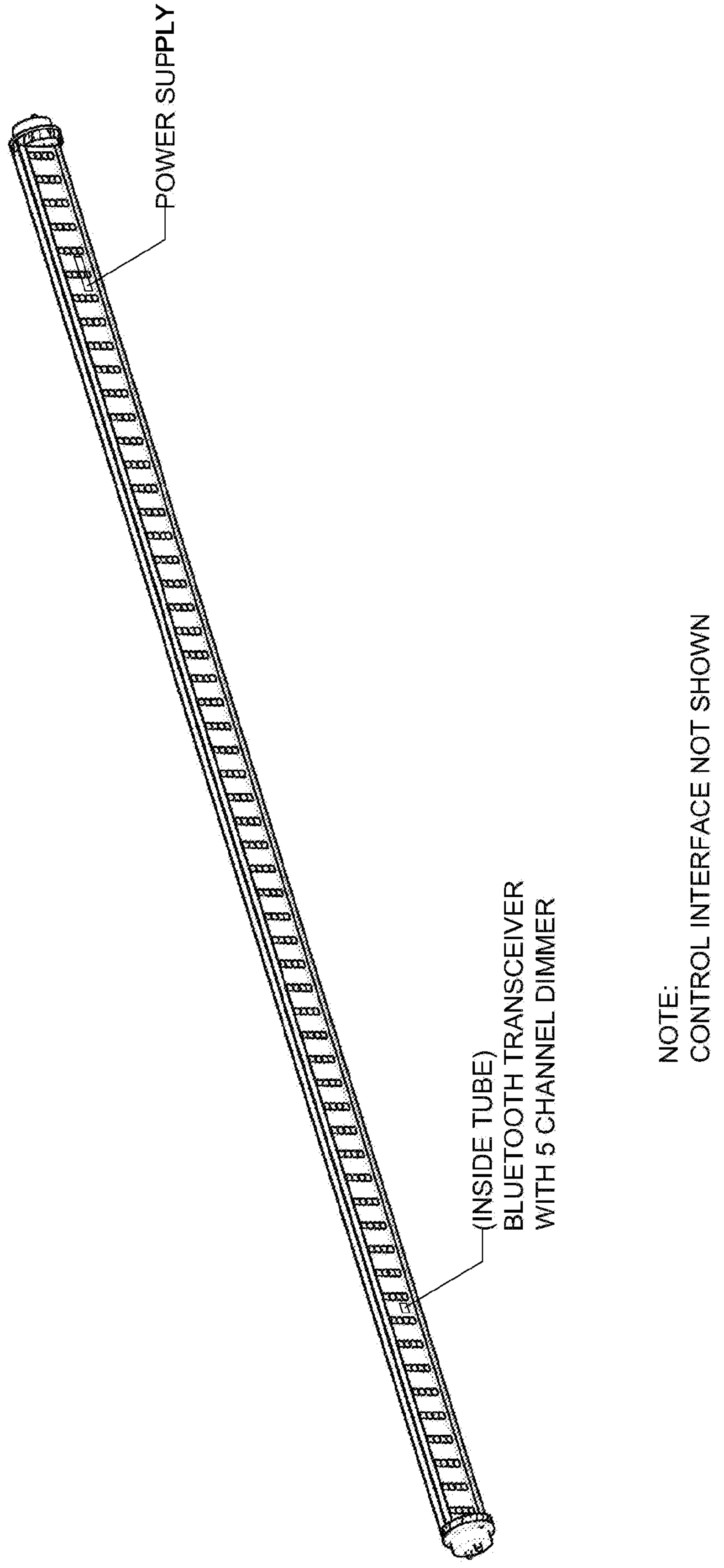
FIG. 27 illustrates a horticultural growth LED lamp having wireless Bluetooth capability and five 12-24 VDC dimming channels for constant voltage LED loads.
Figure 28:
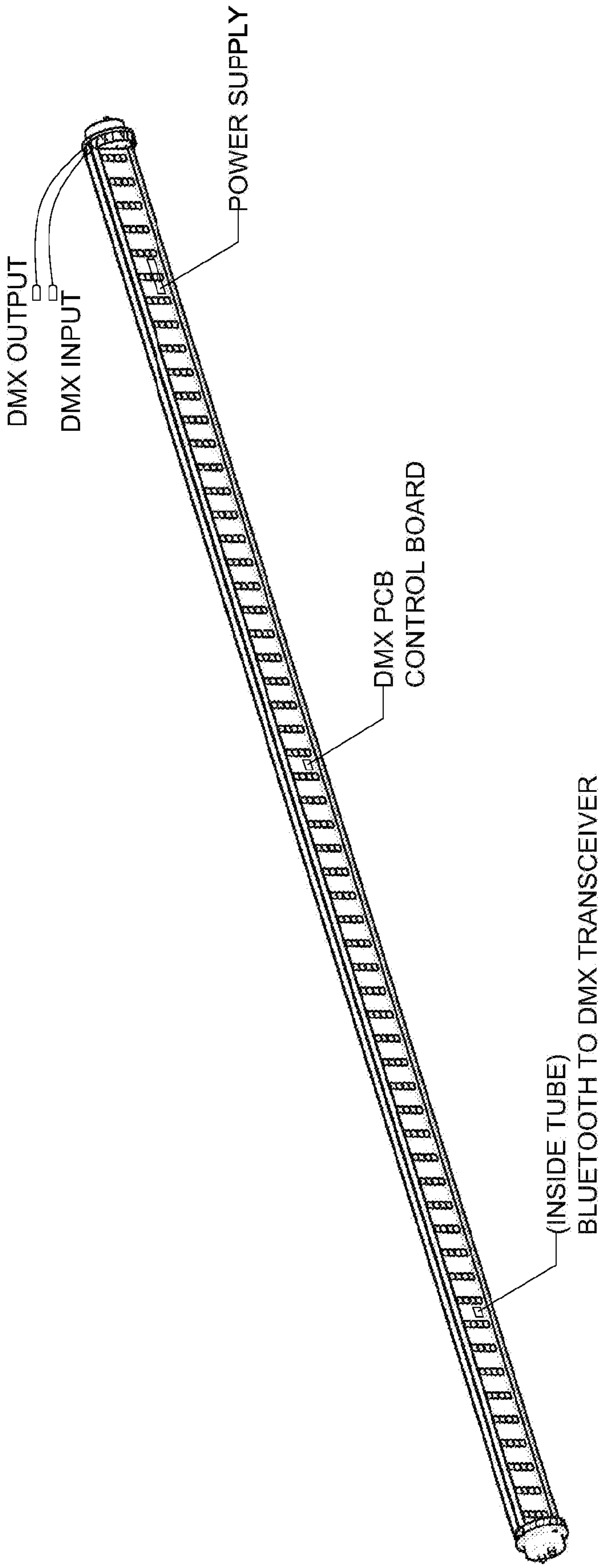
FIG. 28 illustrates a horticultural growth LED lamp having wireless Bluetooth to DMX communication capability.

Horticultural growth lamps may provide artificial sunlight with various colors and lighting wave lengths to grow horticultural crops, as seen in FIG. 23. Each lamp 4 may include two rows of white 1 4000 K LEDs, one row of 435-440 nm blue LEDs 2 and one row of 660-710 nm red LEDs 3. As seen in FIG. 24, other wavelengths can be used for different types of crops, such as green LEDs emitting light at a wavelength between 500 and 550 nm 5, or far-red LEDs emitting light at a wavelength of 711 to 750 nm 6. Each LED lamp may include a DMX control receiver to operate the system. This control system may be used to schedule the lighting output and duration needed for each stage of the growing process. The DMX control signal may be wired, as seen in FIG. 23 and FIG. 24, wireless as in FIG. 25, or a combination of the two like in FIG. 26. These LED lamps may also be used with wireless Bluetooth with five 12-24 VDC dimming channels for constant voltage LED loads as in FIG. 27, and wireless Bluetooth to DMX as in FIG. 28. Other control systems are considered.

Figure 29:
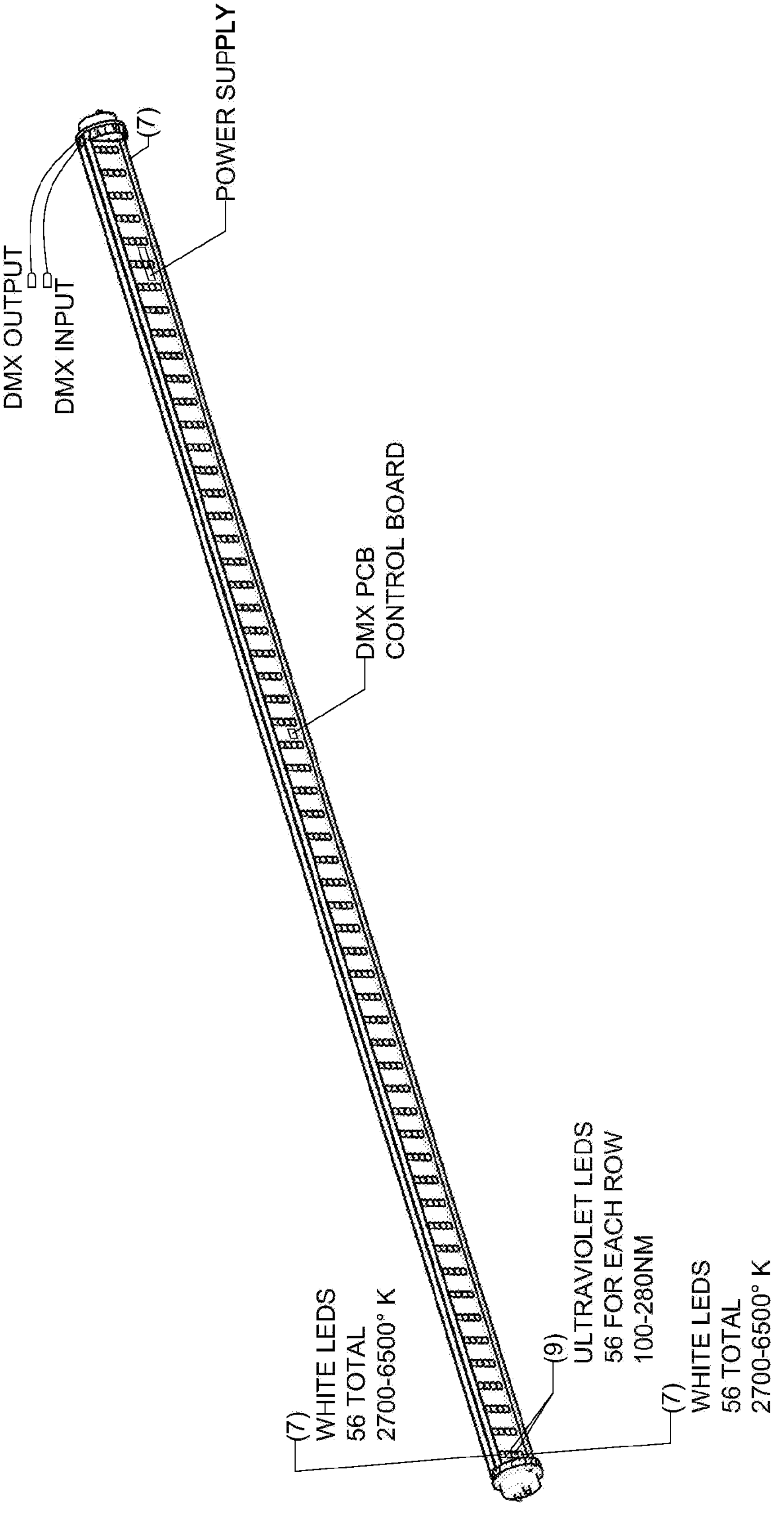
FIG. 29 illustrates a germicidal LED lamp having wired DMX communication capability.
Figure 30:
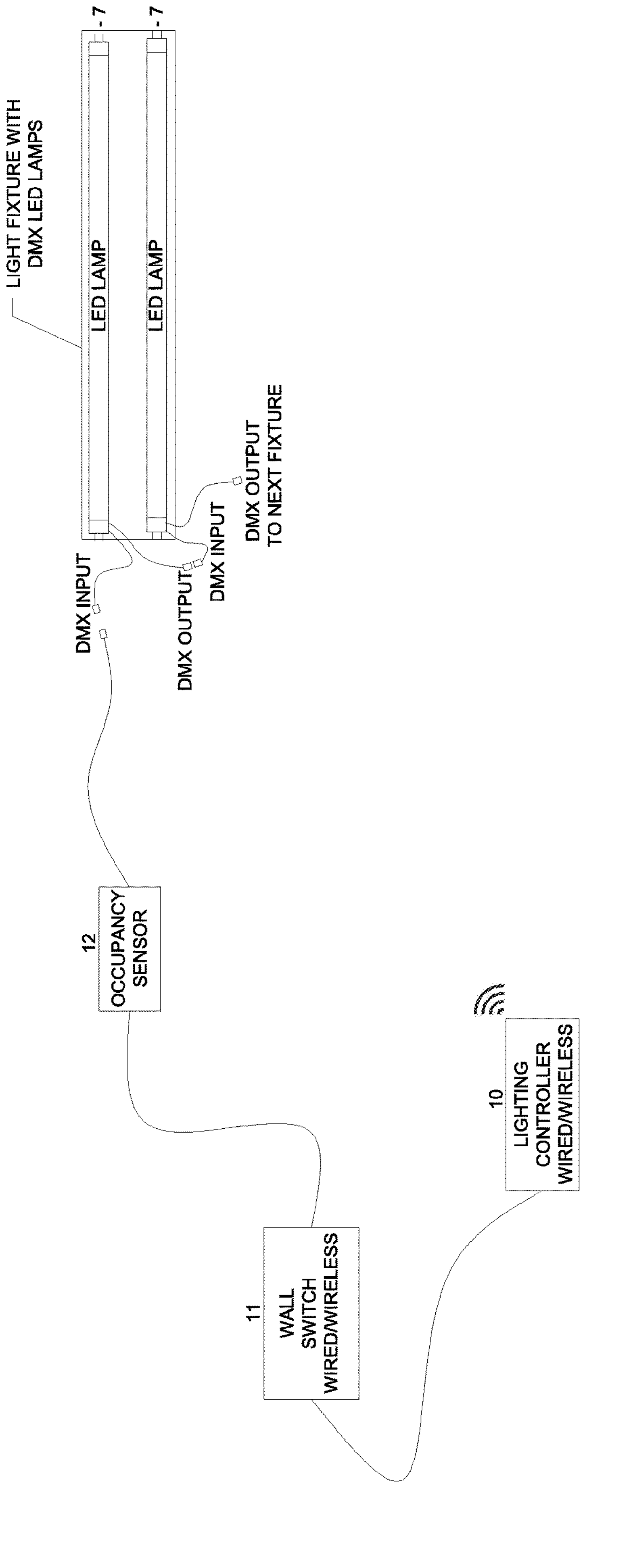
FIG. 30 illustrates a lighting control system for operating and scheduling lighting of a germicidal LED lamp using wired or wireless DMX communication.
Figure 31:
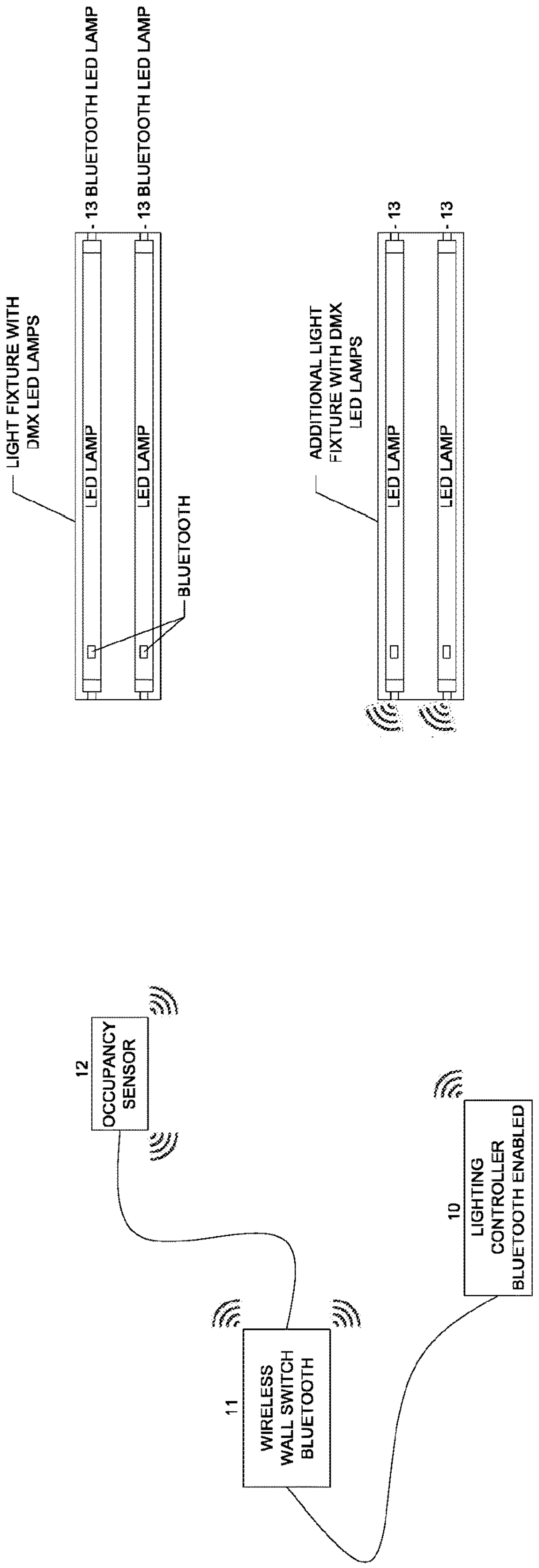
FIG. 31 illustrates a lighting control system for operating and scheduling lighting of a germicidal LED lamp using Bluetooth communication.

In other embodiments, lamps may have other utilities, such as being used for germicidal purposes. A germicidal LED lamp as seen in FIG. 29 may include white 7 and ultraviolet 9 LED diodes with DMX, Bluetooth, or similar control. The white diodes may be used for general white lighting at various color temperatures ranging between about 2700 to 6500° K. The ultraviolet (UV-C) diodes may have a wavelength between about 100 to 280 nm. The most effective germicidal wavelengths are typically about 254 to 280 nm. The white and ultraviolet diodes may be used separately. The white may be used for general white lighting when occupants are present in the room or space, while ultraviolet may be used to kill germs when occupants are not present. Lighting control may be used to operate and schedule when which lighting is to be used, as showed by FIG. 30. An occupancy sensor 12 may be included with the lighting control. The occupancy sensor 12 may be used to turn-off the ultraviolet diodes and turn on the white diodes when the occupancy sensor is activated. Control can be wired or wireless DMX, as in FIG. 30, Bluetooth as in FIG. 31, Wi-Fi, or other types of control. These lamps may be used in hospitals, doctors offices, schools, transportation centers, corporate, government, retail and many more applications.

Figure 32:
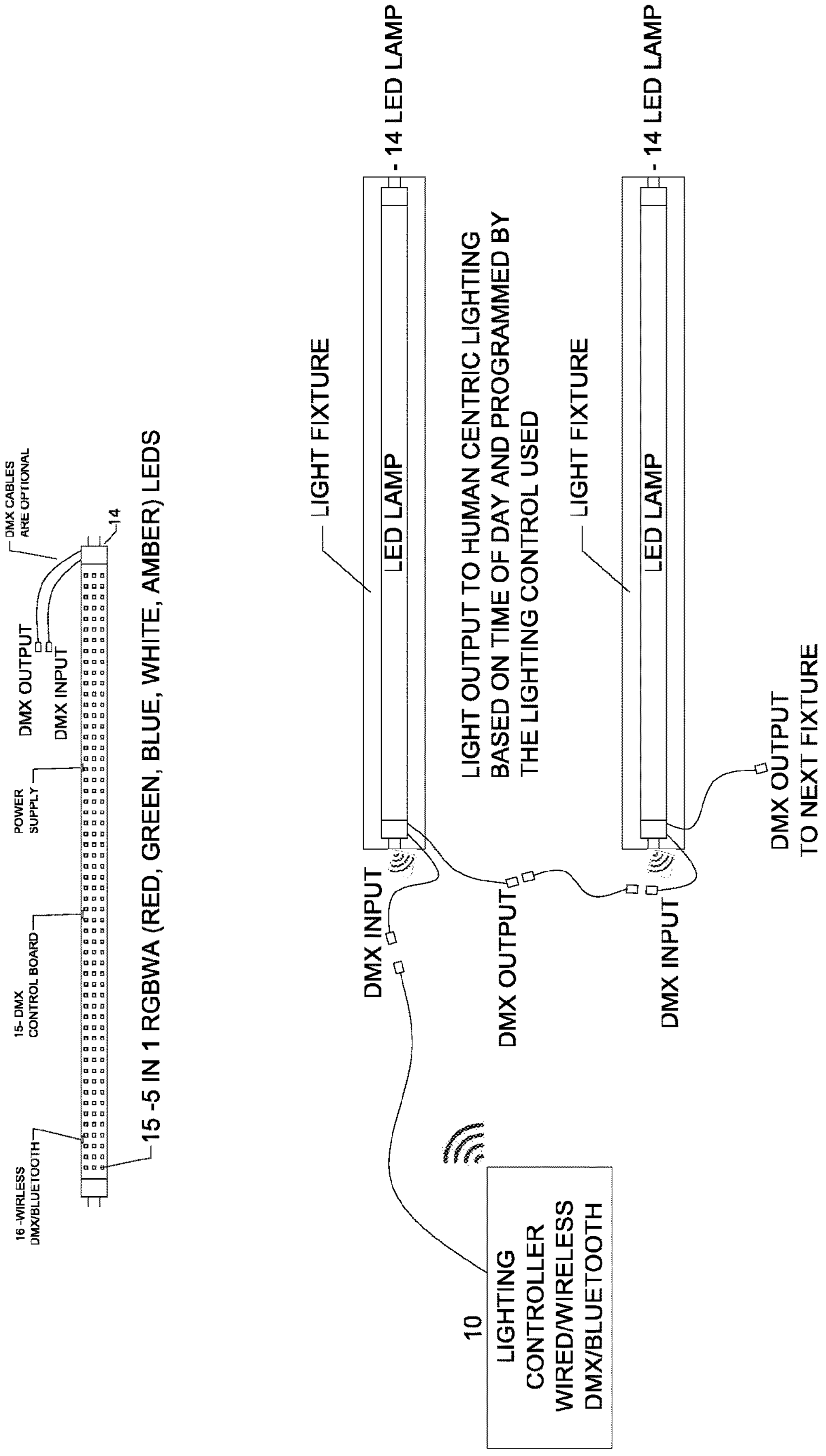
FIG. 32 illustrates a lighting control system for operating and scheduling human-centric lighting.

FIG. 32 shows, in yet other embodiments, LED lamps may be used for human-centric purposes, e.g., configured to accommodate human circadian rhythms. Human-centric lighting uses artificial light with the appropriate hues, which mimic natural sun light cycles during a 24 hour period to align with human sleep-wake-cycles. The benefits include better sleep, increased productivity, improved mood and faster cognitive processing. The LED lamp 14 color tunes the lighting spectrum to help create a warmer or cooler atmosphere. This promotes natural melatonin production and better, natural sleep and wake cycles of the human body.

The LED lamp 14 may emit specific lighting wavelengths that provide similar circadian rhythm benefits. LED lamps 14 may include the full color spectrum of LED diodes (red, green, blue, white, ultraviolet) 15 that can dim and color tune the lighting when used with a lighting control system (DMX 15, DMX/Bluetooth 16, Wi-Fi, and others).

There are typically three electric light approaches to implementing a circadian lighting system. These include: intensity tuning, color tuning, and stimulus tuning. Many combinations of LEDs, diodes, and the number of pixels may be available in the light tubes for color-tuning applications. Intensity tuning is the most familiar and cost-effective solution to circadian lighting. The LED lamp(s) include intensity tuning and maintain a fixed correlated color temperature (CCT) while the intensity or brightness of the lamp(s) are raised or lowered by the control system. The controls can be correlated with time of day. The LED lamp(s) may be set to a lower intensity in the early morning and transition to a higher intensity as the day progresses. Then, reduced to a lower intensity in the evening. The LED Lamps may also include color tuning. Color tuning may change the light intensity and the correlated color temperature to mimic the day/night cycle. Humans experience cooler color temperatures ranging from 4000K up to about 10,000K when the sun is highest in the sky. This is when humans are typically most alert during the day. Therefore, cooler correlated color temperatures may be used when it's appropriate to promote alertness and attention. Warmer color temperatures ranging from 2700K to 3500K may be used to represent daylight hours when the sun is rising and setting when people are waking up or falling asleep. Circadian lighting systems are set to adjust based on the correlated color temperature we typically observe at any given time of the day. The LED lamp(s) include stimulus tuning. This lighting technology replaces the "bad blue" with "good blue" light wavelengths. Stimulus tuning with the LED lamps can be programmed to reduce blue light wavelengths during the evening hours to limit melatonin suppression without changing the correlated color temperature.

Figure 9:
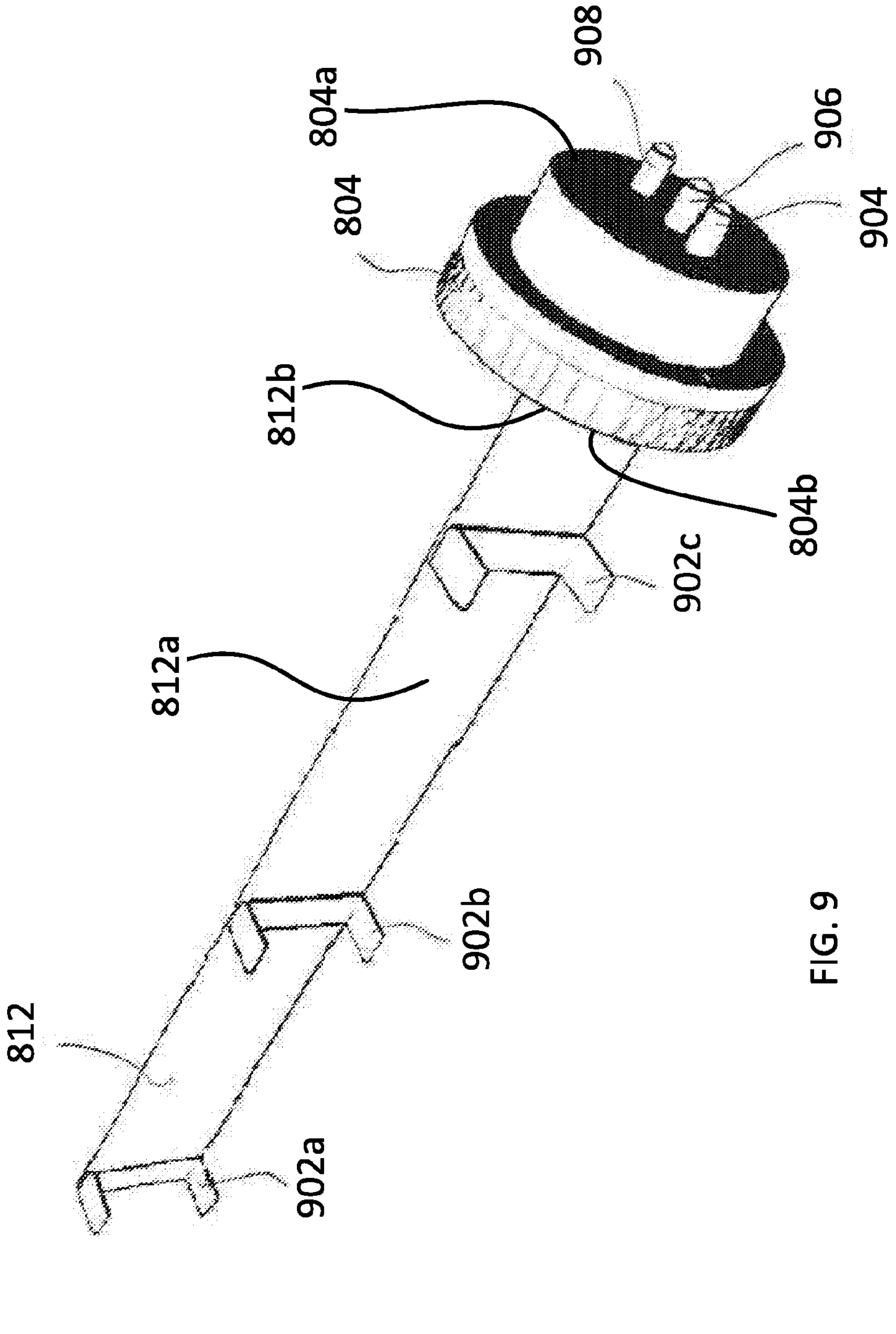
FIG. 9 illustrates an isometric view of a lighting control board support and an end cap.
Figure 10A:
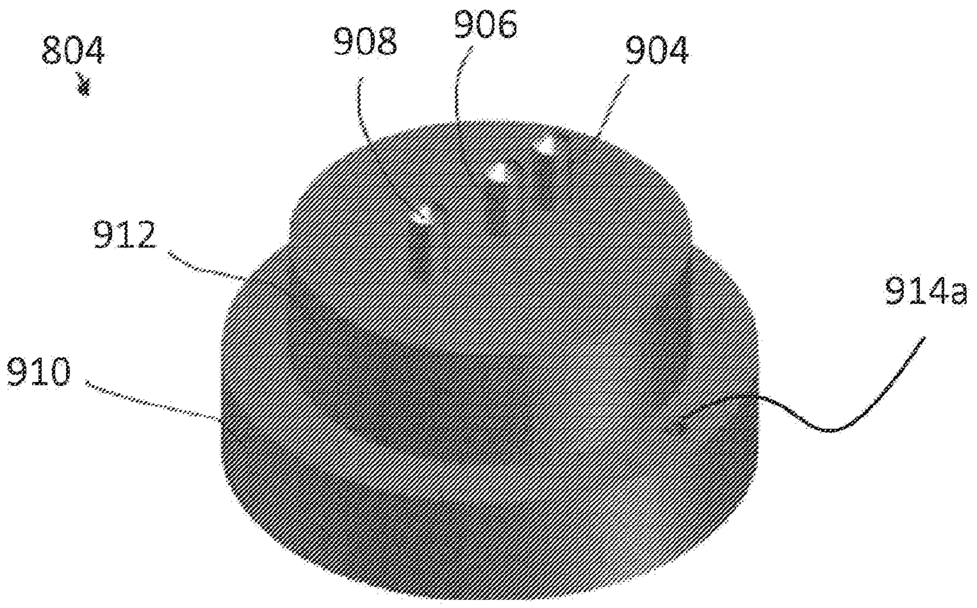
FIG. 10A illustrates an isometric view of the end cap of FIG. 9.
Figure 10B:
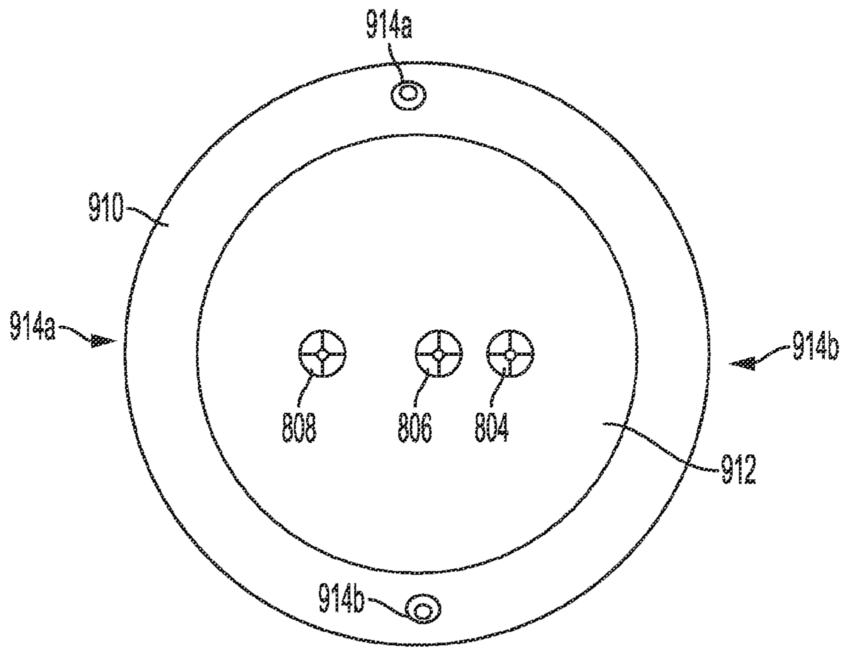
FIG. 10B illustrates a top view of the end cap of FIG. 9.
Figure 10C:
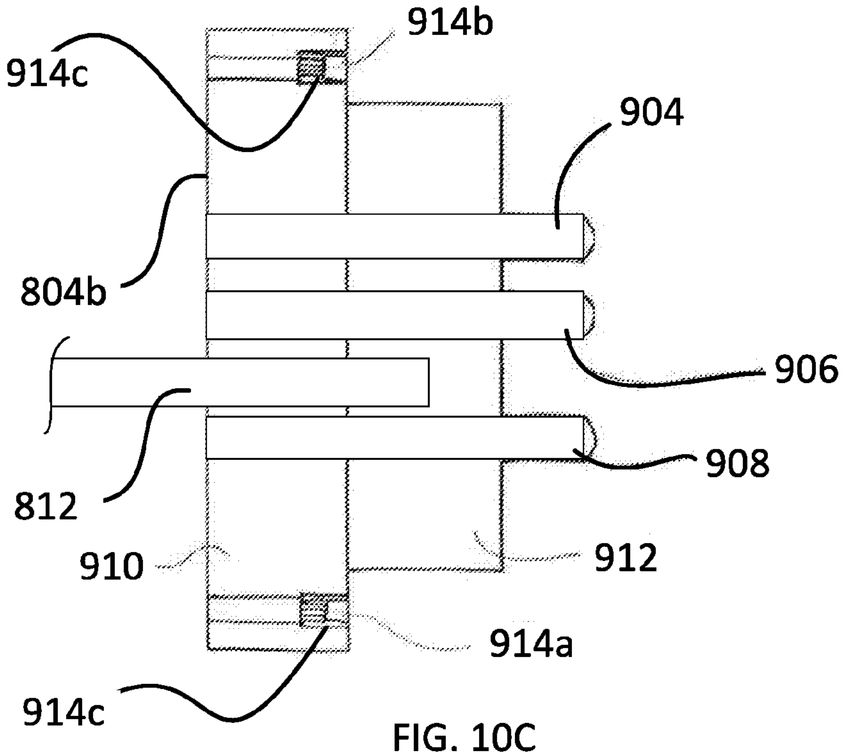
FIG. 10C illustrates a side view of the end cap of FIG. 9.
Figure 10D:
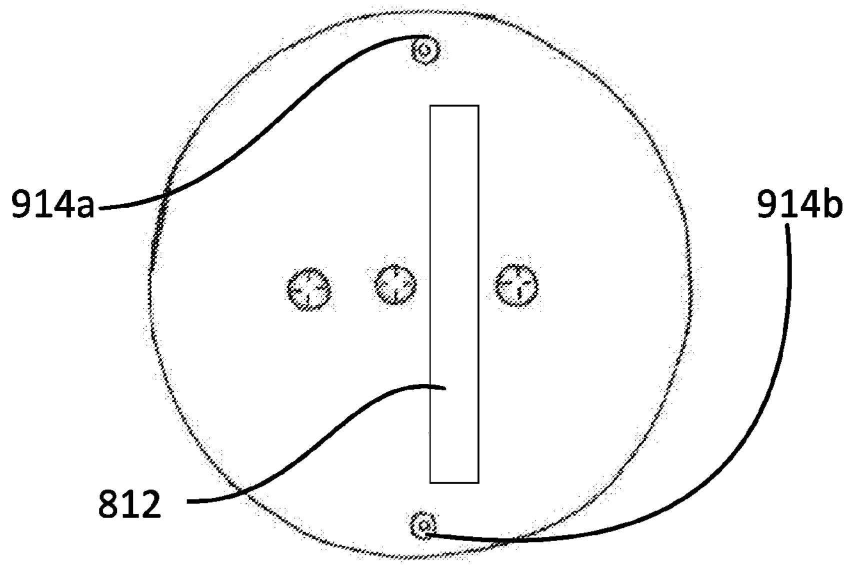
FIG. 10D illustrates a bottom view of the end cap of FIG. 9.

FIG. 9 illustrates an isometric view of the data control board support 812 and an end cap 804. FIG. 10A illustrates an isometric view of the end cap 804 of FIG. 9. FIG. 10B illustrates a top view of the end cap 804 of FIG. 9. FIG. 10C illustrates a side view of the end cap 804 of FIG. 9. FIG. 10D illustrates a bottom view of the end cap 804 of FIG. 9.

The data control board support 812 includes an elongated rigid member 812*a* having one or more support brackets, such support brackets 902*a*, 902*b*, and 902*c*. The data control board support 812 may be formed from a material or combination of materials, for example, but not limited to, a metal, a metal alloy, plastic, or the like. In one or more cases, the data control board support 812 may be rigid enough to hold the DCB support housing 818 or the PCB support housing 820. In one or more cases, the data control board support 812 may have a heat resistance capable of withstanding the temperatures generated by the one or more components, such as the LED strip 810, DCB 816, and/or PCB 822 of the lamp 800.

The elongated rigid member 812*a* may be formed in a shape corresponding to the shape of the DCB support housing 818 and/or the PCB support housing 820. For example, the elongated rigid member 812*a* may have a rectangular shape corresponding to a rectangular shape of a surface of the DCB support housing 818. In one or more cases, a proximal end 812*b* of the elongated rigid member 812*a* may be coupled to a rear portion 804*b* of the end cap 804. In one example, the elongated rigid member 812*a* is coupled to the rear portion 804*b* of the end cap 804, such that the data control board support 812 is permanently fixed to the end cap 804. To permanently fix the data control board support 812 to the end cap 804, a portion of the data control board support 812 may be positioned within the end cap 804, and the portion of the data control board support 812 and the end cap 804 may be coupled to one another via an adhesive or other bonding agent. In another example, the proximal end 812*b* of the elongated rigid member 812*a* is removably coupled to the rear portion 804*b* of the end cap 804. To removably couple the data control board support 812 and the end cap 804, a portion of the data control board support 812 may be positioned within the end cap 804, and the portion of the data control board support 812 and the end cap 804 may be coupled to one another via fasteners such as screws. For the cases in which the elongated rigid member 812 is removably coupled to the end cap 804, the end cap 804 may be replaced with another end cap.

The support brackets 902*a*, 902*b*, and 902*c* may be formed in a shape to hold the DCB support housing 818 and/or the PCB support housing 820. For example, each of the support brackets 902*a*, 902*b*, and 902*c* may be formed in a "C" type shape. The support brackets 902*a*, 902*b*, and 902*c* may be coupled with the elongated rigid member 812*a* in a variety of manners, such as being fastened together via screws, rivets, welding, or the like. The support brackets 902*a*, 902*b*, and 902*c* may be coupled with the DCB support housing 818 or the PCB support housing 820 such that the DCB support housing 818 or the PCB support housing 820 may be rigidly attached to the data control board support 812. In one or more cases, by coupling the DCB support housing 818 to the one or more support brackets of the data control board support 812, the DCB support housing 818 is rigidly attached to the end cap 804. For the cases in which the DCB support housing 818 houses the DCB 816 and is attached to the data control board support 812, the DCB 816 may be fixedly positioned within the lamp 800, such that the DCB 816 is prevented from moving within the lamp 800. In one or more cases, by coupling the PCB support housing 820 to the one or more support brackets of the power control board support 814, the PCB support housing 820 is rigidly attached to the end cap 802. For the cases in which the PCB support housing 820 houses the PCB 822 and is attached to the power control board support 814, the PCB 822 may be fixedly positioned within the lamp 800 such that the PCB 822 is prevented from moving within the lamp 800.

In one or more cases, a portion of the end cap 804 may be configured to be inserted into a socket of a lamp holder. For example, one or more signals pins, such as a positive control signal pin 904, a common contact signal pin 906, and a negative control signal pin 908, may be inserted into the low voltage socket 1002 of the lamp holder 1000. The one or more signal pins may be elongated rigid members. The positive control signal pin 904, the common contact signal pin 906, and the negative control signal pin 908 may protrude from an outer surface 804*a* of the end cap 804. In one or more cases, the one or more signal pins may extend from the rear portion 804*b* of the end cap 804 through the outer surface 804*a* of the end cap 804. The one or more signal pins 904, 906, and 908 may be electrically coupled to the DCB 816 and/or the LED strip 810, as shown in FIG. 8D.

Figure 48:
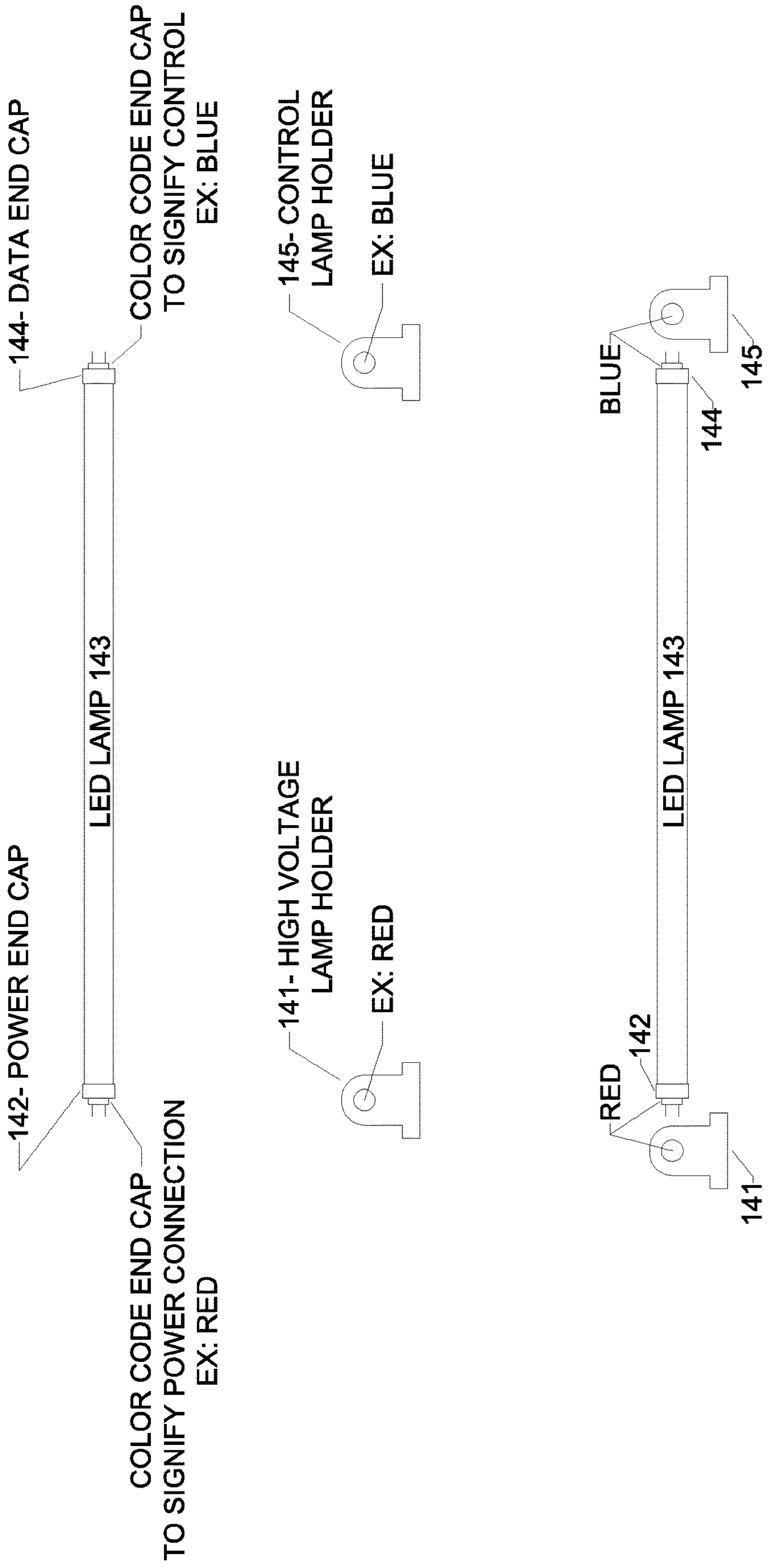
FIG. 48 illustrates an LED lamp having a color coded power lamp holder and power end cap.

FIG. 48 shows how, in some embodiments, the power end cap 142 and lamp holder of the power lamp holder 141 may be color coded in order to easily identify which end of the LED lamp 143 is to be inserted into the appropriate lamp holder. This can also be done with low voltage control end caps 144 and lamp holders 145. For example: red end caps

Figure 49:
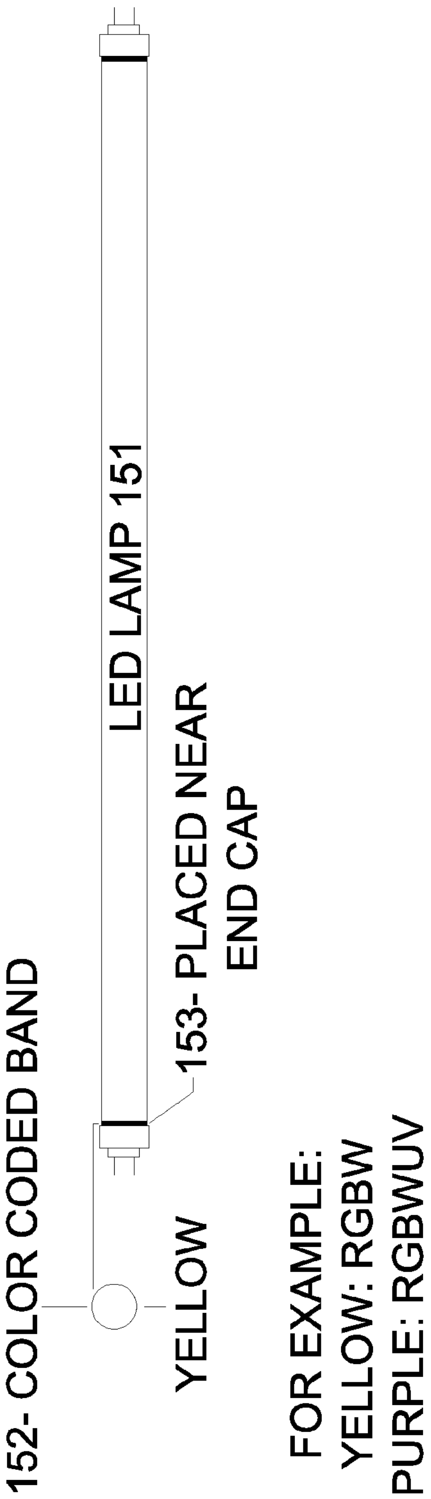
FIG. 49 illustrates an LED lamp having a color coded band for identifying models.

142 may be connected to red lamp holders 141 for high voltage power input, while blue end caps 144 may be connected to blue lamp holders 145 for low voltage control signals. In other embodiments, as in FIG. 49, LED lamps may be color coded by part or in the entirety in order to identify different models at a glance. For example, yellow strips on end caps may signify an RGBW, one pixel LED lamp configuration. Many color configurations are possible.

In other configurations, an LED lamp may have single or multiple pixels per LED lamp. A single pixel lamp will have the entire lamp function as one complete unit. Multiple pixels allow more detail within each lamp. Increasing the number of pixels per lamp also increases the number of DMX address per LED lamp. Higher number of pixels increases the resolution of the lighting output. The pixels are mapped in the control software to create increase detail and resolution in lighting playback.

Figure 51:
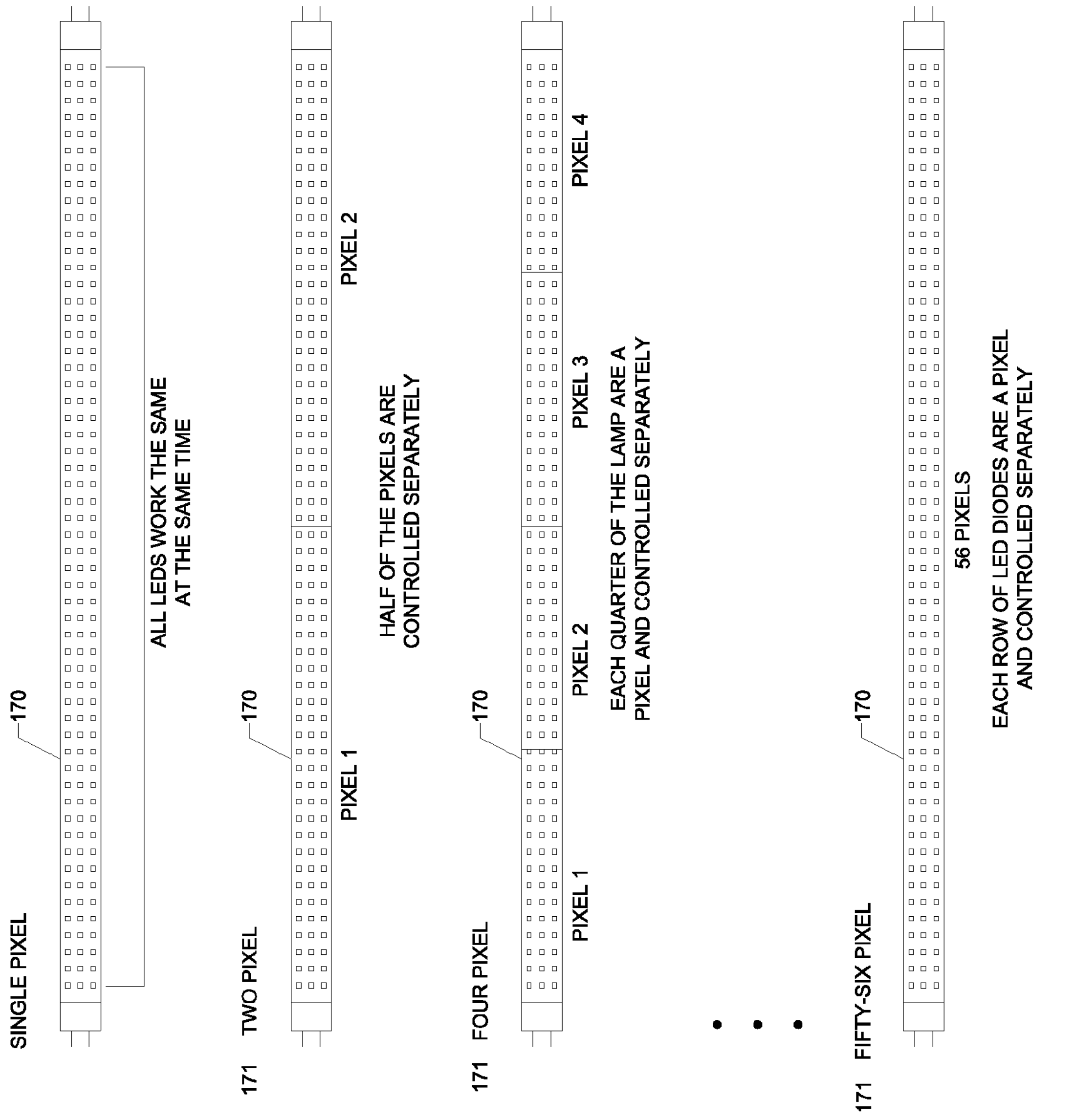
FIG. 51 illustrates LED lamps having various single or multiple pixel configurations.

As shown in FIG. 51, an LED lamp may have single or multiple pixels 171 per LED lamp. A single pixel lamp 17 will have the entire lamp function as one complete unit. Multiple pixels allow more detail by using less grouping of LED diodes within each lamp 171. Increasing the number of pixels per lamp also increases the number of DMX addresses per LED lamp. Higher number of pixels increases the resolution of the lighting output. The pixels are mapped in the control software to create increase detail and resolution in lighting playback.

The signals pins, 904, 906, and 908 may be inserted into the low voltage socket 1002, thereby electrically coupling the end cap 804 to the lamp holder 1000. The signal pins 904, 906, and 908 may be configured to receive one or more instructions via a low voltage control signal from a DMX controller, such as DMX controller 106. The signals pins, 904, 906, and 908 may be formed in a shape such as cylindrical shape, a polyhedronal shape, or the like, that may fit within the low voltage socket 1002. In one or more cases, the signals pins 904, 906, and 908 may be arranged on the end cap 804 to correspond to the arrangement of the contacts 1008, 1010, and 1012 and the standoff 1016 of the low voltage socket 1002. For example, the signal pins 904, 906, and 908 may be linearly arranged across the end cap 804. When a pin is inserted between the contact 1008 and the standoff 1016, the standoff 1016 may guide and push the pin into the recess 1009 of the contact 1008. The standoff 1016 may be formed of an insulating material configured to shield the pin from contacts 1010 and 1012.

In one or more cases, the signal pin 906 positioned between the two outer signal pins 904 and 908. Signal pin 906 may be positioned on a central portion of the end cap 804. In one or more cases, the signal pins 904 and 906 may be positioned next to one another, and the pin 908 may be offset from signal pins 904 and 906. The distance separating signal pins 908 and 906 may be greater than the distance separating signal pins 904 and 906. In one or more other cases, the signal pins 906 and 908 may be positioned next to one another, and the signal pin 904 may be offset from signal pins 906 and 908.

In one or more cases, the signal pin 906 positioned between the two outer signal pins 904 and 908. Signal pin 906 may be positioned on a central portion of the end cap 804. In one or more cases, the signal pins 904 and 906 may be positioned next to one another, and the pin 908 may be offset from signal pins 904 and 906. The distance separating signal pins 908 and 906 may be greater than the distance separating signal pins 904 and 906. In one or more other cases, the signal pins 906 and 908 may be positioned next to one another, and the signal pin 904 may be offset from signal pins 906 and 908.

In one or more cases, the signal pins 904, 906, and 908 of the low voltage end cap 804 are arranged such that the signal pins 904, 906, and 908 cannot be inserted into the receptacle, formed by contact 1022 and standoff 1028, and the receptacle formed by contact 1024 and standoff 1026, of the high voltage socket 1004. The standoff 1026 does not include a recess similar to the recess 1013 within contact 1012. Therefore, the standoff 1026 is not configured to receive the signal pin 906. As the signal pin 906 is prevented by standoff 1026 from being positioned within the high voltage socket 1004, the two receptacles of the high voltage socket 1004 may prevent the signal pins 904, 906, and 908 from being rotated within the high voltage socket 1004. By preventing the low voltage end cap 804 from being inserted into the high voltage socket 1004, the lamp 800 is prevented from being improperly installed within the lamp holder 1000.

In one or more cases, the diameter of the signal pins 904, 906, and 908 on the end cap 804 may be greater than the diameter of a positive high voltage pin 903 and a negative high voltage pin 905 of the end cap 802. For example, the diameter of each of the signal pins 904, 906, and 908 may be at or about 5 mm, and the diameter of each of the pins 903 and 905 may be at or about 2 mm. By having a larger diameter, the signal pins 904, 906, and 908 are prevented from being inserted into the receptacles of the high voltage socket 1004, which are sized to receive the smaller diameter pins 903 and 905.

In one or more cases, the end cap 804 may be formed in a shape corresponding to a shape of an outer surface of the chassis 808 coupled with the lens 806. For example, the end cap 804 may have a cylindrical shape. In one or more cases, the end cap 804 may have a tiered configuration including an inner portion 910 and an outer portion 912. The inner portion 910 and the outer portion 912 may each have a cylindrical shape, in which the inner portion 910 has a greater diameter than the outer portion 912. The inner portion 910 may include one or more through holes, such as through holes 914*a* and 914*b*. In one or more cases, the through holes 914*a* and 914*b* may be arranged perpendicular to the signal pins 904, 906, and 908, as shown in at least FIGS. 8C, 10A, 10B, and 10D. In one or more other cases, the through holes 914*a* and 914*b* may be arranged linearly with the signal pins 904, 906, and 908, as shown in FIG. 10C. In such a case as illustrated in FIG. 10C, the chassis 808 may be positioned within the lamp 800, such that the through holes 914*a* and 914*b* align with the indents 808*e* and 808*f* of the chassis 808.

The through holes 914*a* and 914*b* may each be sized to receive a fastener. A fastener, such as a screw, may be inserted through a through hole and fastened to an indent, such as indent 808*e* or 808*f* of the chassis 808. In one or more cases, the through holes 914*a* and 914*b* may include a countersunk or counterbored hole 914*c* on an end portion of the respective through hole. The through holes 914*a* and 914*b* may be configured to receive a head of the fastener, thereby allowing the fastener to sit flush with or below the outer surface of the inner portion 910. When coupled to the indents 808*e* and 808*f* of the chassis 808, the inner portion 910 is positioned on the chassis 808 and the lens 806. The one or more signal pins 904, 906, and 908 may protrude from the outer surface of the outer portion 912. In one or more other cases, the end cap 804 may include a single uniform body without a tiered configuration. In such a configuration, the one or more through holes and the one or more signal pins may be included on the outer surface of the end cap 804.

It should be noted that the power control board support 814 includes one or more of the same or similar features of the data control board support 812. Accordingly, a description of such features is not repeated.

In one or more cases, a portion of the end cap 802 may be configured to be inserted into a socket of a lamp holder, for example the high voltage socket 1004 of the lamp holder 1000. The end cap 802 includes the positive high voltage pin 903 and the negative high voltage pin 905. The pins 903 and 905 of the end cap 802 may be elongated rigid members protruding from an outer surface of the end cap 802. The pins 903 and 905 of the end cap 802 may be electrically coupled to the PCB 822, as shown in FIG. 8D. The pins 903 and 905 of the end cap 802 may be inserted into the high voltage socket 1004, thereby electrically coupling the end cap 802 to the lamp holder 1000. The pins 903 and 905 may be formed in a shape such as cylindrical shape, a polyhedronal shape, or the like. In one or more cases, the pins 903 and 905 may be arranged on the end cap 802 to correspond with the arrangement of the contacts 1022 and 1024, and standoffs 1026 and 1028 of the high voltage socket 1004. For example, the pins 903 and 905 may be linearly arranged on the end cap 802. The pins 903 and 905 may be spaced apart from one another such that one pin may be positioned between contact 1022 and standoff 1028 and the other pin may be positioned between standoff 1026 and contact 1024. When a pin is inserted between the contact 1022 and the standoff 1028, the standoff 1028 may guide and push the pin into the recess 1021 of the contact 1022. The standoffs 1026 and 1028 may be formed of an insulating material configured to shield the pin from contacts 1022 and 1026.

Figure 11A:
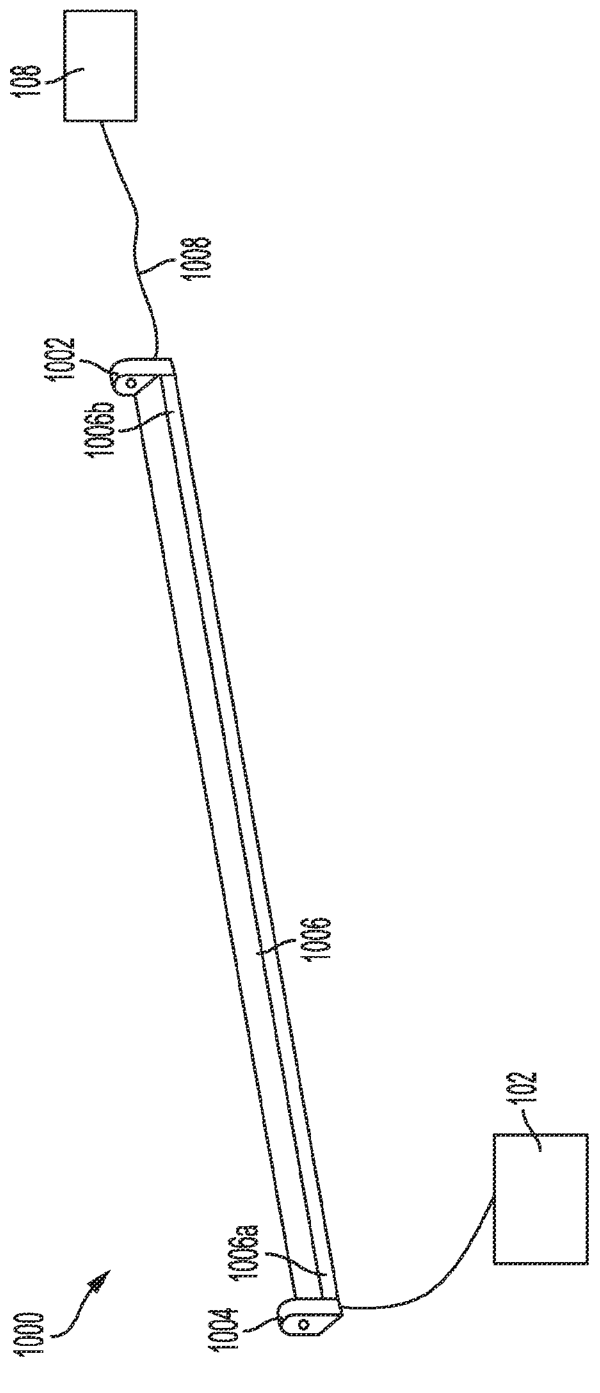
FIG. 11A illustrates an isometric view of a lamp holder.
Figure 11B:
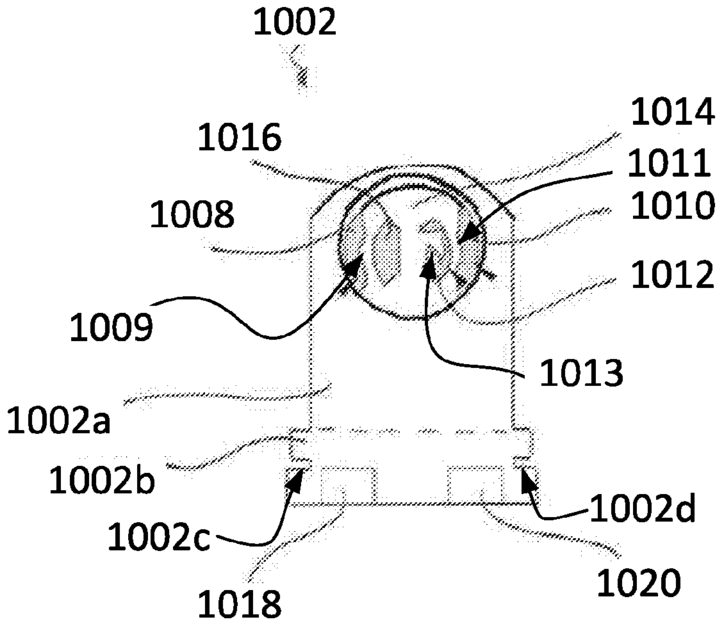
FIG. 11B illustrates a low voltage socket of the lamp holder of FIG. 11A.
Figure 11C:
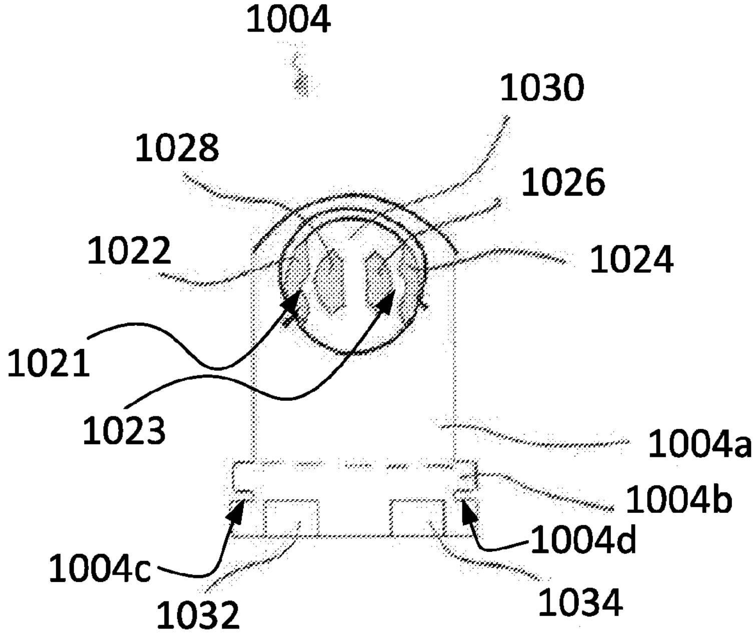
FIG. 11C illustrates a high voltage socket of the lamp holder of FIG. 11A.

FIG. 11A illustrates an isometric view of the lamp holder 1000. FIG. 11B illustrates the low voltage socket 1002 of the lamp holder 1000 of FIG. 11A. FIG. 11C illustrates the high voltage socket 1004 of the lamp holder 1000 of FIG. 11A.

In one or more cases, the lamp holder 1000 includes the low voltage socket 1002 and the high voltage socket 1004 disposed on opposite ends of the lamp holder support 1006. The low voltage socket 1002 and the high voltage socket 1004 are disposed far enough away from one another for the lamp 800 to be positioned between and coupled to the low voltage socket 1002 and the high voltage socket 1004. A DMX controller, such as DMX controller 108, may be connected to the low voltage socket 1002. The power supply 102 may be connected to the high voltage socket 1004.

The lamp holder support 1006 may be an elongated rigid member. In one or more cases, an end portion 1006*b* of the lamp holder support 1006 may be configured to couple with a bottom portion 1002*b* of the low voltage socket 1002, as shown in FIGS. 11A and 11B. The bottom portion 1002*b* may include one or more indents, such as indents 1002*c* and 1002*d*. The end portion 1006*b* may include one or more protrusions configured to be inserted into the one or more indents 1002*c* and 1002*d*, respectively. The one or more protrusions may interlock with the one or more indents, thereby coupling the lamp holder support 1006 to the low voltage socket 1002. The bottom portion 1002*b* may include receptacles 1018 and 1020 configured to route input signal wires 1036 from the DMX controller 108 to a receiving portion 1012 of the low voltage socket 1002.

In one or more cases, an end portion 1006*a* of the lamp holder support 1006 may be configured to couple with a bottom portion 1004*b* of the high voltage socket 1004, as shown in FIGS. 11A and 11C. The bottom portion 1004*b* may include one or more indents, such as indents 1004*c* and 1004*d*. The end portion 1006*a* may include one or more protrusions configured to be inserted into the one or more indents 1004*c* and 1004*d*, respectively. The one or more protrusions may interlock with the one or more receiving indents, thereby coupling the lamp holder support 1006 to the high voltage socket 1004. The bottom portion 1004*b* may include receptacles 1032 and 1034 configured to route high voltage wires from the power input to a receiving portion 1030 of the high voltage socket 1004.

The upper portion 1002*a* of the low voltage socket 1002 may include the receiving portion 1014 configured to receive the signal pins 904, 906, and 908. The receiving portion 1014 may include contacts 1008, 1010, and 1012, and the standoff 1016. The receiving portion 1014 may be positioned on the upper portion 1002*a* of the low voltage socket 1002.

The opposing surfaces of contact 1008 and standoff 1016 form a receptacle for receiving the negative control signal pin 908. The opposing surface of the standoff 1016 may be curved. The opposing surface of the contact 1008 includes a recess 1009 that is configured to hold a portion of the signal pin 908. The opposing surface of the standoff 1016 may curve towards the opposing surface of the contact 1008 to guide the signal pin 908 into the recess 1009 of the contact 1008. The opposing surfaces of contacts 1010 and 1012 form a receptacle for receiving the positive control signal pin 904. The opposing surface of the contact 1012 may be curved. The opposing surface of the contact 1012 may be insulated similar to the standoff 1016 to shield the signal pin 904 from being electrically coupled to the contact 1012. The opposing surface of the contact 1010 may include a recess 1011 configured to hold a portion of the signal pin 904. The opposing surface of the contact 1012 may curve towards the opposing surface of the contact 1010 to guide the signal pin 904 into the recess 1011. The surface opposite the opposing surface of the contact 1010 may include a recess 1013 configured to receive the common contact signal pin 906.

To couple the end cap 804 to the low voltage socket 1002, the signal pins 904 and 906 are positioned within the recess 1011 and the recess 1013, respectively, such that the signal pin 908 is positioned out of the receptacle defined by contact 1008 and the standoff 1016. Having positioned the signal pins 904 and 906 within the respective recesses, the lamp 800 is rotated in the receiving portion 1014, such that the signal pin 908 rotates downward into the recess 1009 of the receptacle. The end cap 804 is locked into the receiving portion 1014 when the signal pin 908 is positioned within recess 1009, the pin 906 is positioned within recess 1013, and the pin 904 is positioned within the recess 1011. When the end cap 804 is locked into the receiving portion 1014, the signal pins 904, 906, and 908 may be horizontally arranged across the low voltage socket 1002.

The upper portion 1004*a* of the high voltage socket 1004 may include the receiving portion 1030 configured to receive the positive high voltage pin 903 and the negative high voltage pin 905 of the high voltage end cap 802. The receiving portion 1030 may include contacts 1022 and 1024, and the standoffs 1026 and 1028. The receiving portion 1030 may be positioned on the upper portion 1004*a* of the high voltage socket 1004. When the end cap 802 is coupled to the receiving portion 1030 and the end cap 804 is coupled to the receiving portion 1014, the lamp 800 may be disposed away from the upper surface of the lamp holder support 1006. That is, when the lamp 800 is coupled to the lamp holder 1000, the outer surface of the lamp 800 is spaced away from the upper surface of the lamp holder support 1006, and does not contact the upper surface of the lamp holder support 1006.

The opposing surfaces of contact 1022 and the standoff 1028 form a receptacle for receiving the negative pin 905. The opposing surface of the standoff 1028 may be curved. The opposing surface of the contact 1022 may include a recess 1021 configured to hold a portion of the negative pin 905. The opposing surface of the standoff 1028 may curve towards the opposing surface of the contact 1022 to guide the negative pin 905 into the recess 1021 of the contact 1022. The opposing surfaces of contact 1024 and standoff 1026 form a receptacle for receiving the positive pin 903. The opposing surface of 1026 may be curved. The opposing surface of the standoff 1026 may be insulated similar to the standoff 1028 to shield the positive pin 903 from being coupled to the standoff 1026. The opposing surface of the contact 1024 may include a recess 1023 configured to hold a portion of the positive pin 903. The opposing surface of the standoff 1026 may curve towards the opposing surface of the contact 1024 to guide the positive pin 903 into the recess 1023.

To couple the end cap 802 to the high voltage socket 1004, the positive pin 903 is positioned within the recess 1023, such that the negative pin 905 is positioned out of the receptacle defined by the contact 1022 and the standoff 1028. Having positioned the positive pin 903 within the recess 1023, the lamp 800 is rotated in the receiving portion 1030, such that the negative pin 905 rotates downward into the recess 1021 of the receptacle. The end cap 802 is locked into the receiving portion 1030 when the negative pin 905 is positioned within recess 1021 and the positive pin 903 is positioned within recess 1023. When the end cap 802 is locked into the receiving portion 1030, the positive pin 903 and the negative pin 905 may be horizontally arranged across the high voltage socket 1004.

Figure 12A:
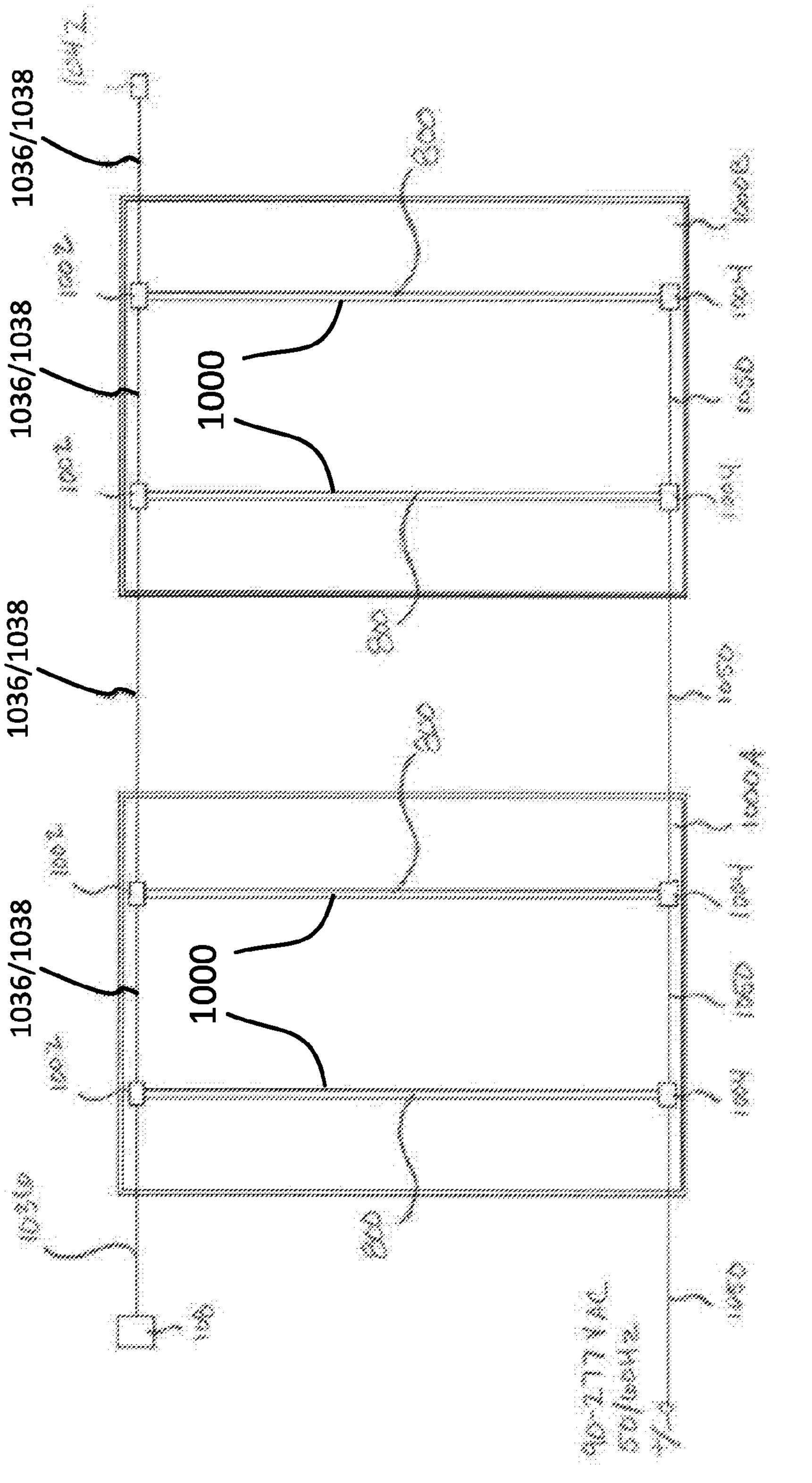
FIG. 12A illustrates an example wiring diagram of one or more light fixtures.
Figure 12B:
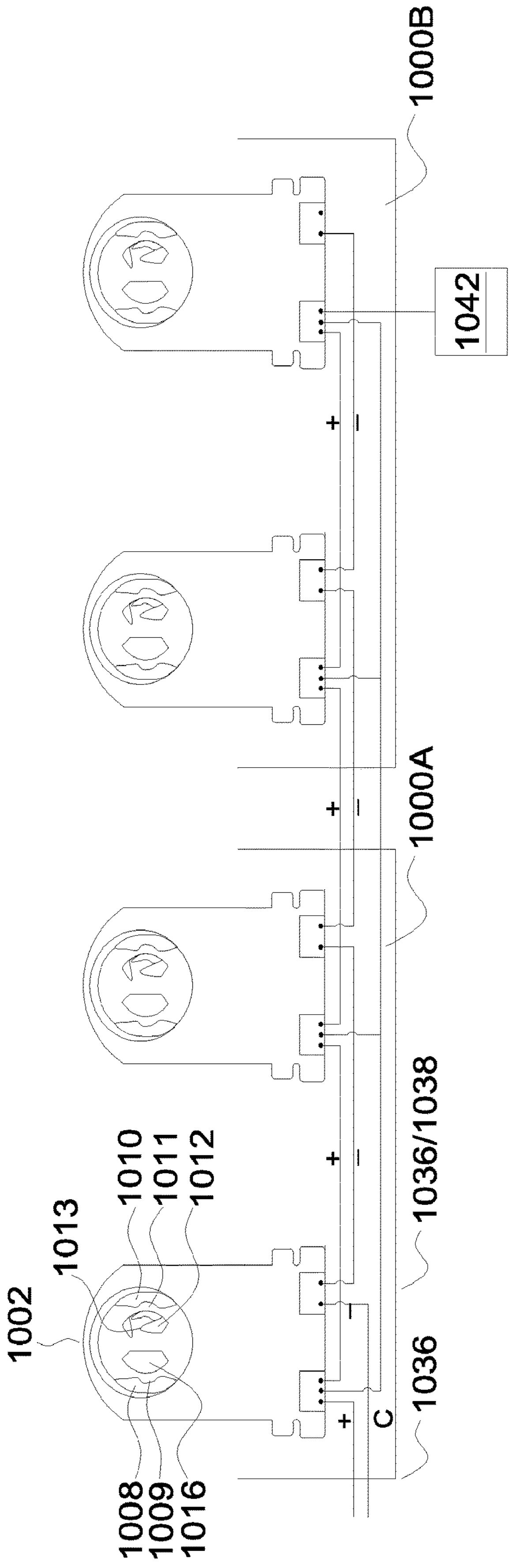
FIG. 12B illustrates an example low voltage control wiring diagram for one or more connected low voltage sockets.
Figure 12C:
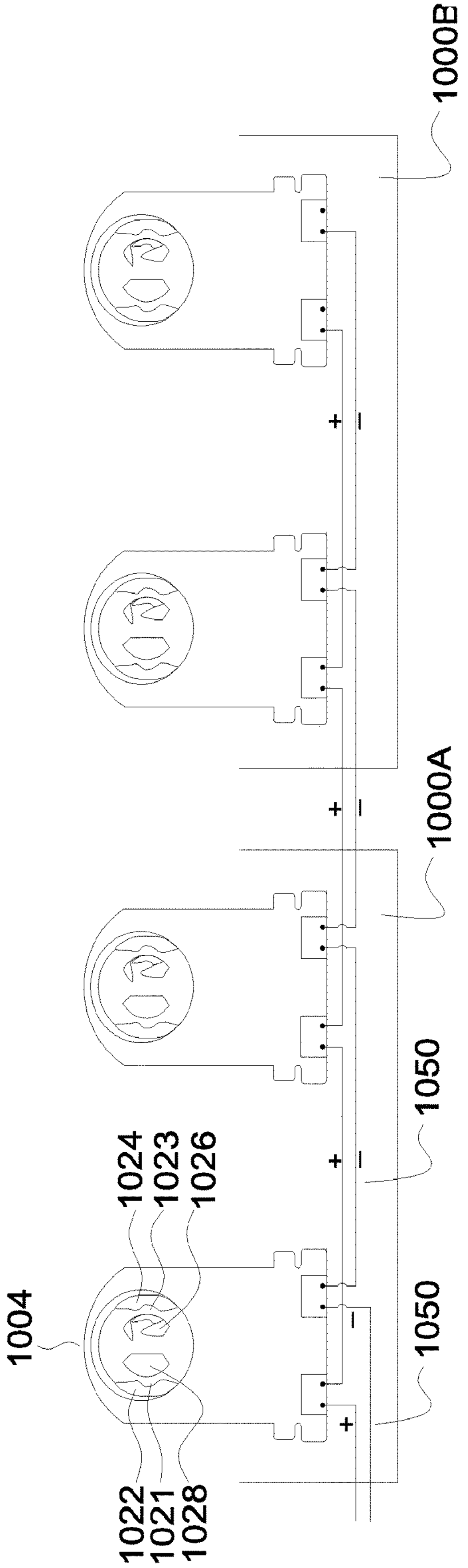
FIG. 12C illustrates an example high voltage wiring diagram for one or more connected high voltage sockets.

FIG. 12A illustrates an example wiring diagram of one or more light fixtures including one or more lamp holders 1000. FIG. 12B illustrates an example low voltage control wiring diagram for one or more connected low voltage sockets 1002. FIG. 12C illustrates an example high voltage wiring diagram for one or more connected high voltage sockets 1004.

The one or more lamp holders 1000 may be fixed to a lighting fixture, such as lighting fixture 1000A and 1000B, and one or more lamps 800 may be coupled to a respective lamp holder 1000. For example, two lamps 800 and two lamp holders 1000, as shown in FIG. 12A, may be used in the lighting fixture 1000A. In another example, one lamp 800 may be coupled to one lamp holder 1000 in one lighting fixture 1000A. In other examples, the lighting fixture may include three or more lamp holders 1000 per lighting fixture. In one or more cases, the lamp holders 1000 may be connected in parallel with one another.

The first low voltage socket 1002 of the first lamp holder 1000 may be coupled to an input signal wire 1036 to receive an input signal. The DMX controller 108 may output the input signal via the input signal wire 1036. The input signal wire 1036 may include a positive control signal wire (+), a negative control signal wire (−), and a common contact signal wire (c), as shown in FIG. 12B. The positive control signal wire may provide a positive control signal. For example, the positive control signal may include a positive voltage signal. The negative control signal wire may provide a negative control signal. For example, the negative control signal may include a negative voltage signal. The common contact signal wire may provide a common contact signal. Each of the positive control signal wire, the negative control signal wire, and the common contact signal wire may be connected to the respective contacts of the low voltage socket 1002. For example, the negative control signal wire may be connected to contact 1008, the positive control signal wire may be connected to contacts 1010, and the common contact signal wire may be connected to the contact 1012. In another example, the negative control signal wire may be connected to contact 1008, the positive control signal wire may be connected to contacts 1012, and the common contact signal wire may be connected to the contact 1010.

The first lamp holder 1000 may be coupled to an output signal wire 1038 to output an output signal. The output signal wire 1038 may provide an output signal from the first lamp holder 1000 to the next lamp holder; a lamp holder in the next light fixture; or a low voltage signal terminator 1042 if the lamp holder 1000 is the last lamp holder. The output signal wire 1038 may include positive control signal wire (+), a negative control signal wire (−), and a common contact signal wire (c), as shown in FIG. 12B. The output signal wire 1038 may be used as an input signal wire 1036 by being connected to the next lamp holder; a lamp holder in the next lighting fixture; or the low voltage signal terminator 1042 if the lamp holder 1000 is the last lamp holder.

The positive control signal wire may provide a positive control signal from the first lamp holder 1000 to the second lamp holder 1000, as shown in FIGS. 12A and 12B. The negative control signal wire may provide a negative control signal from the first lamp holder 1000 to the second lamp holder 1000, as shown in FIGS. 12A and 12B. The common contact signal wire may provide a common contact signal from the DMX controller 108 to the second lamp holder 1000. Each of the positive control signal wire, the negative control signal wire, and the common contact signal wire may be connected to the respective contacts of the low voltage socket 1002. For example, for the cases in which the negative control signal wire of the input signal wire 1036 and/or the output signal wire 1038 is connected to contact 1008 and the positive control signal wire is connected to contacts 1010, the negative control signal wire of the output signal wire 1038 may be connected to contact 1008, the positive control signal wire may be connected to contacts 1012, and the common contact signal wire may be connected to the contact 1010. In one or more cases, the output signal of the second lamp holder 1000 may be provided as an input signal to another lamp holder; a lamp holder in the next lighting fixture; or the low voltage signal terminator 1042 if the second lamp holder 1000 is the last lamp holder.

In one or more cases, the lamp holders and lighting fixtures may be daisy chained together on a DMX universe (e.g., 512 DMX channels), in which a signal terminator, such as the low voltage signal terminator 1042, is installed on the end of low voltage connection of the last lamp holder for each control universe. Multiple DMX universes may be used and mapped in the programming software to expand the size and level of control desired for the lighting systems. The low voltage signal terminator 1042 may be a resistor connected across the positive control signal and the negative control signal. The resistor may have, for example, a resistance of at or about 120 ohms. The low voltage signal terminator 1042 may be used to remove radio frequency signal noise on a DMX universe.

In one or more cases, the high voltage socket 1004 of the lamp holder 1000 may be coupled to an input signal wire 1050 to receive power from the power input, as shown in FIGS. 12A and 12C. For the cases in which there is more than one lamp holder, the high voltage sockets 1004 of each lamp holder 1000 may be connected to the power input to provide power to the PCB 822. The power input may supply electrical power of at or about 90 VAC to 277 VAC at 50/60 Hz to each lamp holder via the input signal wire 1050.

It should be noted that each of FIG. 12 illustrates two lamp holders included in two lighting fixtures, respectively, for illustrative purposes only. Additional lamp holders and lighting fixtures may be arranged into a network of connected devices. For example, the DMX controller 108 may provide a DMX control signal to a third light fixture. Such a communication may be a wired connection according to standard DMX protocols. Alternatively, the connection may be a wireless connection using standard wireless communication protocols such as mesh networking protocols. In such an arrangement, one or more lighting fixtures may communicate with multiple other lighting fixtures simultaneously, thereby providing redundant wireless communication links between the lighting fixtures should one or more links fail (e.g., if a fixture loses power for some reason).

Figure 42:
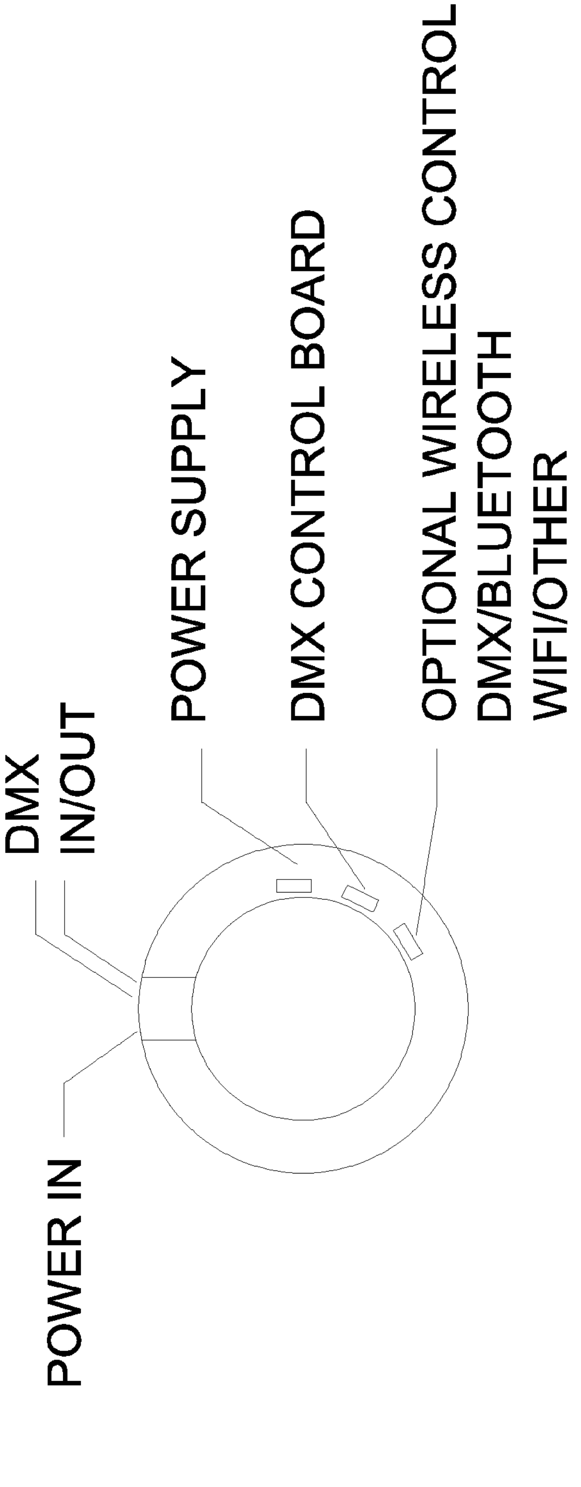
FIG. 42 illustrates an alternate, circular LED lamp shape.
Figure 43:
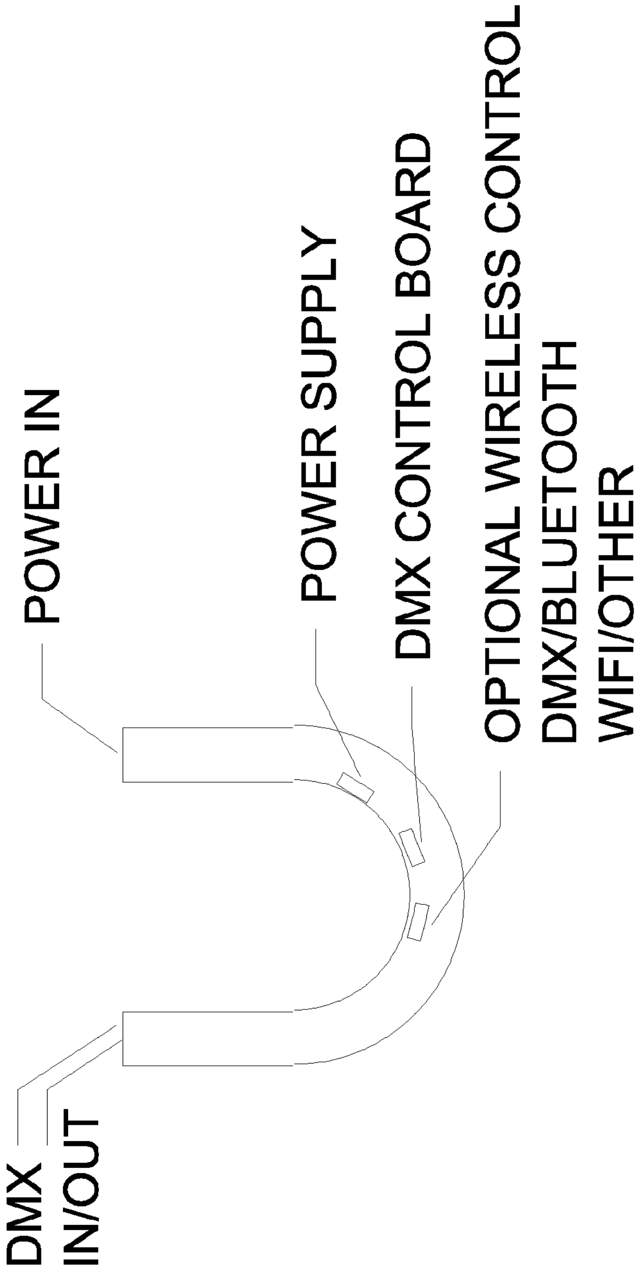
FIG. 43 illustrates an alternate, U-shaped LED lamp shape.
Figure 44:
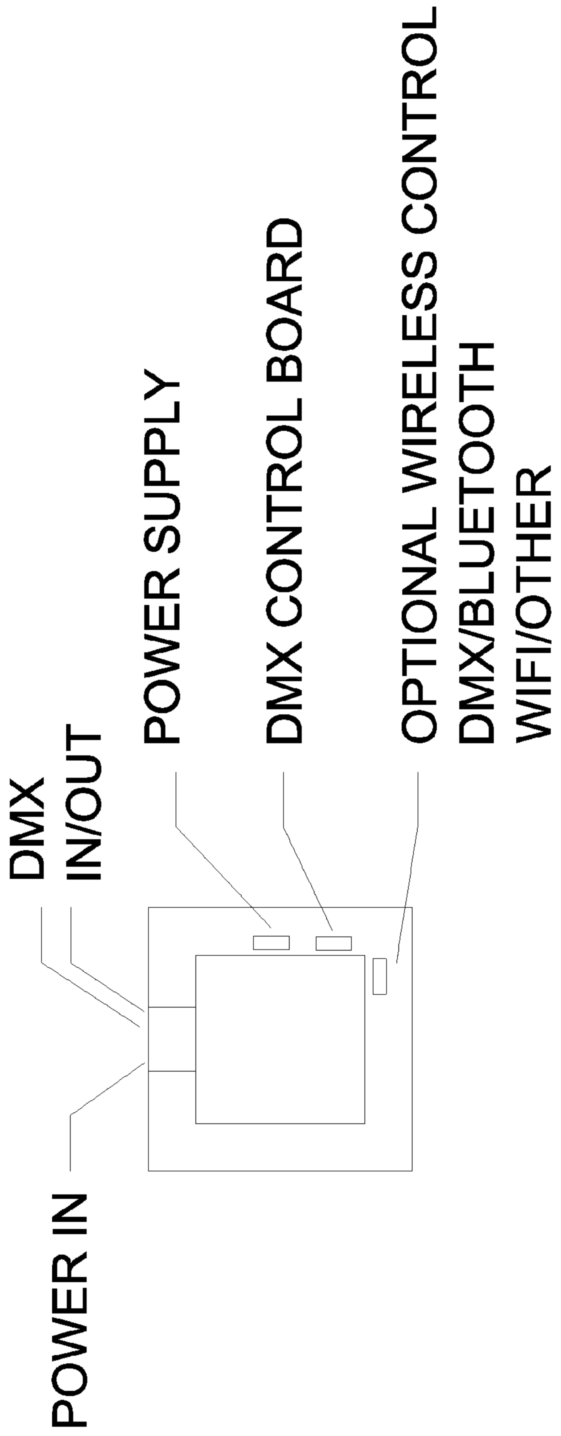
FIG. 44 illustrates an alternate, square LED lamp shape.
Figure 45:
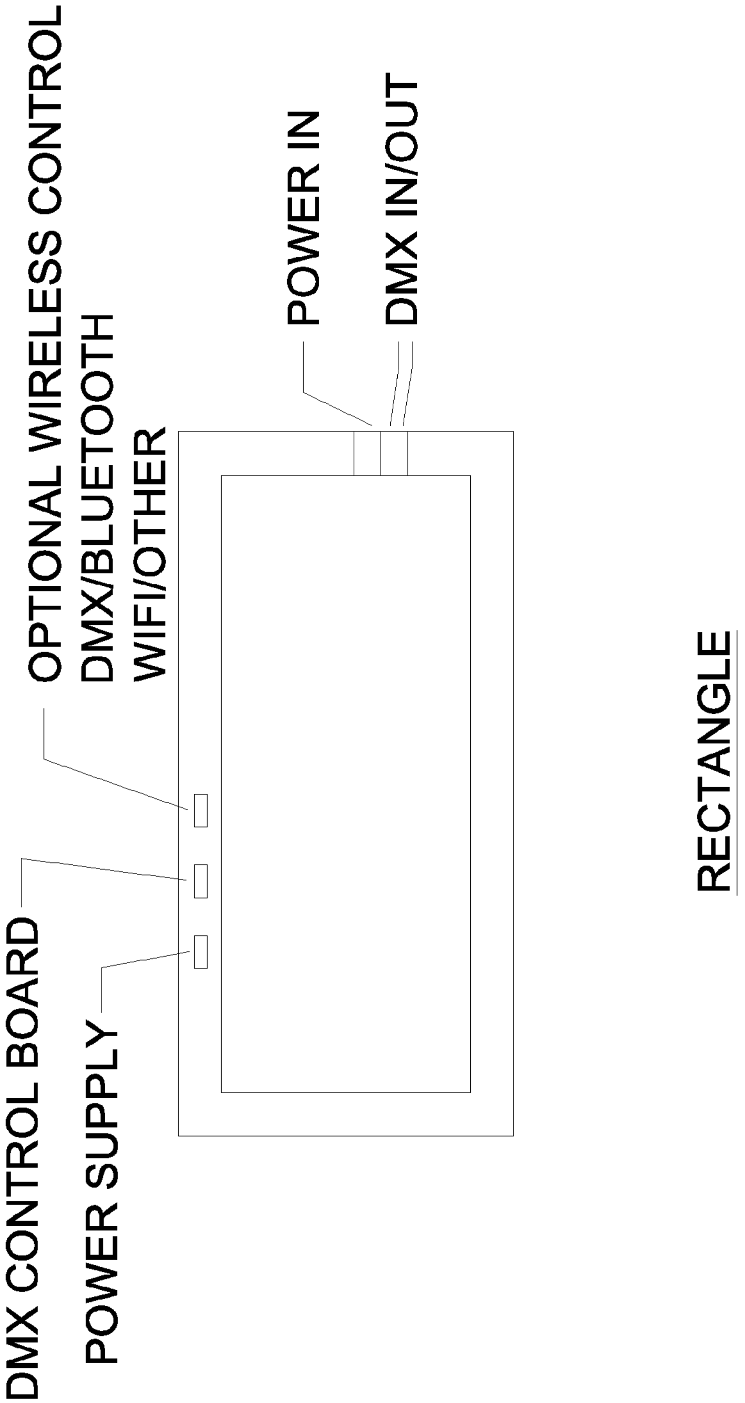
FIG. 45 illustrates an alternate, rectangle LED lamp shape.
Figure 46:
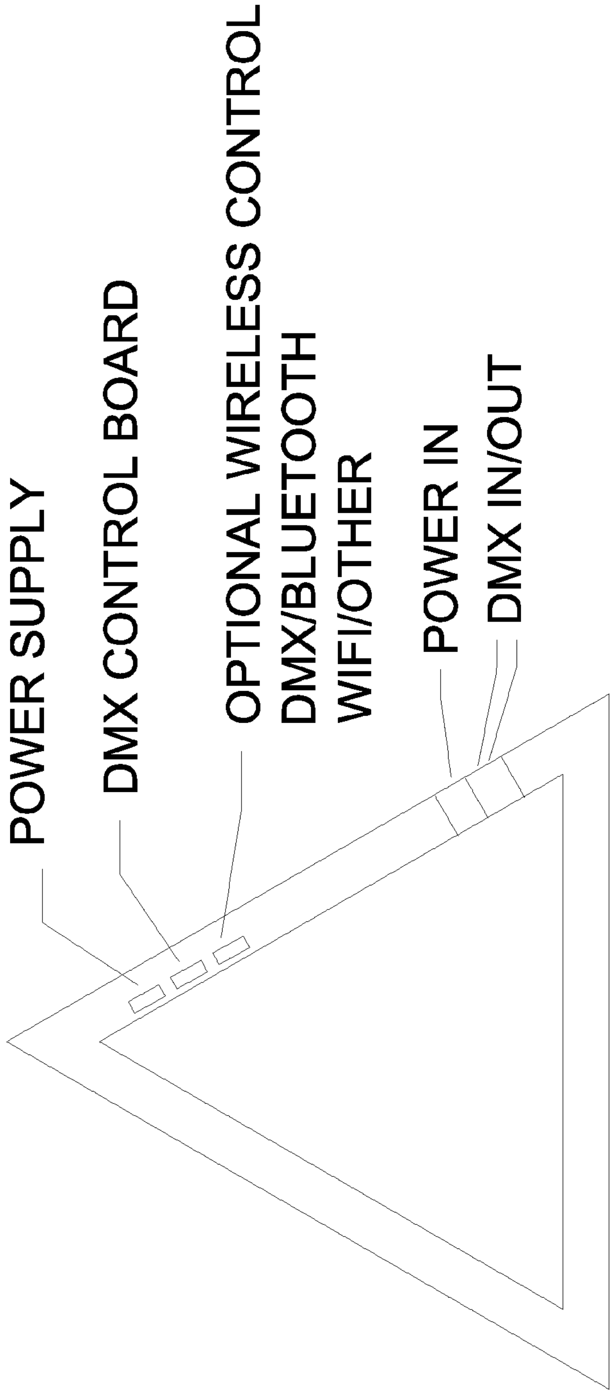
FIG. 46 illustrates an alternate, triangle LED lamp shape.

The lamp 800 may be formed in a standard size or custom size. For example, the lamp 800 may be manufactured in standard diameters of T2 to T17 with standard lengths of, for example, 15 inches, 18 inches, 24 inches, 36 inches or 48 inches. The lamp 800 may also be manufactured with a larger diameter and a different length, for example, a length intermediate of the standard length or lengths longer than the standard lengths, for example, 96 inches or more. The larger diameter of the lamp 800 may be utilized to provide multiple rows of various types of LEDs, such as LED 810*a*, 810*b*, and 810*c*. The larger diameter may facilitate lamp 800 having an increased wattage. The lamp 800 may also have configurations other than the illustrated linear configuration. For example, the lamp 800 may have a U-shaped (FIG. 43), circular (FIG. 42), square (FIG. 44), rectangular (FIG. 45), or triangular (FIG. 46) configuration. Also, the lamp 800 may be manufactured with bi-pin or multi-pin configurations for input of higher or lower voltage electrical power. These may include Bluetooth to other mesh control devices and/or DMX wired or wireless or Wi-Fi to other lamps or to additional control devices.

In one or more cases, the lamp 800 may include a localized controller configured to transmit a low voltage control signal to the DCB 816. The control signal from the localized controller may be factory set and may be specific to the type of LEDs used in the lamp 800. For example, the localized controller may send a default control signal to the lamp 800 to turn on the white LEDs in the lamp 800 and emit white light. Thus, the lamp 800 can emit white light when the LED lamps are installed in the lamp holder 1000 but the control cables and/or external controller are not yet installed. In one or more cases, a fire alarm triggered relay may be connected in-line with the external lighting control power. When a fire alarm is triggered, the external controller is powered off and the lamp 800 defaults to one or more built-in programs. For example, the lamp 800 may receive a default signal from the internal controller to emit white light.

As used herein, the term "about" in reference to a numerical value means plus or minus 10% of the numerical value of the number with which it is being used.

Various embodiments of the above-disclosed and other features and functions, or alternatives thereof, can be combined into many other different systems or applications. Various presently unforeseen or unanticipated alternatives, modifications, variations or improvements therein can be subsequently made by those skilled in the art, each of which is also intended to be encompassed by the disclosed embodiments.

What is claimed is:

1. A light emitting diode (LED) light fixture comprising:
- a plurality of light emitting diode (LED) lamps, each of the plurality of LED lamps comprising:
  - an elongated chassis comprising a platform;
  - at least one LED positioned on the platform; and
  - a first end cap and a second end cap disposed on opposite ends of the LED lamp,
  - wherein the first end cap comprises a first support platform coupled to an inner surface of the first end cap, and
  - wherein the second end cap comprises a second support platform coupled to an inner surface of the second end cap;
- a power supply, communicatively coupled to each of the plurality of LED lamps, configured to supply power to each of the plurality of LED lamps;
- a lamp holder comprising a high voltage socket and a low voltage socket, wherein the high voltage socket is configured to receive the first end cap and the low voltage socket is configured to receive the second end cap, thereby electrically coupling the LED lamp and the lamp holder;
- a communication protocol controller; and
- a communication protocol converter, communicatively coupled to each of the plurality of LED lamps and to the communication protocol controller, configured to receive a communication protocol from the communication protocol controller.

2. The LED light fixture according to claim 1, wherein the communication protocol employed by the communication protocol converter is selected from digital multiplex (DMX), attached resource computer network (ARCnet), Ethernet (IEEE 802 protocols), infrared (IR), or serial communication.

3. The LED lighting fixture according to claim 1, wherein the first end cap comprises at least two pins protruding from an outer surface of the first end cap,
- wherein the at least two pins are configured to receive a high voltage power signal from the high voltage socket,
- wherein the second end cap comprises three pins protruding from an outer surface of the second end cap, and
- wherein the three pins are configured to receive a low voltage control signal from the low voltage socket.

4. The LED lighting fixture according to claim 3, wherein the two pins of the first end cap are configured to fit within two corresponding contact recesses of the high voltage socket, and
- wherein the three pins of the second end cap are configured to fit within three corresponding contact recesses of the low voltage socket.

5. The LED lighting fixture according to claim 3, wherein the three pins of the second end cap are prevented from fitting within the two contact recesses of the high voltage socket.

6. The LED lighting fixture according to claim 1, wherein the lamp holder and the power supply form a ballast.

7. A light emitting diode (LED) light fixture comprising:
- a plurality of light emitting diode (LED) lamps, each of the plurality of LED lamps comprising:
  - an elongated chassis comprising a platform;
  - at least one LED strip, including a plurality of LEDs, positioned on the platform; and
  - a first end cap and a second end cap disposed on opposite ends of the LED lamp, wherein the first end cap comprises a first support platform coupled to an inner surface of the first end cap, and wherein the second end cap comprises a second support platform coupled to an inner surface of the second end cap;

a power supply, communicatively coupled to each of the plurality of LED lamps, configured to supply power to each of the plurality of LED lamps;

a lamp holder comprising a high voltage socket and a low voltage socket, wherein the high voltage socket is configured to receive the first end cap and the low voltage socket is configured to receive the second end cap, thereby electrically coupling the LED lamp and the lamp holder;

a communication protocol controller; and a communication protocol converter, communicatively coupled to each of the plurality of LED lamps and to the communication protocol controller, configured to receive a communication protocol from the communication protocol controller.

8. The LED light fixture according to claim 7, wherein the plurality of LEDs includes two or more LEDs configured to emit light of different wavelengths.

9. The LED light fixture according to claim 7, wherein the communication protocol employed by the communication protocol converter is selected from digital multiplex (DMX), attached resource computer network (ARCnet), Ethernet (IEEE 802 protocols), infrared (IR), or serial communication.

10. The LED lighting fixture according to claim 7, wherein the first end cap comprises at least two pins protruding from an outer surface of the first end cap, wherein the at least two pins are configured to receive a high voltage power signal from the high voltage socket, wherein the second end cap comprises three pins protruding from an outer surface of the second end cap, and wherein the three pins are configured to receive a low voltage control signal from the low voltage socket.

11. The LED lighting fixture according to claim 10, wherein the two pins of the first end cap are configured to fit within two corresponding contact recesses of the high voltage socket, and wherein the three pins of the second end cap are configured to fit within three corresponding contact recesses of the low voltage socket.

12. The LED lighting fixture according to claim 10, wherein the three pins of the second end cap are prevented from fitting within the two contact recesses of the high voltage socket.

13. The LED lighting fixture according to claim 7, wherein the lamp holder and the power supply form a ballast.

* * * * *